(12) United States Patent
Yuasa et al.

(10) Patent No.: US 8,754,264 B2
(45) Date of Patent: Jun. 17, 2014

(54) PRODUCTION METHOD OF UNSATURATED (POLY)ALKYLENE GLYCOL ETHER MONOMER AND PRODUCTION METHOD OF (POLY)ALKYLENE GLYCOL CHAIN-CONTAINING POLYMER

(75) Inventors: Tsutomu Yuasa, Osaka (JP); Yuko Matsuda, Osaka (JP); Naohiko Itayama, Osaka (JP); Hideaki Nagano, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 766 days.

(21) Appl. No.: 12/594,397

(22) PCT Filed: Apr. 4, 2008

(86) PCT No.: PCT/JP2008/057119
§ 371 (c)(1),
(2), (4) Date: Nov. 25, 2009

(87) PCT Pub. No.: WO2008/126909
PCT Pub. Date: Oct. 23, 2008

(65) Prior Publication Data
US 2010/0130793 A1    May 27, 2010

(30) Foreign Application Priority Data

Apr. 5, 2007   (JP) ................. 2007-099609
Apr. 5, 2007   (JP) ................. 2007-099610
Jul. 23, 2007  (JP) ................. 2007-190926

(51) Int. Cl.
| | |
|---|---|
| *C07C 41/03* | (2006.01) |
| *C08G 65/26* | (2006.01) |
| *C08F 216/14* | (2006.01) |
| *C08F 220/06* | (2006.01) |
| *C08F 216/12* | (2006.01) |

(52) U.S. Cl.
CPC ........ *C08F 216/125* (2013.01); *C08G 65/2609* (2013.01); *C08F 216/1416* (2013.01); *C08F 220/06* (2013.01)
USPC ........................................................ 568/687

(58) Field of Classification Search
CPC ................. C07C 41/03; C08F 216/125; C08F 216/1416; C08F 220/06; C08G 65/2609
USPC ........................................................ 568/687
See application file for complete search history.

(56) References Cited

U.S. PATENT DOCUMENTS

| | | | | |
|---|---|---|---|---|
| 3,556,763 | A * | 1/1971 | Gower et al. ................. | 504/184 |
| 3,904,763 | A * | 9/1975 | Bowers ......................... | 514/467 |
| 6,174,980 | B1 | 1/2001 | Hirata et al. | |
| 6,258,765 | B1 * | 7/2001 | Wei et al. ...................... | 510/224 |
| 6,388,038 | B1 | 5/2002 | Hirata et al. | |
| 2002/0050232 | A1 | 5/2002 | Yamashita et al. | |
| 2004/0204517 | A1 | 10/2004 | Yamashita et al. | |
| 2007/0073022 | A1 | 3/2007 | Yuasa et al. | |
| 2008/0045633 | A1 | 2/2008 | Mita et al. | |
| 2011/0046269 | A1 | 2/2011 | Yuasa et al. | |

FOREIGN PATENT DOCUMENTS

| | | | |
|---|---|---|---|
| CN | 1189473 | A | 8/1998 |
| CN | 1343642 | | 4/2002 |
| CN | 1600735 | A | 3/2005 |
| CN | 1768015 | A | 5/2006 |
| CN | 1939947 | A | 4/2007 |
| DE | 10064491 | * | 7/2002 |
| JP | 57-209926 | A | 12/1982 |
| JP | 61-000033 | | 1/1986 |
| JP | 10-194808 | | 7/1998 |
| JP | 11-106247 | | 4/1999 |
| JP | 2000-034151 | | 2/2000 |
| JP | 2001-199751 | A | 7/2001 |
| JP | 2001-220194 | | 8/2001 |
| JP | 2002-121055 | | 4/2002 |
| JP | 2002-121056 | A | 4/2002 |
| JP | 2002-348161 | | 12/2002 |
| JP | 2002-371023 | | 12/2002 |
| JP | 2003-012358 | A | 1/2003 |
| JP | 2003-105042 | A | 4/2003 |
| JP | 2003-221266 | | 8/2003 |
| JP | 2005-526159 | A | 9/2005 |
| JP | 2006-282414 | A | 10/2006 |
| JP | 2006-522734 | | 10/2006 |
| WO | WO-03/097716 | A1 | 11/2003 |
| WO | WO-2005-123625 | A1 | 12/2005 |

OTHER PUBLICATIONS

Office Action issued Apr. 6, 2011 in counterpart Chinese Application No. 200880010227.7

* cited by examiner

*Primary Examiner* — Rosalynd Keys
(74) *Attorney, Agent, or Firm* — Novak Druce Connolly Bove Lodge & Hutz LLP

(57) ABSTRACT

To provide a production method of a (poly)alkylene glycol chain-containing polymer which can be preferably used in various applications such as an admixture for cement and which can exhibit extremely high dispersibility to a cement composition. The unsaturated (poly)alkylene glycol ether monomer of the present invention is an unsaturated (poly)alkylene glycol ether monomer production method for producing an unsaturated (poly)alkylene glycol ether monomer by addition reaction of an alkylene oxide on an unsaturated alcohol, wherein the production method includes a step of carrying out addition reaction under condition of existence of 0.01 to 25 parts by mass of an unsaturated (poly)alkylene glycol diether monomer to 100 parts by mass of the unsaturated alcohol, and a (poly)alkylene glycol chain-containing polymer production method, wherein a monomer component including an unsaturated (poly)alkylene glycol ether monomer produced by the production method.

8 Claims, 11 Drawing Sheets

PRODUCTION METHOD OF UNSATURATED (POLY)ALKYLENE GLYCOL ETHER MONOMER AND PRODUCTION METHOD OF (POLY)ALKYLENE GLYCOL CHAIN-CONTAINING POLYMER

CROSS REFERENCE TO RELATED APPLICATIONS

This application is a National Phase filing under 35 U.S.C. §371 of PCT/JP2008/057119 filed Apr. 4, 2008, which claims priority to Patent Application No. 2007-099609, filed in Japan on Apr. 5, 2007; Patent Application No. 2007-099610, filed in Japan on Apr. 5, 2007; and Patent Application No. 2007-190926, filed in Japan on Jul. 23, 2007. The entire contents of each of the above-applications are incorporated herein by reference.

TECHNICAL FIELD

The invention relates to a production method of an unsaturated (poly)alkylene glycol ether monomer and a production method of a (poly)alkylene glycol chain-containing polymer. More particularly, the invention relates to a production method of an unsaturated (poly)alkylene glycol ether monomer preferably usable as a raw material for various kinds of polymers and a production method of a (poly)alkylene glycol chain-containing polymer preferably usable for cement compositions such as cement paste, mortar and concrete, and the like.

BACKGROUND ART

A (poly)alkylene glycol chain-containing polymer has been used for various applications as a polymer having hydrophilicity and is particularly useful as a dispersant or the like. For example, it has a capability of reducing water for cement compositions such as cement paste, mortar and concrete, and the like and has been used widely as an admixture for cement, a concrete admixture, or the like and it is thus indispensable for composing civil engineering and construction structural objects and the like from the cement compositions. Such an admixture for cement is provided with a function of improving strength and durability of hardened products by improving the fluidity of the cement compositions and reducing water of the cement compositions. Among such water-reducing agents, because of a high water-reducing capability as compared with conventional naphthalene water-reducing agents and the like, a polycarboxylic acid admixture for cement or concrete admixture containing a polycarboxylic acid polymer has been practically used as a high performance AE water-reducing agent in many cases.

As such a polycarboxylic acid polymer preferable for an admixture for cement, copolymers of alkenyl ether alkylene oxide adducts and unsaturated carboxylic acids have been investigated. Specifically disclosed are binary copolymers of a poly(ethylene/propylene) glycol alkenyl ether and an unsaturated carboxylic acid as indispensable constituent units (e.g. refer to Japanese Kokai Publication Nos. Hei-10-194808 and Hei-11-106247), quaternary copolymers of (1) a polyethylene glycol (meth) allyl ether, (2) a polyalkylene glycol (meth) allyl ether, (3) (meth)acrylic acid, and (4) a sulfonic acid group-containing monomer (e.g. refer to Japanese Kokai Publication No. 2000-034151), and tertiary copolymers of (1) a polyethylene glycol (meth) allyl ether, (2) a polypropylene glycol (meth) allyl ether, and (3) an unsaturated carboxylic acid (e.g. refer to Japanese Kokai Publication No. 2001-220194).

Further disclosed examples are copolymers of an alkylene oxide (AO) adduct of an alkenyl ether having 2 to 4 carbon atoms and methacrylic acid (e.g. refer to Japanese Kokai Publication No. 2002-348161), copolymers of a methallyl ether AO adduct and acrylic acid (e.g. refer to Japanese Kokai Publication No. 2002-121055), tertiary copolymers of (1) an alkenyl AO adduct having 2 to 4 carbon atoms (addition mole number n=1 to 100), (2) an alkenyl ether AO adduct having 2 to 4 carbon atoms (addition mole number n=11 to 300), and (3) an unsaturated monocarboxylic acid, blends of copolymers of (1) and (3) with copolymers of (2) and (3) (e.g. refer to Japanese Kokai Publication No. 2003-221266), and admixture for cement, containing four components, that is, a copolymer (A) of an alkenyl ether AO adduct having 2 to 4 carbon atoms and maleic acid, an unsaturated polyalkylene glycol ether monomer, an alkenyl-free non-polymerizable polyalkylene glycol, and a polymer different from the copolymer (A) (e.g. refer to Japanese Kokai Publication No. 2006-522734).

However, in the case of use for cement compositions or the like, polymers are required to be excellent in various properties, inexpensive and have general versatility. There is still a margin to devise for improving the work efficiency in construction work fields such as civil engineering and construction structural objects and the like, or heightening the properties of concrete or the like by improving the dispersibility and water-reducing capability and improving the retention of fluidity of concrete or the like in production work fields to make the conditions of concrete or the like easier to work on.

DISCLOSURE OF THE INVENTION

Problem to be Solved by the Invention

In view of the above-mentioned state of the art, the invention aims to provide a method for producing an unsaturated (poly)alkylene glycol ether monomer preferably usable for various kinds of uses such as an admixture for cement and the like, and capable of exhibiting high dispersibility for a cement composition and a method for producing a (poly)alkylene glycol chain-containing polymer using the unsaturated (poly) alkylene glycol ether monomer.

Means for Solving the Problem

Inventors of the invention have made various investigations on a method for producing an unsaturated (poly)alkylene glycol ether monomer and have found that a polymer obtained by polymerizing an unsaturated (poly)alkylene glycol ether monomer, which is obtained by adding an alkylene oxide to an unsaturated alcohol in the presence of a prescribed amount of a specified component, with, for example, an unsaturated carboxylic acid has an advantage to improve various properties of a cement composition. Inventors of the invention have found that the alkylene glycol chain length of the obtained unsaturated (poly)alkylene glycol ether monomer can be easily set and adjusted to be a chain length corresponding to the uses. Further, inventors of the invention have made various investigations on a method for producing a (poly)alkylene glycol chain-containing polymer and have found that it is possible to obtain a polymer excellent in the dispersibility of a cement composition, retention of fluidity and the like by allowing a specified amount of a specified component to exist and these findings now superbly solve the above-mentioned problem.

That is, the present invention is an unsaturated (poly)alkylene glycol ether monomer production method for producing an unsaturated (poly)alkylene glycol ether monomer by addition reaction of an alkylene oxide on an unsaturated alcohol, wherein the production method includes a step of carrying out addition reaction under condition of existence of 0.001 to 25 parts by mass of an unsaturated (poly)alkylene glycol diether monomer to 100 parts by mass of the unsaturated alcohol.

The present invention is also a (poly)alkylene glycol chain-containing polymer production method, wherein a monomer component including an unsaturated (poly)alkylene glycol ether monomer produced by the production method.

Hereinafter the invention will be described in more detail.

The invention provides a method for producing an unsaturated (poly)alkylene glycol ether monomer by addition reaction of an alkylene oxide on an unsaturated alcohol. Further, in such a production method, the addition reaction is carried out in the condition of existence of 0.001 to 25 parts by mass of an unsaturated (poly)alkylene glycol diether monomer to 100 parts by mass of the unsaturated alcohol. The content of the unsaturated (poly)alkylene glycol diether monomer is preferably 0.01 to 25 parts by mass, more preferably 0.05 to 20 parts by mass, still more preferably 0.1 to 15 parts by mass, further preferably 0.2 to 10 parts by mass, furthermore preferably 0.3 to 5 parts by mass, and most preferably 0.5 to 3 parts by mass to 100 parts by mass of the unsaturated alcohol containing the unsaturated (poly)alkylene glycol diether monomer as the unsaturated alcohol. The state of the existence of the unsaturated (poly)alkylene glycol diether monomer may be a state of existence as raw materials containing an unsaturated alcohol and an unsaturated (poly)alkylene glycol diether monomer. The state is preferably a state that the raw materials contain 0.001 to 25 parts by mass of the unsaturated (poly)alkylene glycol diether monomer to 100 parts by mass of the unsaturated alcohol (a state that the raw materials contain 25 parts by mass of the unsaturated (poly)alkylene glycol diether monomer to 100 parts by mass of the unsaturated alcohol is more preferable). Preferable examples of such raw materials are unsaturated alcohol compositions which will be described later. Further, it can be achieved by employing an unsaturated alcohol production method described in the following by which an unsaturated (poly)alkylene glycol diether monomer is produced at the time of obtaining the unsaturated alcohol and the method is useful as a production step. As described above, it is preferable that the unsaturated (poly)alkylene glycol diether monomer exists as a byproduct in raw materials, however the unsaturated (poly)alkylene glycol diether monomer may be added to reaction systems by adding it to raw materials or the reaction systems. The unsaturated (poly)alkylene glycol diether monomer may be added in an amount of 0.001 to 25 parts by mass at least once to 100 parts by mass of the unsaturated alcohol during the addition reaction. In this description, "part (s)" means "part (s) by mass" and "unsaturated (poly)alkylene glycol" includes a case where only one alkylene oxide is added. Similarly, each "(poly)alkylene glycol chain", "(poly)oxyalkylene", and "(poly)oxyalkylene glycol" includes a case where only one alkylene oxide is added.

The unsaturated alcohol is to be a main component of the raw materials in the addition reaction step and the main component of the raw materials is preferably in an amount of at least 50% by mass, more preferably in an amount of at least 70% by mass, further preferably in an amount of at least 90% by mass in 100% by mass of the raw materials. It is particularly preferable that the entire amount excluding the unsaturated (poly)alkylene glycol diether monomer is an unsaturated alcohol.

A (poly)alkylene glycol or the like is preferable as a component contained in the raw materials, besides the unsaturated alcohol and the unsaturated (poly)alkylene glycol diether monomer.

The above-mentioned unsaturated alcohol is not especially limited as long as it includes an unsaturated bond-containing group and a hydroxyl group. It is preferable that the unsaturated alcohol includes a double bond-containing group and a hydroxyl group. It is more preferable that the unsaturated alcohol includes one double bond-containing group and one hydroxyl group. Particularly preferably, the above-mentioned alcohol is represented by the following formula (1):

$$X-(OR)_a-OH \qquad (1)$$

(wherein, X denotes an alkenyl group having 2 to 6 carbon atoms; OR may be the same or different and denotes an oxyalkylene group having 2 to 18 carbon atoms; and a is a numeral of 0 to 300 and denotes an average addition mole number of the oxyalkylene group). X denotes an alkenyl group having 2 to 6 carbon atoms. Examples of the alkenyl group (X) are more preferably alkenyl groups having 3 to 5 carbon atoms, further preferably alkenyl groups having 3 to 4 carbon atoms, and especially preferably alkenyl groups having 4 carbon atoms. Specific examples of the alkenyl group (X) are alkenyl groups having 5 carbon atoms such as a 3-methyl-3-butenyl group, a 4-pentenyl group, a 3-pentenyl group, a 2-methyl-2-butenyl group, a 2-methyl-3-butenyl group, a 1,1-dimethyl-2-propenyl group, and the like; alkenyl groups having 4 carbon atoms such as a methallyl group, a 3-butenyl group, a 2-butenyl group, a 1-methyl-2-butenyl group, and the like; and alkenyl groups having 3 carbon atoms such as an allyl group. Among them, a methallyl group, an allyl group, and a 3-methyl-3-butenyl group are preferable and a methallyl group is particularly preferable.

In the general formula, the reference character a is a numeral of 0 to 300. The range of the reference character a is more preferable to be smaller, such as 0 to 200, 0 to 100, 0 to 50, 0 to 25, 0 to 10, and 0 to 4 in this order. Further, as the alkylene oxide addition mole number, the reference character a is preferably 1 or more. The range of a is preferable to be smaller, such as 1 to 50, 1 to 25, 1 to 10, 1 to 5, 1 to 3, 1 to 2, and 1 in this order.

Specific examples of the unsaturated alcohol are alcohols such as methallyl alcohol, allyl alcohol, 3-methyl-3-buten-1-ol, and alkylene oxide adducts of the methallyl alcohol, allyl alcohol, 3-methyl-3-buten-1-ol and the like. Among the alkylene oxide adducts, those with a relatively low alkylene oxide addition mole number a are preferable. Particularly, more preferable examples are methallyl alcohol, allyl alcohol, 3-methyl-3-buten-1-ol, methallyl alcohol-1 EO (obtained by adding 1 mole of ethylene oxide to methallyl alcohol), allyl alcohol-1 EO (obtained by adding 1 mole of ethylene oxide to allyl alcohol), 3-methyl-3-buten-1-ol-1 EO (obtained by adding 1 mole of ethylene oxide to 3-methyl-3-buten-1-ol), methallyl alcohol-2 EO (obtained by adding 2 moles of ethylene oxide to methallyl alcohol), allyl alcohol-2 EO (obtained by adding 2 moles of ethylene oxide to allyl alcohol), and 3-methyl-3-buten-1-ol-2 EO (obtained by adding 2 moles of ethylene oxide to 3-methyl-3-buten-1-ol).

With respect to the production method of an unsaturated (poly)alkylene glycol ether monomer (I-M), a production method of an unsaturated (poly)alkylene glycol ether monomer by adding an alkylene oxide to unsaturated alcohol compositions containing 0.001 to 25 (preferably 0.01 to 20) wt % of the unsaturated (poly)alkylene glycol diether monomer (II-M) and the unsaturated (poly)alkylene glycol defined by the following general formula (1) is also a preferable embodiment of the invention.

$$X\text{---}(OR)_a\text{---}OH \quad (1)$$

(wherein, X denotes an alkenyl group having 2 to 6 carbon atoms; OR may be the same or different and denotes an oxyalkylene group having 2 to 18 carbon atoms; and a is a numeral of 0 to 300 and denotes an average addition mole number of the oxyalkylene group)

The above-mentioned unsaturated (poly)alkylene glycol diether monomer includes an unsaturated bond-containing group, an alkylene glycol part, and a diether bond. With respect to such an unsaturated (poly)alkylene glycol diether monomer, an embodiment in which the unsaturated bond-containing group is bonded to the alkylene glycol part through an ether bond is preferable. More preferable is an embodiment in which two groups containing an unsaturated bond are each bonded to the alkylene glycol part through an ether bond. It is particularly preferable that the unsaturated (poly)alkylene glycol diether monomer is defined by the following general formula (2):

$$X\text{---}O\text{---}(R^1O)_m\text{---}Y \quad (2)$$

(wherein, X and Y are the same or different and denote an alkenyl group having 2 to 6 carbon atoms; $R^1O$ may be the same or different and denotes an oxyalkylene group having 2 to 18 carbon atoms; and m denotes an average addition mole number of the oxyalkylene group and is a numeral of 1 to 300).

X and Y may be the same or different and preferably the same as X described above.

$R^1O$ denotes an oxyalkylene group having 2 to 18 carbon atoms, preferably an oxyalkylene group having 2 to 8 carbon atoms, and more preferably an oxyalkylene group having 2 to 4 carbon atoms. Specifically, one or more of an oxyethylene group, an oxypropylene group, an oxybutylene group, and an oxystyrene group are preferable and particularly, an oxyethylene group is preferable. In the case where two or more oxyalkylene groups exist, it is preferable that oxyethylene groups account for 80% by mole or more. Accordingly, a (poly)alkylene glycol chain-containing polycarboxylic acid copolymer can be provided with excellent cement particle dispersibility and an effect of reducing viscosity of concrete. If it is less than 80% by mole, for example, in a case where a (poly)alkylene glycol chain-containing polymer to be obtained (e.g. a polycarboxylic acid copolymer) is used as an admixture for cement, it may possibly become insufficient to exhibit sufficient dispersibility. In the case where two or more oxyalkylene groups exist, the ratio of oxyethylene groups is more preferably not less than 85% by mole, further preferably not less than 90% by mole, furthermore preferably not less than 95% by mole, and most preferably 100% by mole. In the case where two or more oxyalkylene groups are contained, as a combination, (oxyethylene groups, oxypropylene groups), (oxyethylene groups, oxybutylene groups), or (oxyethylene groups, oxystyrene groups) are preferable. Particularly, (oxyethylene groups, oxypropylene groups) is more preferable. In the case where two or more oxyalkylene groups exist, any existence form such as a block form, a random form, a reciprocal form, or the like is allowed.

The average addition mole number of the alkylene oxide m is properly 1 to 300. The average addition mole number of the oxyalkylene group is more preferable to be in specified ranges in the following order. That is, 1 to 200, 1 to 100, 1 to 50, 1 to 25, 1 to 10, 1 to 5, 1 to 3, and 1 to 2. If the average addition mole number of the oxyalkylene group exceeds 300, it may be possible that the copolymerizable property lowers and the dispersibility lowers. If m is 2 or higher, $R^1O$ may be the same or different.

Specific examples of the unsaturated (poly)alkylene glycol diether monomer are (poly)alkylene glycol dimethallyl ether, (poly)alkylene glycol diallyl ether, and (poly)alkylene glycol di(3-methyl-3-butenyl)ether. More preferable examples are (poly)ethylene glycol dimethallyl ether, (poly)ethylene glycol diallyl ether, and (poly)ethylene glycol di(3-methyl-3-butenyl)ether and furthermore preferable examples are diethylene glycol dimethallyl ether, diethylene glycol diallyl ether, diethylene glycol di(3-methyl-3-butenyl)ether, ethylene glycol dimethallyl ether, ethylene glycol diallyl ether, and ethylene glycol di(3-methyl-3-butenyl)ether.

A production method of the unsaturated alcohol and the unsaturated (poly)alkylene glycol diether monomer is not particularly limited and various kinds of methods are employed preferably. In the case where the unsaturated alcohol is an unsaturated (poly) oxyalkylene glycol ether, it is preferable to obtain the unsaturated alcohol by a step (step 1) of producing the unsaturated alcohol by carrying out reaction of a halide having an unsaturated bond (referred to also as an "unsaturated group-containing halide") and a (poly) oxyalkylene glycol. In this case, an unsaturated (poly)alkylene glycol diether monomer can be obtained as a byproduct together with the unsaturated alcohol.

The reaction temperature of step 1 slightly differs depending on a halide having an unsaturated bond and a (poly) alkylene glycol to be used for the reaction and is not particularly limited, however it is preferably 40° C. to 150° C., more preferably 50° C. to 100° C., and even more preferably 55° C. to 75° C. The pressure at the time of the reaction may be reduced pressure, normal pressure, or pressurized pressure, however reaction under normal pressure is sufficient. It is preferable that an alkaline compound is used for the above-mentioned reaction. The amount of an alkaline compound to be used for the reaction is preferably 0.5 equivalent to 2.0 equivalent, more preferably 0.9 equivalent to 1.5 equivalent, and even more preferably 1.0 equivalent to 1.2 equivalent to the unsaturated group-containing halide. The amount of a (poly)alkylene glycol to be used for the reaction is preferably 1.5 equivalent to 10 equivalent, more preferably 3 equivalent to 7 equivalent, and even more preferably 4 equivalent to 6 equivalent to the unsaturated group-containing halide. If the amount of an alkylene glycol is too small, the production amount of the diether form (e.g. unsaturated (poly)alkylene glycol diether monomer) is increased and if it is too large, it results in decrease in productivity. A supply method of raw materials to a reactor may be collective loading in an initial stage or successive loading. In one example, first, reaction of an alkylene glycol and an alkaline compound is carried out to produce an intermediate and thereafter an unsaturated group-containing halide is fed, and reaction is carried out. In step 1, it is preferable to use an alkaline compound as a halogen trapping agent and for example, in the reaction, a base may be used as a halogen trapping agent. The base may include alkali metal hydroxides such as sodium hydroxide and potassium hydroxide, alkaline earth metal hydroxides such as calcium hydroxide, alkali metal carbonates such as sodium carbonate and sodium hydrogen carbonate, and alkaline earth metal carbonates. The alkaline compound may be loaded to the reactor as it is. Alternatively, the alkaline compound may be loaded to the reactor using water or other dispersants.

In step 1, the unsaturated group-containing halide is preferably a halide having an alkenyl group having 2 to 6 carbon atoms. Specific examples of the unsaturated bond-containing halide are one or more of methallyl chloride, 3-methyl-3-butenyl chloride, allyl chloride, 3-butenyl chloride, 4-pentenyl chloride, and the like. Methallyl chloride, 3-methyl-3-butenyl chloride, and allyl chloride are more preferable and methallyl chloride is even more preferable. A more preferable form of the alkenyl group of the halide is the same form as that denoted by X in general formula (1). A halogen atom bonded to the alkenyl group is not particularly limited and preferably a chlorine atom or a bromine atom. Particularly, in term of coloration prevention of a product and suppression of deterioration of the polymerization property in the polymerization step, a chlorine atom is more preferable.

In step 1, (poly)alkylene glycol (referred to also as a "(poly) oxyalkylene glycol") is preferably those containing an alkylene oxide repeated 1 to 4 times. If the alkylene oxide chain of the (poly)alkylene glycol is long (an alkylene oxide is repeated 5 times or more), the boiling point of the unsaturated alcohol to be produced in step 1 becomes high. In this case, because of the high boiling point, it becomes difficult to carry out industrial distillation and refining even by reduced pressure distillation or the like and it may possibly become impossible to obtain an unsaturated alcohol with high purity. More preferable examples of the (poly) oxyalkylene glycol are those containing an alkylene oxide repeated 1 to 2 times. Those containing an alkylene oxide repeated 1 to 4 times may include those containing 1 to 4 alkylene oxide structures and in the case of those containing 2 or more of such structures, the alkylene oxide structures may be the same or may include different alkylene oxide structures.

The (poly)alkylene glycol is defined by a general formula, HO—(A$^1$O)—H. In the formula, A$^1$O denotes an oxyalkylene group having 2 to 18 carbon atoms and in the case where n is 2 or higher, A$^1$O may denote the same group or different groups and n denotes an average addition mole number of the oxyalkylene group of the alkylene group and is in a range of 1 to 300. Specific examples of the (poly)alkylene glycol are preferably glycols such as ethylene glycol, propylene glycol, isobutylene glycol, butylene glycol, and styrene glycol, polyalkylene glycols such as polyethylene glycol, polypropylene glycol, polyisobutylene glycol, polybutylene glycol, and polystyrene glycol, and copolymers of different alkylene glycols such as (poly)ethylene glycol-(poly)propylene glycol, (poly)ethylene glycol-(poly)butylene glycol, (poly)ethylene glycol-(poly)styrene glycol, and (poly)propylene glycol-(poly)butylene glycol.

Particularly preferable examples among the (poly)alkylene glycols are glycols such as ethylene glycol, propylene glycol, isobutylene glycol, butylene glycol, and styrene glycol, polyalkylene glycols with 4 or less alkylene glycol addition mole number such as polyethylene glycol, polypropylene glycol, polyisobutylene glycol, polybutylene glycol, and polystyrene glycol, and copolymers of different alkylene glycols with 4 or less alkylene glycol addition mole number such as (poly) ethylene glycol-(poly)propylene glycol, (poly)ethylene glycol-(poly)butylene glycol, (poly)ethylene glycol-(poly)styrene glycol, and (poly)propylene glycol-(poly)butylene glycol.

Still more preferable examples are glycols such as ethylene glycol, propylene glycol, isobutylene glycol, butylene glycol, and styrene glycol; dialkylene glycols such as diethylene glycol, dipropylene glycol, diisobutylene glycol, dibutylene glycol, and distyrene glycol; and dialkylene glycol copolymers of different alkylene glycols such as ethylene glycol-propylene glycol, ethylene glycol-butylene glycol, ethylene glycol-styrene glycol, and propylene glycol-butylene glycol. Most preferable examples are ethylene glycol, propylene glycol, diethylene glycol, and dipropylene glycol. As the (poly) alkylene glycol, those with industrially available purity may be used and the purity is preferably not less than 98% by mass and more preferably not less than 99% by mass and in the case of using a polyhydric alcohol with a low purity, it may be used after the purity is heightened by a publicly known method by distillation or treatment using a dehydration agent.

In step 1, reaction of an unsaturated bond-containing halide and a (poly)alkylene glycol may be carried out and any of the above-mentioned compounds may be used, however preferable combinations of (unsaturated group-containing halide, (poly)alkylene glycol) are (methallyl chloride, ethylene glycol), (methallyl chloride, diethylene glycol), (methallyl chloride, propylene glycol), (methallyl chloride, dipropylene glycol), (methallyl chloride, ethylene glycol-propylene glycol), (3-methyl-3-butenyl chloride, ethylene glycol), (3-methyl-3-butenyl chloride, diethylene glycol), (3-methyl-3-butenyl chloride, propylene glycol), (3-methyl-3-butenyl chloride, dipropylene glycol), (3-methyl-3-butenyl chloride, ethylene glycol-propylene glycol), (allyl chloride, ethylene glycol), (allyl chloride, diethylene glycol), (allyl chloride, propylene glycol), (allyl chloride, dipropylene glycol), (allyl chloride, ethylene glycol-propylene glycol), and the like. Particularly preferable examples are (methallyl chloride, ethylene glycol), (methallyl chloride, diethylene glycol), (3-methyl-3-butenyl chloride, ethylene glycol), (3-methyl-3-butenyl chloride, diethylene glycol), (allyl chloride, ethylene glycol) and (allyl chloride, diethylene glycol).

A production method involving the step of producing an unsaturated alcohol by carrying out reaction of an unsaturated group-containing halide and a (poly)oxyalkylene glycol in the above-mentioned manner is also one of preferable embodiments of the invention and employment of such a production method makes efficient and low cost production of an unsaturated alcohol possible. Further, it is also made possible to produce an unsaturated alcohol composition containing an unsaturated alcohol and an unsaturated (poly)alkylene glycol diether monomer.

In the case of using the unsaturated alcohol obtained in step 1 for production of an unsaturated (poly)alkylene glycol ether monomer, the unsaturated alcohol is preferable to be a refined product obtained in step 1. Refining of the product obtained in step 1 increases the purity of the unsaturated alcohol and in the case of producing the unsaturated (poly)alkylene glycol ether monomer, the yield can be increased. The refining step is preferable to be carried out after step 1 and before the production of the unsaturated (poly)alkylene glycol ether monomer and a refined product obtained accordingly is preferable to be used for producing the unsaturated (poly)alkylene glycol ether monomer. That is, as the above-mentioned production method, a production method involving a step of refining the product obtained in step 1 is also one of preferable embodiments of the invention.

In the refining step, a method for refining the product obtained in step 1 is not particularly limited and a method of distillation, crystallization, and extraction or a method of combining them is preferable to carry out the refining. Further, a method of removing water contained the product may be carried out using a dehydration agent or an adsorbent and for example, magnesium sulfate or molecular sieves may be used.

The refining step is preferable to lower the water content of the refined product to 2% by mass or lower. That is, it is preferable that the water content of the unsaturated alcohol obtained in step 1 is lowered to 2% by mass or less and the water content is lowered to 2% by weight or less in 100% by mass of the product after the refining by carrying out the refining step between the above-mentioned step 1 and a step (step 2) of carrying out reaction of adding an alkylene oxide mentioned below. It is more preferably not more than 1% by mass, further preferably not more than 0.5% by mass, furthermore preferably not more than 0.25% by mass, and most preferably not more than 0.1% by mass. If the water content is high, in the case of carrying out alkylene oxide addition reaction in step 2, the amount of (poly)alkylene glycol as a byproduct is undesirably increased.

With respect to the refining step, as described above, refining may be carried out by various methods and the methods are not particularly limited as long as the methods are capable of decreasing the water content of the refined product to 2% by mass or less, however it is preferable to carry out a step of distilling the product obtained in step 1 (distillation step). Distillation of the product obtained in step 1 easily heightens the purity of the unsaturated alcohol industrially advantageously as compared with other methods and in the case the unsaturated alcohol is used as a raw material, the production yield is increased in steps thereafter. In such a manner, a production method of a polymer having a (poly)alkylene glycol ether chain (e.g. a polycarboxylic acid copolymer or the like) involving the above-mentioned refining step for the product obtained in step 1 is also one of preferable embodiments of the invention.

In the distillation step, the distillation operation may be carried out in one stage, and in two or more stages such as a rough distillation step for removing water in the system and a fine distillation step. Further, a method involving rough distillation for removing water in the stage in which an alkylene glycol and an alkaline compound are reacted first and thereafter, reaction of an unsaturated group-containing halide and refining by distillation may be employed. In a rough distillation step for removing water, it is preferable to employ an apparatus including an oil-water separation tank and a distilled solution is subjected to oil-water separation and the oil layer is returned to the system and only the water layer is taken out to lessen the loss of the intended compound. In this step, a single distillation step or several distillation steps may be installed. Further, to remove water more efficiently, for example, an azeotropic agent such as cyclohexane or toluene may be used. As the distillation apparatus, it is preferable to employ a packed tower or a plate tower and carry out distillation while refluxing the product. At the time of distillation, the temperature is preferable to be 180° C. or lower as a temperature of the bottom of *the packed tower or the plate tower and more preferable to be 150° C. or lower. It is because if the temperature is too high, polymerization of the unsaturated group part and decomposition of the intended compound may possibly be caused. The optimum operation pressure at the time of distillation differs depending on the unsaturated alcohol to be produced, it may be set in a manner that the temperature is within the above-mentioned temperature range. The entire or a part of the (poly)alkylene glycol to be recovered in the refining step may be reused as a raw material. Further, a method for separating and removing a halide of the alkaline compound produced in step 1 such as sodium chloride, calcium chloride or the like is not particularly limited, however for example, it can be separated by solid-liquid separation using an apparatus such as a pressure filter or a centrifugal separator. The separation and removal of the halide of the alkaline compound may be carried out immediately after the reaction of step 1, or after or during the refining step.

The unsaturated (poly)alkylene glycol ether monomer is obtained by addition reaction of an alkylene oxide to an unsaturated alcohol and as the unsaturated alcohol, the above-mentioned compounds are preferable. The alkylene oxide to be added to the unsaturated alcohol is preferably an alkylene oxide having 2 to 18 carbon atoms. It is more preferably an alkylene oxide having 2 to 8 carbon atoms and furthermore preferably an alkylene oxide having 2 to 4 carbon atoms. Specifically, one or more kind alkylene oxides of ethylene oxide, propylene oxide, butylene oxide, and styrene oxide are preferable and particularly ethylene oxide is preferable. In the case of adding two or more kinds of alkylene oxides, it is preferable that the ratio of ethylene oxide is 80% by mole or more. Accordingly, while balance between hydrophilicity and hydrophobicity is maintained, the (poly)alkylene glycol chain-containing polycarboxylic acid copolymer obtained by polymerizing an unsaturated (poly)alkylene glycol ether monomer can be provided with excellent cement particle dispersibility or an effect of reducing the viscosity of concrete. If it is less than 80% by mole, the hydrophobicity of the unsaturated (poly)alkylene glycol ether monomer becomes stronger, and therefore, the obtained polymer has strong hydrophobicity, which possibly causes a reduction in dispersibility of cement particles and hardening retardation. It is more preferably not less than 85% by mole, further preferably not less than 90% by mole, even more preferably not less than 95% by mole, and most preferably 100% by mole.

In the case two or more kinds of alkylene oxides are added, the combination is preferably (ethylene oxide, propylene oxide), (ethylene oxide, butylene oxide), and (ethylene oxide, styrene oxide). Particularly, (ethylene oxide, propylene oxide) is more preferable.

In the case of adding two or more kinds of alkylene oxides, respective addition methods may be any addition form such as block type addition, random type addition, reciprocal addition, or the like. The step of producing an unsaturated (poly)alkylene glycol ether monomer having a polyalkylene oxide chain by adding an alkylene oxide to an unsaturated alcohol is called as step 2. It is preferable in step 2 to use unsaturated (poly)alkylene glycol ether monomer as the unsaturated alcohol. The unsaturated alcohol to be used in step 2 is the product produced in step 1. It is more preferably an unsaturated alcohol obtained by refining the product obtained in step 1. In such a manner, refining of the product obtained in step 1 heightens the purity of the unsaturated alcohol and improves the yield in step 2 and step 3, which will be described later. The refining step is carried out between steps 1 and 2 and it is a production method involving refining of the unsaturated alcohol after step 1 and before step 2. It is preferable that the obtained refined product is used in step 2. In the step 2, if the alkylene oxide is added to an unsaturated (poly)alkylene glycol ether monomer, which is a preferable embodiment of the unsaturated alcohol, an unsaturated (poly)alkylene glycol ether monomer having an addition number of the alkylene oxide larger than that of the unsaturated (poly)alkylene glycol ether monomer before the addition reaction can be obtained.

In the addition reaction, the reaction temperature is preferably in a range of 80 to 170° C. It is more preferably 90 to 160° C. and even more preferably 100 to 150° C. If the addition reaction temperature is too high, byproducts tend to be increased and for example, in the case of obtaining a polymer for a cement dispersant using the obtained reaction product, capabilities such as the water-reducing capability tend to be lowered. On the other hand, if it is too low, the addition speed becomes slow to lower the productivity and it is not preferable. In step 2, the reaction time is preferably within 50 hours. It is more preferably within 40 hours and even more preferably within 30 hours. If the reaction time is too long, byproducts tend to be increased. The addition reaction is preferable to be carried out under a pressurized condition. The pressure at the start of the addition reaction is preferably 0.01 to 0.5 MPa. It is more preferably 0.05 to 0.3 MPa and even more preferably 0.1 to 0.2 MPa. The pressure at the time of addition reaction is preferably not more than 0.9 MPa.

In the addition reaction, it is preferable to use a catalyst. Preferable examples of the catalyst are metal hydroxides such as sodium hydroxide, potassium hydroxide, lithium hydroxide, and magnesium hydroxide; metal hydrides such as sodium hydride and potassium hydride; organometal compounds such as butyllithium, methyllithium, and phenyllithium; Lewis acids such as boron trifluoride and titanium tetrachloride; and metal alkoxides such as sodium methoxide and potassium methoxide. It is more preferably sodium hydroxide, potassium hydroxide, sodium hydride, and boron trifluoride and further preferably sodium hydroxide and potassium hydroxide. With respect to the concentration of the catalyst, the weight ratio of the catalyst to the theoretical amount of alkylene oxide adduct calculated from the loaded raw material is preferably not more than 10000 ppm. It is more preferably not more than 8000 pm, furthermore preferably not more than 5000 ppm, and most preferably not more than 3000 ppm. If the catalyst concentration is too high, a large quantity of byproducts tend to be produced. It is more preferably not more than 1000 pm, furthermore preferably not more than 800 ppm, particularly preferably not more than 500 ppm, and particularly preferably not more than 300 ppm. If the catalyst amount is too low, the speed and productivity of the alkylene oxide addition reaction are lowered and therefore, it is preferably not lower than 50 ppm. It is more preferably not lower than 100 pm, furthermore preferably not lower than 150 ppm, particularly preferably not lower than 200 ppm, and most preferably not lower than 250 ppm. In step 2, the addition reaction may be carried out in a batch manner or a continuous manner and it may be properly selected in accordance with reaction conditions and the like.

The unsaturated (poly)alkylene glycol ether monomer is those respectively having a group containing an unsaturated bond, an alkylene glycol portion, and an ether bond. Such an unsaturated (poly)alkylene glycol ether monomer may be obtained by addition reaction of the alkylene oxides on the unsaturated alcohols. Specifically, it is preferable that the unsaturated (poly)alkylene glycol ether monomer is defined by the following general formula (3):

$$X\text{—}O\text{—}(R^2O)_n\text{—}R^3 \qquad (3)$$

(wherein, X denotes an alkenyl group having 2 to 6 carbon atoms; $R^2O$ may be the same or different and denotes an oxyalkylene group having 2 to 18 carbon atoms; n is a numeral of 1 to 300 and denotes an average addition mole number of the oxyalkylene group; and $R^3$ denotes a hydrogen atom or a hydrocarbon group having 1 to 20 carbon atoms).

In general formula (3), X is preferably the same as described above.

$R^2O$ denotes an alkylene oxide portion added to an unsaturated alcohol. That is, an oxyalkylene group having 2 to 18 carbon atoms may be mentioned as $R^2O$, and the preferable embodiment mentioned above in the oxyalkylene group may be mentioned as preferable embodiments of $R^2O$.

It is proper for the average addition mole number n of the alkylene oxide to be added to be 1 to 300. The average addition mole number is preferably high to a certain extent and preferably not lower than specified values in the following order (more preferable to be higher numerals). That is, it is preferably not lower than 10, not lower than 25, not lower than 35, not lower than 50, not lower than 75, not lower than 100, not lower than 110, not lower than 120, not lower than 135, not lower than 150, not lower than 160, not lower than 170, and not lower than 180. Further, the average addition mole number is preferably not to be so high and preferably not higher than specified values in the following order (more preferable to be smaller numerals). That is, it is preferably not higher than 280, not higher than 250, not higher than 225, and not higher than 200. Further, a range of the average addition mole number n of the alkylene oxide is also preferable to be a range of 110 to 180. The range is more preferably 110 to 170, and still more preferably 120 to 160, and particularly preferably 130 to 150. As the average addition mole number is smaller, the hydrophilicity is lowered more and the effect to repel cement particles is lowered more and therefore, the dispersibility of the copolymer to be obtained may possibly be lowered and on the other hand, if the average addition mole number exceeds 300, in the case an unsaturated (poly)alkylene glycol ether monomer is used for copolymerization, the copolymerization reactivity may possible be lowered.

$R^3$ is preferably hydrogen, a linear or branched alkyl group having 1 to 10 carbon atoms, phenyl group, alkyl-substituted phenyl group, alkenyl group, or alkynyl group. It is more preferably a hydrogen atom, a linear or branched alkyl group having 1 to 6 carbon atoms, phenyl group, alkyl-substituted phenyl group, alkenyl group, or alkynyl group, further preferably a hydrogen atom, a linear or branched alkyl group having 1 to 4 carbon atoms, phenyl group, alkyl-substituted phenyl group, alkenyl group, or alkynyl group, and particularly preferably a hydrogen atom, a methyl group or an ethyl group.

Specific examples of the (poly)alkylene glycol ether monomer are preferably (poly)alkylene glycol methallyl ethers, (poly)alkylene glycol allyl ethers, (poly)alkylene glycol 3-methyl-3-butenyl ethers, and the like. Specifically, polyethylene glycol methallyl ethers, polyethylene glycol allyl ethers, and polyethylene glycol 3-methyl-3-butenyl ethers are preferable. Further, polyethylene glycol methallyl ethers are even more preferable.

As mentioned above, the preferable embodiments of the present invention also include an unsaturated (poly)alkylene glycol ether monomer production method, wherein the unsaturated (poly)alkylene glycol diether monomer is defined by the following general formula (2):

$$X\text{—}O\text{—}(R^1O)_m\text{—}Y \qquad (2)$$

(wherein, X and Y may be the same or different and denote an alkenyl group having 2 to 6 carbon atoms; $R^1O$ may be the same or different and denotes an oxyalkylene group having 2 to 18 carbon atoms; and m denotes an average addition mole number of the oxyalkylene group and is a numeral of 1 to 300) and the unsaturated (poly)alkylene glycol ether monomer is defined by the following general formula (3):

$$X\text{—}O\text{—}(R^2O)_n\text{—}R^3 \qquad (3)$$

(wherein, X denotes an alkenyl group having 2 to 6 carbon atoms; $R^2O$ may be the same or different and denotes an oxyalkylene group having 2 to 18 carbon atoms; n is a numeral of 1 to 300 and denotes an average addition mole number of the oxyalkylene group; and $R^3$ denotes a hydrogen atom or a hydrocarbon group having 1 to 20 carbon atoms).

It is preferable that the unsaturated alcohol produced in the step 1 is used in the above-mentioned unsaturated (poly) alkylene glycol ether monomer production method. That is, the preferable embodiments of the present invention also include an unsaturated (poly)alkylene glycol ether monomer production method for producing an unsaturated (poly)alkylene glycol ether monomer by addition reaction of an alkylene oxide on an unsaturated alcohol, wherein the unsaturated alcohol is obtained by causing reaction of a halide having an unsaturated bond and a (poly)alkylene glycol.

The present invention is also an unsaturated alcohol composition to be used for a method for producing an unsaturated (poly)alkylene glycol ether monomer by addition reaction of an alkylene oxide, wherein the unsaturated alcohol composition includes an unsaturated alcohol and an unsaturated (poly)alkylene glycol diether monomer, the unsaturated alcohol is defined by the following general formula (4):

$$X-(OR)_b-OH \quad (4)$$

(wherein, X denotes an alkenyl group having 2 to 6 carbon atoms; OR may be the same or different and denotes an oxyalkylene group having 2 to 18 carbon atoms; and b is a numeral of 1 to 300 and denotes an average addition mole number of the oxyalkylene group) and the unsaturated (poly)alkylene glycol diether monomer is defined by the following general formula (2):

$$X-O-(R^1O)_m-Y \quad (2)$$

(wherein, X and Y may be the same or different and denote an alkenyl group having 2 to 6 carbon atoms; $R^1O$ may be the same or different and denotes an oxyalkylene group having 2 to 18 carbon atoms; and m denotes an average addition mole number of the oxyalkylene group and is a numeral of 1 to 300) and the unsaturated alcohol composition contains 0.001 to 25 parts by mass of the unsaturated (poly)alkylene glycol diether monomer to 100 parts by mass of the unsaturated alcohol.

The unsaturated alcohol composition contains 0.001 to 25 parts by mass of the unsaturated (poly)alkylene glycol diether monomer to 100 parts by mass of the unsaturated alcohol. Such an unsaturated alcohol composition can be used preferably as a raw material in the production of the above-mentioned unsaturated (poly)alkylene glycol ether monomer. If b in the above general formula (4) is 1 to 10, the content of the unsaturated (poly)alkylene glycol diether monomer is preferably 0.05 to 20 parts by mass, more preferably 0.1 to 15 parts by mass, further preferably 0.2 to 10 parts by mass, particularly preferably 0.3 to 5 parts by mass, and most preferably 0.5 to 3 parts by mass to 100 parts by mass of the unsaturated alcohol. Further, if b in the above general formula (4) is more than 10, the content of the unsaturated (poly) alkylene glycol diether monomer is preferably 0.0025 to 15 parts by mass, more preferably 0.005 to 10 parts by mass, further preferably 0.01 to 5 parts by mass, and most preferably 0.015 to 3 parts by mass to 100 parts by mass of the unsaturated alcohol.

The unsaturated alcohol contained in the unsaturated alcohol composition is defined by general formula (4). In general formula (4), b denotes an average addition mole number of the oxyalkylene group. The reference numeral b is preferable to be smaller, such as 1 to 200, 1 to 100, 1 to 50, 1 to 25, 1 to 10, 1 to 4, 1 to 3, 1 to 2, and 1 in this order.

In general formula (4), X and OR are preferable to be the same as those described above. Further, the unsaturated (poly)alkylene glycol diether monomer is preferable to be the same as described above. That is, X, Y, $R^1O$, and m in general formula (2) and the specific examples of the unsaturated (poly)alkylene glycol diether monomer are preferably the same as those described above.

The unsaturated alcohol composition may be obtained by mixing an unsaturated alcohol and an unsaturated (poly)alkylene glycol diether monomer, and it is preferable to obtain the unsaturated alcohol composition by an unsaturated alcohol production method which produces an unsaturated (poly) alkylene glycol diether monomer as a byproduct. That is, the unsaturated alcohol composition obtained by reaction of an unsaturated bond-containing halide and a (poly)alkylene glycol is also one of preferable embodiments of the invention.

In the reaction of the unsaturated bond-containing halide and (poly)alkylene glycol, the unsaturated bond-containing halide, (poly)alkylene glycol, and the reaction conditions are preferably the same as described above. In this case, it is made possible to obtain the composition containing the unsaturated alcohol and the unsaturated (poly)alkylene glycol diether monomer in the step 1 and if necessary, other steps such as a distillation step and a step of adjusting the ratio of the unsaturated alcohol and the unsaturated (poly)alkylene glycol diether monomer may be carried out.

Other components contained in the unsaturated alcohol composition are not particularly limited as long as they do not inhibit the stability of the unsaturated alcohol composition. For example, in the case where the unsaturated alcohol composition is obtained by reaction of the unsaturated bond-containing halide and (poly)alkylene glycol, various kinds of byproducts or the like remaining after reaction may be contained.

The present invention is also a (poly)alkylene glycol chain-containing polymer production method by polymerizing a monomer component including an unsaturated (poly)alkylene glycol ether monomer, wherein the production method includes a step of carrying out polymerization under condition that 0.001 to 20 parts by mass of an unsaturated (poly) alkylene glycol diether monomer is contained to 100 parts by mass of an unsaturated (poly)alkylene glycol ether monomer. In the invention, a (poly)alkylene glycol chain-containing polymer obtained by polymerization under a condition that the unsaturated (poly)alkylene glycol diether monomer is contained can exhibit excellent characteristics such as cement composition dispersibility and the fluidity retaining property and is thus preferably usable for various uses such as an admixture for cement, an inorganic pigment dispersant, a builder for detergents, and the like.

In the above-mentioned (poly)alkylene glycol chain-containing polymer production method, polymerization reaction is carried out under a condition that 0.001 to 20 parts by mass of an unsaturated (poly)alkylene glycol diether monomer exists to 100 parts by mass of an unsaturated (poly)alkylene glycol ether monomer. If it is less than 0.001% by mass, the (poly)alkylene glycol chain-containing polymer to be obtained may not possibly become sufficiently excellent in the cement composition dispersibility, the fluidity retaining property and the like, and if it exceeds 20% by mass, the cement composition dispersibility may possibly be deteriorated. If b in the above general formula (4) is 1 to 10, the content of the unsaturated (poly)alkylene glycol diether monomer is preferably 0.05 to 20 parts by mass, more preferably 0.1 to 15 parts by mass, further preferably 0.2 to 10 parts by mass, particularly preferably 0.3 to 5 parts by mass, and most preferably 0.5 to 3 parts by mass to 100 parts by mass of the unsaturated (poly)alkylene glycol ether monomer. If b in the above general formula (4) is more than 10, the content of the unsaturated (poly)alkylene glycol diether monomer is preferably 0.0025 to 15 parts by mass, more preferably 0.005 to 10 parts by mass, further preferably 0.01 to 5 parts by mass, and particularly preferably 0.015 to 3 parts by mass to 100 parts by mass of the unsaturated (poly)alkylene glycol ether monomer.

An embodiment in which the unsaturated (poly)alkylene glycol diether monomer is contained may be preferably (1) an embodiment in which raw materials containing both of an unsaturated (poly)alkylene glycol ether monomer and an unsaturated (poly)alkylene glycol diether monomer are used and (2) an embodiment in which an unsaturated (poly)alkylene glycol diether monomer is added to raw materials or the reaction system to make the reaction system contain the unsaturated (poly)alkylene glycol diether monomer and either one may be used or both may be used in combination. In the case the unsaturated (poly)alkylene glycol ether monomer obtained in the above-mentioned production method is used as a raw material, the unsaturated (poly)alkylene glycol diether monomer is to be contained as a byproduct and therefore, the embodiment (1) can simplify the production process and it is convenient in terms of the production process.

In embodiment (1), it is preferable to be an embodiment where 0.001 to 20 parts by mass of the unsaturated (poly)alkylene glycol diether monomer is contained to 100 parts by mass of the unsaturated (poly)alkylene glycol ether monomer in raw materials. In this case, it is preferable to employ a production method or production raw materials by which the unsaturated (poly)alkylene glycol diether monomer is contained at the time of obtaining the unsaturated (poly)alkylene glycol ether monomer and for example, it is made possible by using the unsaturated (poly)alkylene glycol ether monomer obtained in the above-mentioned production method as a raw material and thus, the unsaturated (poly)alkylene glycol ether monomer is useful as a raw material. As described above, existence of the unsaturated (poly)alkylene glycol diether monomer as a byproduct in the raw materials is a preferable embodiment. That is, a method of producing the (poly)alkylene glycol chain-containing polymer by polymerizing monomer components including the unsaturated (poly)alkylene glycol ether monomer, that is, a production method of producing the (poly)alkylene glycol chain-containing polymer involving a step of polymerization using monomer raw materials containing 0.001 to 20% by mass of the unsaturated (poly)alkylene glycol diether monomer as the unsaturated (poly)alkylene glycol ether monomer, is also one of preferable embodiments of the invention.

The composition including the unsaturated (poly)alkylene glycol ether monomer and other components, such as the above-mentioned monomer raw material, is also referred to as an unsaturated (poly)alkylene glycol ether monomer composition.

It is preferable that the above-mentioned unsaturated (poly)alkylene glycol ether monomer composition contains 0.001 to 20% by mass of the unsaturated (poly)alkylene glycol diether monomer. If it is less than 0.001% by mass, the (poly)alkylene glycol chain-containing polymer to be obtained may not possibly become sufficiently excellent in the cement composition dispersibility, the fluidity retaining property, and the like and if it exceeds 20% by mass, the cement composition dispersibility may possibly be deteriorated. The content of the unsaturated (poly)alkylene glycol diether monomer is preferably 0.0025 to 15% by mass, more preferably 0.005 to 10% by mass, further preferably 0.01 to 5% by mass, and most preferably 0.015 to 3% by mass to 100% by mass of the unsaturated (poly)alkylene glycol ether monomer composition.

The above-mentioned unsaturated (poly)alkylene glycol ether monomer is not especially limited as long as it contains an unsaturated bond-containing group, an alkylene glycol part, and an ether bond. It is preferable that the unsaturated (poly)alkylene glycol ether monomer is defined by the following general formula (3):

$$X\text{—}O\text{—}(R^2O)_n\text{—}R^3 \quad (3)$$

(wherein, X denotes an alkenyl group having 2 to 6 carbon atoms; $R^2O$ may be the same or different and denotes an oxyalkylene group having 2 to 18 carbon atoms; n is a numeral of 1 to 300 and denotes an average addition mole number of the oxyalkylene group; and $R^3$ denotes a hydrogen atom or a hydrocarbon group having 1 to 20 carbon atoms). In the formula, X, $R^2O$, n, and $R^3$ are preferably the same as described above, respectively.

The unsaturated (poly)alkylene glycol ether monomer is not particularly limited as long as it has the above-mentioned structure, and it is preferable to be obtained by the above-mentioned production method of addition reaction of an alkylene oxide to an unsaturated alcohol.

The unsaturated (poly)alkylene glycol diether monomer includes a group having an unsaturated bond, an alkylene glycol portion, and a diether bond. Such unsaturated (poly)alkylene glycol diether monomer is preferable to have an embodiment in which the group having an unsaturated bond and the alkylene glycol portion are bonded by the ether bond. More preferably, two groups containing an unsaturated bond are each bonded to the alkylene glycol portion by the ether bond. Specifically, it is preferable that the unsaturated (poly)alkylene glycol diether monomer is defined by the following general formula (2):

$$X\text{—}O\text{—}(R^1O)_m\text{—}Y \quad (2)$$

(wherein, X and Y may be the same or different and denote an alkenyl group having 2 to 6 carbon atoms; $R^1O$ may be the same or different and denotes an oxyalkylene group having 2 to 18 carbon atoms; and m denotes an average addition mole number of the oxyalkylene group and is a numeral of 1 to 300). In the formula, X, $R^1O$, m, and Y are preferably the same as those described above, respectively.

In addition, an embodiment in which the above-mentioned unsaturated (poly)alkylene glycol ether monomer composition contains the unsaturated (poly)alkylene glycol diether monomer defined by the above formula (2) is preferable. It is more preferable that the content of the unsaturated (poly)alkylene glycol diether monomer is within the above-mentioned preferable range.

The preferable embodiments of the present invention include a (poly)alkylene glycol chain-containing polymer production method, wherein the unsaturated (poly)alkylene glycol diether monomer is defined by the following general formula (2):

$$X\text{—}O\text{—}(R^1O)_m\text{—}Y \quad (2)$$

(wherein, X and Y may be the same or different and denote an alkenyl group having 2 to 6 carbon atoms; $R^1O$ may be the same or different and denotes an oxyalkylene group having 2 to 18 carbon atoms; and m denotes an average addition mole number of the oxyalkylene group and is a numeral of 1 to 300) and the unsaturated (poly)alkylene glycol ether monomer is defined by the following general formula (3):

$$X\text{—}O\text{—}(R^2O)_n\text{—}R^3 \quad (3)$$

(wherein, X denotes an alkenyl group having 2 to 6 carbon atoms; $R^2O$ may be the same or different and denotes an oxyalkylene group having 2 to 18 carbon atoms; n is a numeral of 1 to 300 and denotes an average addition mole number of the oxyalkylene group; and $R^3$ denotes a hydrogen atom or a hydrocarbon group having 1 to 20 carbon atoms).

The preferable embodiments of the present invention also include an unsaturated polyalkylene glycol ether monomer production method, wherein an alkylene oxide is added to an unsaturated alcohol composition including a (poly)alkylene glycol as the unsaturated alcohol defined by the above general formula (1) and 0.001 to 25 (preferably 0.001 to 20) wt % of the unsaturated (poly)alkylene glycol diether monomer (II-M).

In a production method of a polymer having a polyalkylene glycol chain obtained by polymerizing monomer components (M) containing the unsaturated polyalkylene glycol ether monomer (I-M) defined by the following general formula (3), a production method of a (poly)alkylene glycol chain-containing polymer using an unsaturated polyalkylene glycol ether monomer composition which accounts for 10 wt % or more in all the components and which contains the unsaturated polyalkylene glycol ether monomer and 0.001 to 20 wt % of an unsaturated (poly)alkylene glycol diether monomer (II-M) defined by the following general formula (2), is also one of preferable embodiments of the invention.

$$X\text{—}O\text{—}(R^2O)_n\text{—}R^3 \quad (3)$$

X denotes an alkenyl group having 2 to 6 carbon atoms; $R^2O$ denotes an oxyalkylene group having 2 to 18 carbon atoms; and in the case n is 2 or higher, $R^2O$ may denote respectively the same or different groups; n denotes an average addition mole number of the oxyalkylene group and is a numeral of 1 to 300; and $R^3$ denotes a hydrogen atom or a hydrocarbon group having 1 to 20 carbon atoms.

$$X\text{—}O\text{—}(R^1O)_m\text{—}Y \quad (2)$$

X and Y independently denote an alkenyl group having 2 to 6 carbon atoms; $R^1O$ denotes an oxyalkylene group having 2 to 18 carbon atoms; and in the case m is 2 or higher, $R^1O$ may denote respectively the same or different groups; and m denotes an average addition mole number of the oxyalkylene group and is a numeral of 1 to 300.

The present invention is also a polyalkylene glycol chain-containing polymer produced by the above-mentioned polyalkylene glycol chain-containing polymer production method and also a polyalkylene glycol chain-containing polymer composition produced by such a production method. The polyalkylene glycol chain-containing polymer composition means a composition including the polyalkylene glycol chain-containing polymer and other components such as a monomer.

In the method of producing the (poly)alkylene glycol chain-containing polymer by polymerizing monomer components containing the unsaturated (poly)alkylene glycol ether monomer, it is preferable that the monomer composition contain the unsaturated (poly)alkylene glycol ether monomer and the unsaturated (poly)alkylene glycol diether monomer. Monomer components other than the two components may properly be selected in accordance with the (poly)alkylene glycol chain-containing polymer to be obtained and are not particularly limited, and an unsaturated carboxylic acid, other components to be described later, and the like are preferable.

In the method for producing the (poly)alkylene glycol chain-containing polymer, it is preferable to select the monomers and the ratio of the monomers to be polymerized depending on the intended polymer and to carry out polymerization by properly setting the reaction conditions and the like corresponding to the monomers. Hereinafter, a step (referred to as step 3), which is preferable to be included in the method for producing the (poly)alkylene glycol chain-containing polymer, of obtaining a (poly)alkylene glycol chain-containing polymer by polymerizing the unsaturated (poly)alkylene glycol ether monomer and an unsaturated carboxylic acid will be described. In this case, the (poly)alkylene glycol chain-containing polymer is a polycarboxylic acid copolymer.

In step 3, an unsaturated (poly)alkylene glycol ether monomer and an unsaturated carboxylic acid are copolymerized. The unsaturated (poly)alkylene glycol ether monomer (referred to also as a monomer (i)) is preferable to be obtained by a production method involving the alkylene oxide addition step (step 2) and one or more of unsaturated (poly)alkylene glycol ether monomers may be employed. In the case of using two or more kinds, two or more different types having an average addition mole number n of the oxyalkylene group within a range of 1 to 300 may be used in combination. In this case, those having a difference in an average addition mole number n of oxyalkylene groups of not lower than 10 are preferable and those having the difference not lower than 20 are more preferable. For example, combinations of those having an average addition mole number n in a range of 50 to 300 and those having an average addition mole number n in a range of 1 to 50 are preferable. In this case, the difference in n is preferably not less than 10 and more preferably not less than 20. With respect to the mixing ratio of them, it is preferable to contain those having an average addition mole number n of 50 to 300 at a higher ratio (ratio by weight) than those having an average addition mole number n of 1 to 50. In the case three or more different types of monomers (i) are used, the difference in the average addition mole number n is preferably not lower than 10 and more preferably not lower than 20. The (poly)alkylene glycol chain-containing polymer is preferable to indispensably contain those having an oxyalkylene group with an average addition mole number n in a range of 100 to 180. For example, combinations of two or more kinds with an average addition mole number of the oxyalkylene group in a range of 100 to 180 may be employed and combinations of those with an average addition mole number of the oxyalkylene group in a range of 100 to 180 and those with an average addition mole number of the oxyalkylene group in a range of 1 to 300 may be employed. In this case, the difference in the average addition mole number n of the oxyalkylene group is preferably not less than 10 and more preferably not less than 20. For example, combinations of those with an average addition mole number n in a range of 100 to 180 and those with an average addition mole number n in a range of 1 to 100, and the like are preferable. In this case, the difference in n is preferably not less than 10 and more preferably not less than 20. Further, with respect to their ratio, it is preferable to contain those having an average addition mole number n of 100 to 180 at a higher ratio (ratio by weight) than those having an average addition mole number n of 1 to 100. In the case of using three or more different kinds of monomers (i), the difference in n is also preferably not less than 10 and more preferably not less than 20.

The unsaturated carboxylic acid (referred to also as a monomer (ii)) may be an unsaturated monocarboxylic acid such as acrylic acid, methacrylic acid, crotonic acid, their monovalent metal salt, divalent metal salt, quaternary ammonium salt, or organic amine salt; an unsaturated dicarboxylic acid such as maleic acid, maleic anhydride, fumaric acid, itaconic acid, or citraconic acid; and their monovalent metal salts, divalent metal salts, ammonium salts, organic amine salts or the like, and one or more of them may be used. Among them, acrylic acid, methacrylic acid, and maleic acid are particularly preferable and acrylic acid is further preferable. That is, as the unsaturated carboxylic acid, at least acrylic acid or its salt is preferable to be contained. The polycarboxylic acid copolymer to be obtained by introducing the structure derived from acrylic acid or its salt can exhibit excellent dispersibility even in a small amount.

In step 3, other components (referred to also as a monomer (iii)) may be contained and specifically, a monomer copolymerizable with the unsaturated (poly)alkylene glycol ether monomer (monomer (i)) and/or the unsaturated carboxylic acid (monomer (ii)) (copolymerizable monomer) may be contained. The copolymerizable monomer may be half esters and diesters of the unsaturated dicarboxylic acids and alcohols having 1 to 30 carbon atoms; half amides and diamides of the unsaturated dicarboxylic acids and amines having 1 to 30 carbon atoms; half esters and diesters of alkyl(poly)alkylene glycols, which are obtained by adding 1 to 500 moles of alkylene oxide having 2 to 18 carbon atoms to the alcohols and amines, and the unsaturated dicarboxylic acids; half esters and diesters of the unsaturated dicarboxylic acids and either glycols having 2 to 18 carbon atoms or (poly)alkylene glycols having an addition mole number of these glycols in a range of 2 to 500; esters of unsaturated monocarboxylic acids such as methyl(meth)acrylate, ethyl(meth)acrylate, propyl(meth)acrylate, glycidyl (meth)acrylate, methyl crotonate, ethyl crotonate, propyl crotonate, and the like with alcohols having 1 to 30 carbon atoms; esters of alkoxy(poly)alkylene glycols, which are obtained by adding 1 to 500 moles of alkylene oxides having 2 to 18 carbon atoms to alcohols having 1 to 30 carbon atoms, and unsaturated monocarboxylic acids such as (meth)acrylates; adducts obtained by adding 1 to 500 moles of alkylene oxides having 2 to 18 carbon atoms to unsaturated monocarboxylic acids (e.g. (meth)acrylic acid) such as (poly)ethylene glycol monomethacrylate, (poly) propylene glycol monomethacrylate, and (poly)butylene glycol monomethacrylate; half amides of maleamido acids with either glycols having 2 to 18 carbon atoms or (poly)alkylene glycols having an addition mole number of these glycols in a range of 2 to 500; (poly)alkylene glycol di(meth)acrylates such as triethylene glycol di(meth)acrylate, (poly)ethylene glycol di(meth)acrylate, polypropylene glycol di(meth)acrylate, and (poly)ethylene glycol-(poly)propylene glycol di(meth)acrylate; polyfunctional (meth)acrylates such as hexane diol di(meth)acrylate, trimethylolpropane tri(meth)acrylate, and trimethylolpropane di(meth)acrylate; (poly)alkylene glycol dimaleates such as triethylene glycol dimalerate and polyethylene glycol dimaleate; unsaturated sulfonic acids such as vinyl sulfonate, (meth) allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyl oxysulfobenzoate, 4-(meth)acryloxybutyl sulfonate, (meth)acrylamidomethylsulfonic acid, (meth)acrylamidoethylsulfonic acid, 2-methylpropanesulfonic acid (meth)acrylamide, and styrenesulfonic acid, their monovalent metal salts, divalent metal salts, ammonium salts, and organic amine salts; amides of unsaturated monocarboxylic acids and amines having 1 to 30 carbon atoms such as methyl (meth)acrylamide; aromatic vinyl compounds such as styrene, α-methylstyrene, vinyltoluene, and p-methylstyrene; alkanediol mono(meth)acrylates such as 1,4-butanediol mono(meth)acrylate, 1,5-pentanediol mono(meth)acrylate and 1,6-hexanediol mono(meth)acrylate; dienes such as butadiene, isoprene, 2-methyl-1,3-butadiene, and 2-chloro-1,3-butadiene; unsaturated amides such as (meth)acrylamide, (meth)acrylalkylamide, N-methylol (meth)acrylamide, and N,N-dimethyl(meth)acrylamide; unsaturated cyanogens such as (meth)acrylonitrile and α-chloroacrylonitrile; unsaturated esters such as vinyl acetate and vinyl propionate; unsaturated amines such as aminoethyl(meth)acrylate, methylaminoethyl(meth)acrylate, dimethylaminoethyl (meth)acrylate, dimethylaminopropyl (meth)acrylate, dibutylaminoethyl(meth)acrylate, and vinylpyridine; divinyl aromatics such as divinyl benzene; cyanurates such as triallyl cyanurate; allyls such as (meth)allyl alcohol and glycidyl (meth)allyl ether; unsaturated amino compounds such as dimethylaminoethyl (meth)acrylate; vinyl ethers or allyl ethers such as methoxy polyethylene glycol monovinyl ether, polyethylene glycol monovinyl ether, methoxy polyethylene glycol mono(meth)allyl ether, and polyethylene glycol mono(meth)allyl ether; and siloxane derivatives such as polydimethylsiloxane-propylaminomaleic amide acid, polydimethylsiloxane-aminopropylene-aminomaleic amide acid, polydimethylsiloxane-bis(propylaminomaleic amide acid), polydimethylsiloxane-bis(dipropylene-aminomaleic amide acid), polydimethylsiloxane-(1-propyl-3-acrylate), polydimethylsiloxane-(1-propyl-3-methacrylate), polydimethylsiloxane-bis(1-propyl-3-acrylate), and polydimethylsiloxane-bis(1-propyl-3-methacrylate) and the like, and one or more kinds of them may be used. Particularly preferable are, as copolymerizable monomers, esters of unsaturated monocarboxylic acids such as methyl(meth)acrylate, ethyl(meth)acrylate, propyl(meth)acrylate, glycidyl (meth)acrylate, methyl crotonate, ethyl crotonate, and propyl crotonate, and alcohols having 1 to 30 carbon atoms; esters of alkoxy(poly)alkylene glycols, which are obtained by adding 1 to 500 moles of alkylene oxides having 2 to 18 carbon atoms to alcohols having 1 to 30 carbon atoms, and unsaturated monocarboxylic acids such as (meth)acrylates; and adducts obtained by adding 1 to 500 moles of alkylene oxides having 2 to 18 carbons to unsaturated monocarboxylic acids (e.g. (meth)acrylic acid) such as (poly)ethylene glycol monomethacrylate, (poly) propylene glycol monomethacrylate, and (poly)butylene glycol monomethacrylate, and the like.

The mixing ratios of the monomers (i) to (iii) are preferably the following ranges in 100% by mass in total of an unsaturated (poly)alkylene glycol ether monomer (monomer (i)), an unsaturated carboxylic acid (monomer (ii)), and other components (monomer (iii)) added if necessary.

The mixing ratio of the monomer (i) is preferably not lower than 1% by mass. If the mixing ratio is less than 1% by mass, in the case the polycarboxylic acid copolymer to be obtained is used as an admixture for cement, the dispersibility for cement tends to be lowered. It is more preferably not less than 10% by mass, further preferably not less than 20% by mass, particularly preferably not less than 30% by mass, and most preferably not less than 45% by mass.

The upper limit of the mixing ratio of the monomer (ii) is properly 60% by mass or less on the basis of sodium salt. If it exceeds 60% by mass, in the case the polycarboxylic acid copolymer to be obtained is used as an admixture for cement, the dispersibility deterioration (slump loss) becomes significant with the lapse of time and it may possibly become impossible to exhibit sufficient dispersibility. It is more preferably not more than 50% by mass, further preferably not more than 40% by mass, furthermore preferably not more than 35% by mass, especially preferably not more than 30% by mass, and most preferably not more than 25% by mass. It is also more preferable that it is not more than the following specified values (as the numerical values are smaller, it is more preferable). It is more preferable in the order of 20% by mass or less, 15% by mass or less, and 10% by mass or less. The lower limit of the mixing ratio of the monomer (ii) is preferably not less than 1% by mass. It is more preferably not less than 2% by mass, further preferably not less than 3% by mass, and especially preferably not less than 4% by mass.

The mixing ratio of the monomer (iii) is not particularly limited to an extent that the effect of the invention is not adversely affected and in step 3, it is preferably not more than 70% by mass in the total amount of the monomers (i), (ii), and (iii), more preferably not more than 60% by mass, further preferably not more than 50% by mass, especially preferably not more than 40% by mass, and most preferably not more than 30% by mass. It is also more preferable that it is not more than the following specified values (as the numerical values are smaller, it is more preferable), that is, it is more preferably not more than 20% by mass and not more than 10% by mass in this order.

The mixing ratio of the respective components in step 3 is preferably in a range of monomer (i)/monomer (ii)/monomer (iii)=(1 to 99)/(1 to 60)/(0 to 70) (% by mass). It is more preferably in a range of monomer (i)/monomer (ii)/monomer (iii)=(5 to 99)/(1 to 50)/(0 to 60) (% by mass), further preferably (10 to 99)/(1 to 40)/(0 to 50) (% by mass), especially preferably (25 to 98)/(2 to 35)/(0 to 40) (% by mass), most preferably (40 to 97)/(3 to 30)/(0 to 30) (% by mass) and most preferably. (45 to 97)/(3 to 25)/(0 to 30) (% by mass) (the total of the monomer (i), monomer (ii), and monomer (iii) is 100% by mass).

At the time of obtaining the polycarboxylic acid copolymer, copolymerization may be carried out by a publicly known method such as solution polymerization or bulk polymerization. The solution polymerization may be carried out in a batch manner or a continuous manner and a solvent to be used at that time may be water, alcohols such as methyl alcohol, ethyl alcohol, and isopropyl alcohol; aromatic or aliphatic hydrocarbons such as benzene, toluene, xylene, cyclohexane, and n-hexane; ester compounds such as ethyl acetate; ketone compounds such as acetone and methyl ethyl ketone; cyclic ether compounds such as tetrahydrofuran and dioxane; and the like in terms of the solubility of the raw material monomers and the copolymer to be obtained, use of at least one kind of solvent selected from water and lower alcohols having 1 to 4 carbon atoms is preferable and particularly, it is preferable to use water as a solvent since the desolvation step can be omitted.

In the case where aqueous solution polymerization is carried out, as a radical polymerization initiator, water-soluble polymerization initiators such as persulfate salts such as ammonium persulfate, sodium persulfate, and potassium persulfate; hydrogen peroxide; and water-soluble azo initiators, e.g. azoamidine compounds such as 2,2'-azobis-2-methylpropione amidine hydrochloride, cyclic azo amidine compounds such as 2,2'-azobis-2-(2-imidazolin-2-yl)propane hydrochloride, and azonitrile compounds such as 2-carbamoylazoisobutyronitrile, and the like are used and in this case, it is possible to use them in combination with a promoter such as alkali metal sulfites such as sodium hydrogen sulfite, metadisulfurous acid salts, sodium hypophosphite, and Fe (II) salts such as Mohr's salt, hydroxymethanesulfinic acid sodium salt dehydrate, hydroxylamine hydrochloride, thiourea, and L-ascorbic acid (salt), erythorbic acid (salt). Particularly, combinations with a promoter such as hydrogen peroxide and L-ascorbic acid (salt) are preferable.

In the solution polymerization using a lower alcohol, an aromatic or aliphatic hydrocarbon, an ester compound or a ketone compound as a solvent, peroxides such as benzoyl peroxide, lauroyl peroxide, and sodium peroxide; hydroperoxides such as tert-butyl hydroperoxide and cumene hydroperoxide; azo compounds such as azobisisobutylonitrile; and the like can be used as a radical polymerization initiator. In this case, a promoter such as an amine compound can be used in combination. Further, in the case a water-lower alcohol mixed solvent is used, the polymerization initiator to be used can be properly selected from the above-mentioned various kinds of radical polymerization initiators and combinations of the radical polymerization initiators and promoters.

In the case where bulk polymerization is carried out, peroxides such as benzoyl peroxide, lauroyl peroxide, and sodium peroxide; hydroperoxides such as tert-butyl hydroperoxide and cumene hydroperoxide; azo compounds such as azobisisobutylonitrile are used as a radical polymerization initiator.

The reaction temperature at the time of copolymerization is not particularly limited and, for example, in the case a persulfuric acid salt is used as an initiator, the reaction temperature is properly in a range of 30 to 100° C., preferably in a range of 40 to 95° C., and more preferably in a range of 45 to 90° C. Further, in the case where hydrogen peroxide and, as a promoter, L-ascorbic acid (salt) are used in combination as an initiator, the reaction temperature is properly in a range of 30 to 100° C., preferably in a range of 40 to 95° C., and more preferably in a range of 45 to 90° C.

The polymerization time at the time of copolymerization is not particularly limited and, for example, it is properly in a range of 0.5 to 10 hours, preferably in a range of 0.5 to 8 hours, and more preferably in a range of 1 to 6 hours. If the polymerization time is longer or shorter than this range, it may possibly result in decrease in the polymerization ratio and decrease in productivity and thus it is undesirable.

The use amount of all monomer components at the time of copolymerization is properly in a range of 10 to 99% by mass in all of the raw materials including other raw materials and the polymerization solvent, preferably in a range of 20 to 98% by mass, more preferably in a range of 25 to 95% by mass, further preferably in a range of 30 to 90% by mass, especially preferably in a range of 30 to 80% by mass, and most preferably in a range of 40 to 70% by mass. Particularly, if the use amount of all monomer components is lower than this range, it may possibly result in decrease in the polymerization ratio and decrease in productivity and thus it is undesirable.

A feeding method of the respective monomers to a reaction container is not particularly limited and may be a method of collectively loading the entire amount to the reaction container in an initial stage, a method of intermittently or continuously loading the entire amount to the reaction container, or a method of loading a portion to the reaction container in an initial stage and loading the remaining intermittently or continuously to the reaction container. Specifically, examples of the method may be a method of continuously loading the entire amount of the monomer (i) and the entire amount of the monomer (ii) to the reaction container; a method of loading a portion of the monomer (i) to the reaction container in an initial stage and continuously loading the remaining of the monomer (i) and the entire amount of the monomer (ii) to the reaction container; a method of loading a portion of the monomer (i) and a portion of the monomer (ii) to the reaction container in an initial stage and loading the remaining of the monomer (i) and the remaining of the monomer (ii) to the reaction container continuously, dividedly, or reciprocally in several portions; a method of loading the entire amount of the monomer (i) to the reaction container in an initial stage and continuously or dividedly loading the entire amount of the monomer (ii) to the reaction container; and a method of loading the entire amount of the monomer (i) and a portion of the monomer (ii) to the reaction container in an initial stage and continuously or dividedly loading the remaining of the monomer (ii) to the reaction container. Further, the loading speeds of the respective monomers to the reaction container may be changed continuously or step by step in the middle of the reaction to change continuously or step by step the loading weight ratio of the respective monomers per unit time and thus synthesize two or more copolymers with different ratios of a constituent unit (I) derived from the monomer (i) and a constituent unit (II) derived from the monomer (ii) simultaneously during the polymerization reaction. Additionally, a radical polymerization initiator may be loaded to the reaction container from the beginning or may be dropwise added to the reaction container or these methods may be combined in accordance with purposes.

At the time of copolymerization, to adjust the molecular weight of the copolymer to be obtained, a chain transfer agent may be used. Particularly, if the polymerization reaction is carried out in a high concentration, that is, the use amount of all of the monomer components is 30% by mass or more in the entire amount of the raw materials to be used at the time of polymerization, it is preferable to use a chain transfer agent. Usable chain transfer agents may be thiol chain transfer agents such as mercaptoethanol, thioglycerol, thioglycollic acid, 2-mercaptopropionic acid, 3-mercaptopropionic acid, thiomalic acid, octyl thioglycollate, octyl 3-mercaptopropionate and 2-mercaptoethanesulfonic acid, and two or more kinds of chain transfer agents may be used in combination. Further, to adjust the molecular weight of the copolymer, it is also efficient to use, as the monomer (iii), a monomer with a high chain transfer property such as (meth) allylsulfonic acid (salt).

To obtain a copolymer with a prescribed molecular weight at high reproducibility, since it is important to stably precede the copolymerization reaction, in the case of carrying out solution polymerization, the dissolved oxygen concentration in the solvent to be used at 25° C. is preferable to be suppressed to 5 ppm or less. It is more preferably 0.01 to 4 ppm, further preferably 0.01 to 2 ppm, and most preferably 0.01 to 1 ppm. Additionally, in the case nitrogen substitution or the like is carried out after the addition of monomers to the solvent, the dissolved oxygen concentration in the system containing the monomers may be adjusted within the above-mentioned range.

The adjustment of the dissolved oxygen concentration in the solvent may be carried out in the polymerization reaction tank or a solvent in which the dissolved oxygen amount is previously adjusted may be used. A method for purging oxygen in the solvent may be, for example, the following methods (1) to (5).

(1) After a closed container containing a solvent is filled with an inert gas such as nitrogen in a pressurized state, the pressure in the closed container may be lowered to lower the oxygen partial pressure in the solvent. The pressure in the closed container may be reduced under nitrogen stream.
(2) While the vapor phase part in the container containing the solvent is replace with an inert gas such as nitrogen, the liquid phase part is fiercely stirred for a long duration.
(3) An inert gas such as nitrogen is bubbled for a long duration in the solvent contained in the container.
(4) After once boiled, the solvent is cooled in an inert gas atmosphere such as nitrogen.
(5) A static mixing apparatus (static mixer) is installed in a middle of a pipe, and an inert gas such as nitrogen is mixed in the pipe through which the solvent is transported to a polymerization reaction tank.

In the copolymerization reaction, in the case a solvent is used, the polymerization may be carried out at pH 5 or higher, and in such a case, the polymerization ratio may possibly be lowered and at the same time the copolymerization property may be deteriorated to result in deterioration of the property as an admixture for cement and therefore, it is preferable to carry out the copolymerization reaction at a pH lower than 5. Adjustment of pH may be carried out using alkaline substances, e.g. inorganic salts such as hydroxides and carbonates of monovalent metals and divalent metals; ammonia; and organic amines or inorganic acids such as phosphoric acid and sulfuric acid and organic acids such as acetic acid and p-toluenesulfonic acid, or the like.

The invention provides (1) a method for producing an unsaturated (poly)alkylene glycol ether monomer by addition reaction of an alkylene oxide to an unsaturated alcohol and (2) a method for producing a (poly)alkylene glycol chain-containing polymer by polymerizing monomer components containing an unsaturated (poly)alkylene glycol ether monomer and particularly it is preferable to produce a polycarboxylic acid copolymer by involving three steps of copolymerizing monomer components indispensably containing an unsaturated (poly)alkylene glycol ether monomer and an unsaturated carboxylic acid. The three steps may be step 1, a step of obtaining an unsaturated alcohol by carrying out reaction of an unsaturated group-containing halide and a (poly)alkylene glycol; step 2, a step of obtaining an unsaturated (poly)alkylene glycol ether monomer by adding an alkylene oxide to the unsaturated alcohol obtained in step 1; and step 3, a step of obtaining a polycarboxylic acid polymer by polymerizing the unsaturated (poly)alkylene glycol ether monomer obtained in step 2 and an unsaturated carboxylic acid.

That is, the present invention is also a (poly)alkylene glycol chain-containing polymer production method by copolymerization of a monomer component essentially including an unsaturated (poly)alkylene glycol ether monomer and an unsaturated carboxylic acid, wherein the production method includes step 1 of producing an unsaturated alcohol by causing reaction of a halide having an unsaturated bond and a (poly)alkylene glycol, step 2 of producing an unsaturated (poly)alkylene glycol ether monomer by adding an alkylene oxide to the unsaturated alcohol, and step 3 of copolymerizing the unsaturated (poly)alkylene glycol ether monomer and an unsaturated carboxylic acid.

In this case, the obtained (poly)alkylene glycol chain-containing polymer is a polycarboxylic acid copolymer. Further, the invention also provides a polycarboxylic acid copolymer obtained by the production method. Preferably, the unsaturated alcohol is an unsaturated (poly)alkylene glycol ether. Step 2 is preferably a production method of the unsaturated (poly)alkylene glycol ether monomer. As another embodiment, it is preferable to produce a copolymer through the following two steps: a step 1 of adding an alkylene oxide to an unsaturated alcohol such as methallyl alcohol, thereby producing an unsaturated alcohol-polyalkylene oxide adduct such as a methallyl alcohol-polyalkylene oxide adduct; and a step of producing a polycarboxylic acid polymer by polymerizing the unsaturated alcohol-polyalkylene oxide adduct such as the methallyl alcohol-polyalkylene oxide adduct obtained in the step 1 with an unsaturated carboxylic acid.

If the above-mentioned production method includes the above-mentioned steps 1 to 3, it is made possible to use an economical unsaturated bond-containing halide as a raw material and thus cost can be saved for producing the polycarboxylic acid copolymer. Further, the alkylene chain length of the unsaturated (poly)alkylene glycol ether monomer can be adjusted to a preferable length depending on the application. Further, it is made possible for the polycarboxylic acid copolymer obtained in the above-mentioned production method to cause an excellent effect of more efficiently dispersing cement particles than polycarboxylic acid polymers produced by using conventional unsaturated alcohols as starting raw materials and therefore, the copolymer can be preferably used for various applications.

In the invention, the production method of the polycarboxylic acid copolymer involving steps 1 to 3 is also one of preferable embodiments and particularly preferable embodiments of steps 1 to 3 will be described in the following along with the following chemical reaction formulas below.

In step 1, it is preferable to obtain ethylene glycol monomethallyl ether (methallyl alcohol 1 EO) by causing reaction of methallyl chloride and ethylene glycol.

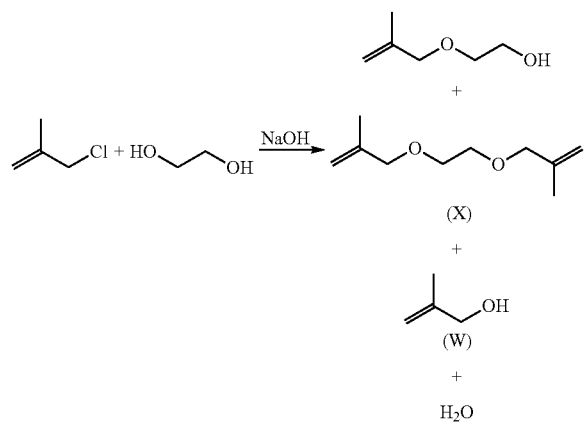

In step 1, as shown in the above-mentioned reaction formula, ethylene glycol dimethallyl ether (X), monomethallyl alcohol (W) and water are produced as byproducts. The product containing the methallyl alcohol 1 DO obtained in step 1 is preferable to be refined by distillation to obtain methallyl alcohol 1 DO with a high purity. Distillation is preferable to be carried out by reduced pressure distillation. It is preferable to refine alkylene glycol monomethallyl ether from a mixed solution containing reaction products, that is, alkylene glycol monomethallyl ether and remaining excess alkylene glycol by distillation. At that time, alkylene glycol dimethallyl ether and water may be contained in the remained portion, and it is preferable that the alkylene glycol dimethallyl ether is in a range of 0 to 25% and water is in a range of 0 to 2%. Accordingly, an unsaturated polyalkylene glycol ether can be produced in step 2 using the raw materials from which byproducts are sufficiently removed. That is, in terms of use of absolutely refined raw materials, it is preferable to refine to give mainly alkylene glycol methallyl ether. In the distillation step, ethylene glycol and sodium chloride are separated into the bottom layer and since other byproducts (X), methallyl alcohol (W), and methallyl alcohol 1 EO have close boiling points and are therefore recovered similarly to methallyl alcohol 1 EO. Since the boiling point of methallyl alcohol 1 EO is higher than the boiling point of the methallyl alcohol (W) (113 to 115° C.), the methallyl alcohol 1 ED is easy to be distilled and the purity can be heightened more.

The following is preferable as step 1.

Step 1 is a method of producing an unsaturated alcohol composition containing at least one unsaturated alcohol having a hydroxyl group by using a (poly)alkylene glycol (hereinafter, referred to also as a "polyhydric alcohol (1)") defined by the following general formula (1'):

HO-(A²O)ₙ—H    (1') 

(wherein, n is a numeral of 1 to 4; A² may be the same or different and denotes an alkylene group having 2 to 18 carbon atoms and optionally having a substituent group and the substituent group may be an alkyl group or a hydroxyl group); an unsaturated halide (2) (hereinafter, referred to as an "unsaturated halide (2)") defined by following general formula (a):

X—Z    (a) 

(wherein, X denotes an alkenyl group having 2 to 6 carbon atoms and Z denotes a halogen atom); and an inorganic compound (IN) (hereinafter, referred to as an "inorganic compound (IN)") containing an alkali metal and/or alkaline earth metal showing basicity and 1.5 moles of more of the polyhydric alcohol (1) is preferably used to 1 mole of the unsaturated halide (2). In such a manner, an excess amount of (poly)alkylene glycol is used and reacted to obtain an unsaturated alcohol at a high yield. Further, the entire amount or a portion of the polyhydric alcohol (1) recovered in the refining step of the unsaturated alcohol is reused as a raw material to suppress loss of the raw materials and lower the production cost. In this case, the unsaturated alcohol is preferably an unsaturated ether compound and the unsaturated alcohol composition is preferably an unsaturated ether composition. In step 1, with respect to the preferable amount of the polyhydric alcohol (1), it is preferably 1.5 to 10 moles, more preferably 3 to 8 moles, and especially preferably 4 to 6 moles to 1 mole of the unsaturated halide (2). If the amount of the polyhydric alcohol (1) is lessened, an unsaturated alcohol composition with a high ratio of diunsaturated alcohol (D) formed by addition of two molecules of the unsaturated halide (2) to the polyhydric alcohol (1) is obtained and if the amount of the polyhydric alcohol (1) is increased, an unsaturated alcohol composition with a high ratio of monounsaturated alcohol (M) formed by addition of 1 molecule of the unsaturated halide (2) to 1 molecule of the polyhydric alcohol (1) is obtained. If it is too small, the diunsaturated alcohol compound (D) is adversely increased too much and on the other hand if it is too high, the facility for producing the intended unsaturated ether composition becomes large and the production cost is increased and therefore it is not preferable.

X in the unsaturated halide (2) is an alkenyl group having 2 to 6 carbon atoms, preferably an alkenyl group having 3 to 5 carbon atoms, more preferably an alkenyl group having 4 carbon atoms, and even more preferably an isobutylene group. The halogen atom Z is preferably a chlorine atom or a bromine atom, and particularly a chlorine atom is easily industrially made available and excellent in reactivity and handling property and therefore it is preferable.

The inorganic compound (IN) is not particularly limited as long as it is an inorganic compound showing basicity in form of an aqueous solution and is preferably at least one selected from alkali metals or alkaline earth metals of hydroxides, alkali metals or alkaline earth metals, carbonates, and alkali metals or alkaline earth metals of hydrogen carbonates. Particularly, hydroxides of alkali metals such as sodium and potassium, hydroxides, carbonates, and hydrogen carbonates of alkaline earth metals such as calcium are preferable and hydroxides of alkali metals such as sodium and potassium are most preferable. These inorganic compounds (IN) may be one or a plurality of kinds of these compounds.

The amount of the inorganic compound (IN) is preferably 0.5 to 2.0 moles on the basis of the total valence of the inorganic metals (alkali metals and alkaline earth metals), more preferably 0.9 to 1.5 moles, and even more preferably 1.0 to 1.2 moles to 1 mole of the unsaturated halide (2). For example, in the case where the inorganic compound (IN) is solely an alkaline earth metal compound, the mole ratio of the inorganic compound (IN) to the unsaturated halide (2) is 0.25 to 1.0, 0.45 to 0.75, and 0.5 to 0.6, respectively. Additionally, the inorganic compound (IN) may be used as it is or dispersed in a dispersant. In the case a dispersant is employed, it is preferable to use water and/or a polyhydric alcohol (1) to be used for the reaction (including the recovered composition obtained in the separation step which will be described later).

In the case water is used as the dispersant, the amount of water is preferable to be less than the amount of the polyhydric alcohol (1) to be used for the reaction. Further, as its mass ratio to the polyhydric alcohol (1), it is preferably not higher than 100% by mass, more preferably not higher than 75% by mass, further preferably not higher than 50% by mass, especially preferably not higher than 25% by mass, and most preferably not higher than 20% by mass.

In the case of using the polyhydric alcohol (1) as the dispersant, it is needed to adjust the ratio of the total amount of the polyhydric alcohol (1) to be used as the dispersant and the polyhydric alcohol (1) to be added separately to the amount of the unsaturated halide (2) to be a prescribed ratio. The above description "dispersed in the dispersant" means the state that the entire amount or a portion of the inorganic compound (IN) is dissolved, or is not dissolved at all but mixed.

The state that the polyhydric alcohol (1) and the inorganic compound (IN) are mixed may be produced by loading the entire amount of them collectively and the mixing order is not particularly limited. The entire amount may be added at once or intermittently at a plurality of timings or continuously over a long time.

It is preferable that the unsaturated ether composition contains a monounsaturated ether (M) having one unsaturated ether group and a diunsaturated ether (D) having two unsaturated ether groups and the mass ratio of (D) is 0.001 to 25 parts by mass to 100 parts by mass of (M). Further, it is also preferable that the polyhydric alcohol (1) which is not reacted is recovered and reused as at least a portion of the raw materials. Further, it is also preferable that the method involves a step of removing precipitated halides of alkali metals and/or alkaline earth metals. The unsaturated halide is preferably at least one kind selected from (meth) allyl chloride and (meth) allyl bromide. The polyhydric alcohol (1) is preferably (poly) alkylene glycol. The inorganic compound (IN) is preferably hydroxides of alkali metals. Step 1 is preferable to involve the following steps a) to f).

a) A first reaction step of using the inorganic compound (IN) together with the polyhydric alcohol (1) and/or the recovered composition from the following recovery step;
b) a water-decreasing step carried out simultaneously with the first reaction step and/or on completion of the first reaction step;
c) a second reaction step of causing reaction of the low water content composition obtained in the water-decreasing step and the unsaturated halide (2);
d) a solid-liquid separation step of separating the reaction composition obtained in the second reaction step into a solid precipitate containing the halide of alkali metals and/or alkaline earth metals and a solution containing the unsaturated ether compound;
e) a separation step of separating the solution containing the unsaturated ether compound obtained in the solid-liquid separation step into an unsaturated ether composition and a polyhydric alcohol-containing recovered composition; and
f) a recovery step of using a portion or the entire amount of the recovered composition obtained in the separation step for the first reaction step.

The production method of the unsaturated ether composition is preferable to involve the following steps g) to k).

g) A reaction step of obtaining a reaction composition containing an unsaturated ether composition by using the inorganic compound (IN) with the polyhydric alcohol (1) and/or the recovered composition obtained in the following recovery step and also the unsaturated halide (2);
h) a water-decreasing step of obtaining a low water content composition by decreasing water from the reaction composition obtained in the reaction step;
i) a solid-liquid separation step of separating the low water content composition into a solid precipitate containing the halide of alkali metals and/or alkaline earth metals and a solution containing the unsaturated ether compound;
j) a separation step of separating the solution containing the unsaturated ether compound obtained in the solid-liquid separation step into an unsaturated ether composition and a polyhydric alcohol-containing recovered composition; and
k) a recovery step of using a portion or the entire amount of the recovered composition obtained in the separation step for the reaction step.

The unsaturated ether composition obtained in the above-mentioned production method is also one of preferable embodiments of the invention. According to the method, it is made possible to obtain an unsaturated ether compound from a polyhydric alcohol and an unsaturated halide and produce an unsaturated ether composition at a low cost by an industrially simple method. As the polyhydric alcohol (1), those preferably usable as the (poly)alkylene glycol can be used. It is more preferably ethylene glycol. Further, polyols such as glycerin, polyglycerin and trimethylolpropane, and the like are also preferably usable. The recovered composition, which will be described later, can be used while being mixed with the polyhydric alcohol (1) to be used newly or by itself without being refined further by removing dissolved alkaline metal salts or by other procedures.

The reaction products containing at least the monounsaturated ether (M) having at least one unsaturated ether group, the diunsaturated ether (D) having two unsaturated ether groups, the un-reacted polyhydric alcohol (1), and inorganic metal halides and obtained using the inorganic compound (IN), the polyhydric alcohol (1), and the unsaturated halide (2) are separated into a solid precipitate containing halides of alkali metals and/or alkaline earth metals, a solution containing the unsaturated ether compound and a recovered composition containing at least the un-reacted polyhydric alcohol (1) by the solid-liquid separation step and the separation step.

The solid-liquid separation method is not particularly limited, and methods such as pressure filtration and centrifugal separation can be exemplified. In the case a solid-liquid separation step is to be carried out before the separation step, it is preferable that the washing is performed using the polyhydric alcohol (1) used as the raw material because the unsaturated ether composition is contained in the separated solid matter. If the recovered composition is used as a solvent for washing, elution of the alkaline metal halides contained in the solid matter into the washing solution can be suppressed and therefore it is particularly preferable.

The solution after the washing is efficiently utilized by separating into an unsaturated ether composition and the recovered composition by the same process as the separation step, supplying it together with the reaction composition to the separation step, using it as a reaction raw material after mixing it with the recovered composition and the like, or combining these processes.

The separation step is not particularly limited and may be distillation, crystallization, extraction, or the like as long as it can separate the intended unsaturated ether composition. It is preferable to obtain an unsaturated glycol ether composition by separating the low water content reaction composition obtained via a water-decreasing step to be described later before the separation step into the unsaturated ether composition and the recovered composition containing the un-reacted polyhydric alcohol by distillation. In terms of the thermal stability of the intended unsaturated ether composition, the distillation condition is preferable to be adjusted in a manner that the temperature of the distillation bottom is 160° C. or lower, more preferably 150° C. or lower, further preferably 140° C. or lower, and especially preferably 130° C. or lower.

In the step described above, in order to remove a low boiling point component in a low concentration, e.g. water, and increase the purity of the unsaturated ether composition, the low boiling point component may be removed in a manner that a distillation tower is kept in a full reflux state, the low boiling point component is concentrated in a reflux tank and when the components in the reflux tank becomes stable, the liquid in the tank is discharged within a short time. The low boiling point component can be removed further by repeating this process a plurality of times. The time to keep the full reflux state differs depending on the distillation facility, but it is preferably longer than the time taken for liquid that is twice the liquid in the reflux tank to be distilled from the top of the tower. It is also efficient to perform the same process as this in the case of recovering a product at a high yield by sufficiently separating the high boiling point fraction from the product fraction.

The un-reacted polyhydric alcohol-containing recovered composition obtained in the separation step may be further refined by distillation or the like, however in an embodiment of the invention, with no need of particular refining treatment for the recovered step, a portion or the entire amount of the composition can be uses as a raw material for the reaction step and therefore the step is highly efficient and simple. For example, the polyhydric alcohol containing dissolved salts obtained as distillation residues may be used as it is for a raw material of the reaction step. Or, the polyhydric alcohol may be newly added to the recovered composition based on the necessity or the recovered composition may be mixed with another recovered composition, for example, a recovered composition or the like obtained in another production facility in which the same kind of unsaturated ether composition is produced.

Execution of the water-decreasing step for obtaining a low water content composition by decreasing water existing in the system before the solid-liquid separation step and the separation step is one of preferable embodiments. A method for decreasing water is not particularly limited and may be methods of addition of a desiccant such as zeolites and molecular sieves, distillation, and distillation using an oil-water separator, or the like. In terms of the separation efficiency and cost, distillation and distillation using an oil-water separator are preferable. The extent of the water decrease is preferably 5% by mass or lower of the water concentration in the treated solution, more preferably 3% by mass or lower, further preferably 1% by mass, furthermore preferably 0.5% by mass or lower, especially preferably 0.1% by mass or lower, and most preferably 0.05% by mass or lower. However, since the productivity is considerably lowered to lower the water content to 0.0005% by mass or lower, it is preferable to keep the concentration higher than that level.

Hereinafter, a method A and a method B, which are preferable production methods of an unsaturated glycol ether composition, will be described for respective steps.

(Method A)

The method A is characterized in that the method involves a first reaction step of causing reaction of the inorganic compound (IN) and the polyhydric alcohol (1) and a second reaction step of causing reaction of the reaction product obtained in the first reaction step and the unsaturated halide (2).

(First Reaction Step)

In the first reaction step, it is required to mix the inorganic compound (IN) and the polyhydric alcohol (1) at the above-mentioned ratio. The reaction temperature in the first reaction step differs in accordance with the types and amounts of the polyhydric alcohol (1) and the inorganic compound (IN), however it is generally from room temperature to 180° C., preferably 50 to 150° C., and more preferably 70 to 140° C. The pressure in the first reaction step may be any of reduced pressure, normal pressure, and pressurized pressure and the reaction time is not particularly limited and the time may be properly set to sufficiently increase the conversion rate of the inorganic compound under the above-mentioned reaction conditions.

(Water-Decreasing Step)

Use of the low water content reaction composition obtained by executing the step makes the operation in the separation step easy and gives an unsaturated glycol ether composition with a high purity at a high yield and therefore, the water-decreasing step is preferable to be carried out during the first reaction step, between the first reaction step and the second reaction step, or between the second reaction step and the separation step once or more times. It is more preferable to be carried out simultaneously with the first reaction step and/or between the first reaction step and the second reaction step and it is most preferable to be carried out simultaneously with the first reaction step.

(Second Reaction Step)

In the second reaction step, it is required to mix the reaction product obtained in the first reaction step and the unsaturated halide (2). The addition of the unsaturated halide (2) to the reaction product obtained in the first reaction step may be carried out by adding the entire amount at once or intermittently adding it dividedly at a plurality of timings, or continuously adding it over a long time. The reaction temperature in the second reaction step differs in accordance with the type of the polyhydric alcohol (1) and the unsaturated halide (2), and the type and amount of the inorganic metal compound (IN), however it is generally 40 to 150° C., preferably 50 to 100° C., and more preferably 55 to 75° C. The pressure in the second reaction step may be any of reduced pressure, normal pressure, and pressurized pressure, however it is generally easy and economical to carry out under normal pressure. Further, the reaction time is not particularly limited and the time may be properly set to sufficiently increase the conversion rate of the unsaturated halide raw material under the above-mentioned reaction conditions.

(Solid-Liquid Separation Step)

It is preferable to carry out a step of removing the precipitated halide of an alkali metal and/or an alkaline earth metal by solid-liquid separation during the time from the second reaction step to the recovery step once or more times and for example, it may be carried out dividedly a plurality of times after the second reaction step and the separation step. Further since the precipitation amount of the halide increases if water is removed from the reaction composition, it is more preferable to carry out a step of separating the salt after carrying out the water-decreasing step. In the invention, since the halide of an alkali metal and/or an alkaline earth metal may be dissolved, it is one of preferable embodiments that the solid-liquid separation step is carried out once between the second reaction step and the separation step since it is simple.

(Separation Step)

In the above-mentioned conditions, an unsaturated ether compound and a recovered composition containing the polyhydric alcohol (1) are separated and the recovered composition is used for the next recovery step.

(Recovery Step)

Since the entire amount and/or a portion of the recovered composition can be used for the first reaction step or as a washing solution of the solid-liquid separation step with no need of further refining or the like, the polyhydric alcohol (1) used in an excess amount in the reaction steps can be used without vain.

A reaction composition containing the unsaturated ether composition according to the method A can be obtained by carrying out the steps under the above-mentioned conditions.

(Method B)

The method B is characterized in that the method involves a water-decreasing step for a reaction composition obtained by causing reaction of the polyhydric alcohol (1), the unsaturated halide (2) and the inorganic compound (IN). In the following, the method B will be described for respective steps.

(Reaction Step)

The reaction step is a step of mixing the polyhydric alcohol (1), the unsaturated halide (2) and the inorganic compound (IN) at the above-mentioned ratio and obtaining an unsaturated ether composition-containing reaction product by one time reaction. It is preferable to mix the polyhydric alcohol (1), the unsaturated halide (2), and the inorganic compound (IN) in a manner that the unsaturated halide (2) and the inorganic compound (IN) are mixed in the presence of the polyhydric alcohol (1) and it is more preferable to mix them in a manner that the unsaturated halide (2) is added to a mixture of the polyhydric alcohol (1) and the inorganic compound (IN). The addition of the unsaturated halide (2) to a mixture of the polyhydric alcohol (1) and the inorganic compound (IN) may be carried out by adding the entire amount at once, intermittently adding it dividedly a plurality of times, or continuously adding it over a long time. The reaction temperature differs in accordance with the types of the polyhydric alcohol (1) and the unsaturated halide (2) and the type or amount of the inorganic compound (IN), however it is generally 40 to 150° C., preferably 50 to 100° C., and more preferably 55 to 75° C. The pressure in the reaction step may be any of reduced pressure, normal pressure, and pressurized pressure, however since conduction under normal pressure is easy and economical and therefore, it is preferable. The reaction time is not particularly limited and the time may be properly set to sufficiently increase the conversion rate of a raw material unsaturated halide under the above-mentioned reaction conditions. A reaction composition containing an unsaturated ether composition can be obtained by carrying out the reaction under the above-mentioned conditions
(Water-Decreasing Step)

The extent of decrease of water of the reaction composition by the water-decreasing step is preferably 5% by mass or less of water concentration in the treated solution, more preferably 3% by mass or less, further preferably 1% by mass, furthermore preferably 0.5% by mass or less, especially preferably 0.1% by mass or less, and most preferably 0.05% by mass or less. Additionally, since the productivity is considerably decreased or the loss of the unsaturated ether is increased if the water content is lowered to 0.0005% by mass or lower, it is preferable to keep the concentration higher than that level.
(Solid-Liquid Separation Step)

The recovery step in the method B may be carried out by the same process as that of the method A. It is preferable to carry out a step of removing the precipitated halide of an alkali metal and/or an alkaline earth metal by solid-liquid separation during the time from the reaction step to the recovery step once or more times and for example, it may be carried out dividedly a plurality of times after the reaction step and after the separation step. Further, since the precipitation amount of the halide of an alkali metal and/or an alkaline earth metal increases if water is removed from the reaction composition, the solid-liquid separation step can be carried out after conduction of the water-decreasing step to considerably increase the workability thereafter. In the invention, since the halide of an alkali metal and/or an alkaline earth metal may be dissolved, it is one of preferable embodiments that the solid-liquid separation step is carried out once between the water-decreasing step and the separation step since it is simple.
(Separation Step)

The separation step in the method B can be carried out in the same process as that of the method A, except the low water content reaction composition obtained in the water-decreasing step is used.
(Recovery Step)

The recovery step in the method B can be carried out in the same process as that of the method A.

A reaction composition containing an unsaturated ether composition can be obtained by the method B by carrying out the steps under the above-mentioned conditions. The advantage of the method A is that production at a high yield with no unsaturated ether loss can be accomplished since the water-decreasing step may not be carried out after the second reaction step, and on the other hand the advantage of the method B is that the loss of the polyhydric alcohol is less than that of the method A. Accordingly, any advantageous method may be selected depending on the situation.

Even in the step where the above-mentioned unsaturated ether composition is used, the unsaturated alcohol composition may be used in stead of the unsaturated ether composition. That is, the above-mentioned unsaturated ether composition can sufficiently exhibit the effects of the present invention even if the unsaturated alcohol composition is used.

In step 2, it is preferable to add ethylene oxide (EO) to the distilled and refined mixture of step 1. Herein, a methallyl alcohol n-EO adduct is to be produced. In step 2, a polyethylene glycol (Y) and an internal olefin (Z) in which double bonds of the methallyl alcohol n-EO adduct is thermally rearranged are produced besides the byproducts in step 1.

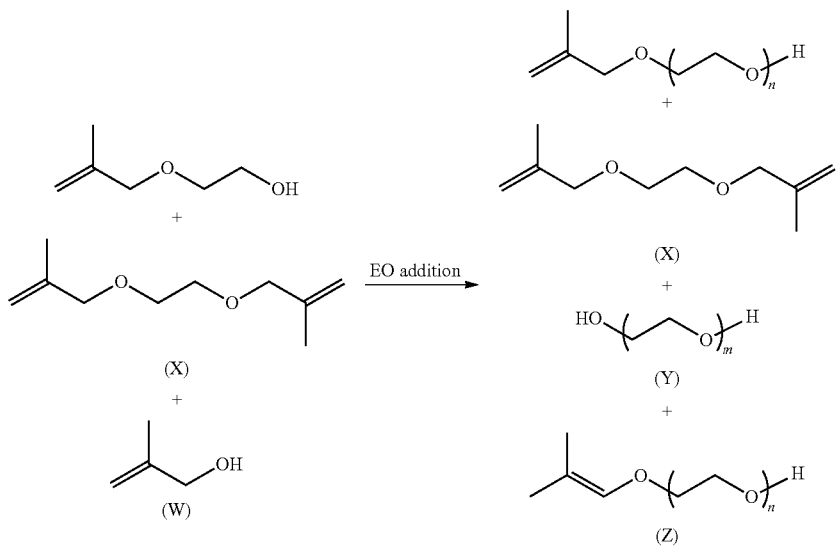

-continued

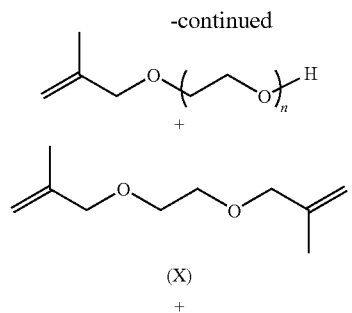

(X)

+

In step 3, it is preferable to copolymerize the methallyl alcohol n-EO adduct-containing product obtained in step 2 and acrylic acid, as shown in the following reaction formula. Specifically, it is preferable to obtain a polycarboxylic acid copolymer (polycarboxylic acid polymer) by copolymerizing the methallyl alcohol n-EO adduct containing the byproduct of steps 1 and 2 with acrylic acid. Such a polycarboxylic acid copolymer is preferably usable, for example, as a polycarboxylic acid for admixtures for cement.

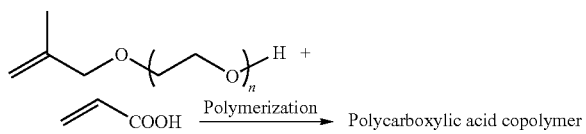

In the production method of the polycarboxylic acid copolymer of the invention, as described above, it is preferable to produce the copolymer via the methallyl alcohol n-EO adduct. Further, a polycarboxylic acid copolymer may be produced using a 3-methyl-3-butenyl monomer (MBN monomer) obtained by adding ethylene oxide to 3-methyl-3-butenyl chloride, as shown in the following formula.

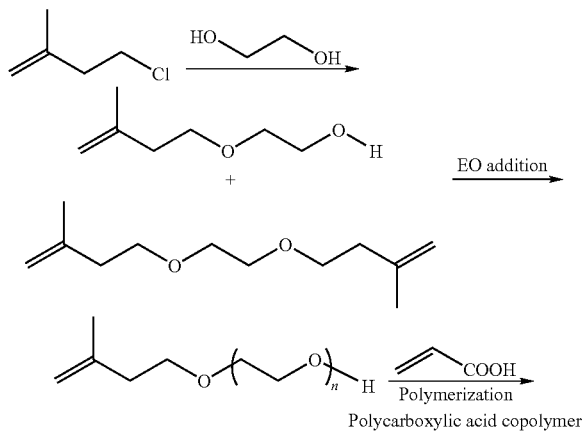

In the MBN monomer, an example using ethylene oxide as an alkylene oxide to be added is exemplified, however other alkylene oxides may be used. The chain length of the alkylene oxide is preferably in a range of 1 to 300 as described above and in the case of the MBN monomer, it is preferably in the same range as described above. That is, the average addition mole number is preferable to be high to a certain extent and more preferable to be not less than specified values in the following order (more preferable as the numerical value is higher). That is, not less than 10, not less than 25, not less than 35, not less than 50, not less than 75, not less than 100, not less than 110, not less than 120, not less than 135, and not less than 150. Further, the average addition mole number is also preferably not too high and it is more preferable to be not more than specified values in this order (more preferable as the numerical value is smaller). That is, not more than 280, not more than 250, not more than 225, and not more than 200. As the average addition mole number is smaller, the hydrophilicity is decreased more and the effect of repelling cement particles is deteriorated more and accordingly, the dispersibility of the copolymer to be obtained may possibly be decreased and on the other hand, if it exceeds 300, the copolymerization reactivity in step 3 may possibly be lowered.

The unsaturated bond-containing halide in the invention is particularly preferably methallyl chloride and 3-methyl-3-butenyl chloride and in the case a monomer having a long chain alkylene oxide is produced and then a polycarboxylic acid copolymer having a long chain alkylene oxide chain is obtained, methallyl chloride is more preferable to be used. Hereinafter, a reaction formula in the case of adding ethylene oxide to 3-methyl-3-butenyl alcohol is shown and the reason why methallyl chloride is more preferable to be used will be described.

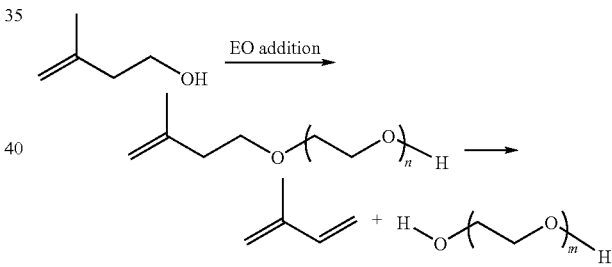

As shown in the above-mentioned formula, in the case of the 3-methyl-3-butenyl monomer (MBN monomer), in the step of addition reaction of ethylene oxide, the MBN monomer is conjugated to possibly cause decomposition reaction to isoprene and polyethylene glycol (PEG) and formation of a long chain becomes more difficult than in the case of using a methallyl type one. Further, at the time of refining the MBN monomer by distillation after EO addition or at the time of heat preservation or in a case where the MBN monomer is dissolved in a solvent to carry out copolymerization with acrylic acid, it is required to heat the monomer in some cases and decomposition reaction may possibly be caused by heating. As described above, if being exposed to a high temperature for a long duration (e.g. at a temperature of 130° C. or higher for 40 hours or longer), it is decomposed to isoprene and PEG. For example, if ethylene oxide is added to an extent of n=150 to elongate the chain, PEG, which a decomposition product, is produced in an amount of about 20 to 50% by mass in the entire products during the ethylene oxide addition and therefore, in the case of copolymerization with acrylic acid or the like, the addition amount of the MBN monomer is required to be about two times high and it may possibly be disadvantageous in terms of economy. Accordingly, an MBN monomer with an EO chain length of up to about 75 mole is substantially preferable to be used in some cases.

Since a methallyl monomer, one of the most preferable embodiments of the invention, does not cause conjugation unlike the MBN monomer and is not decomposed, long chain formation can be carried out more easily. Specifically, an EO chain length of 150 mole or longer is possible and it is easy to adjust the EO chain length to 100 to 180 mole, particularly about 150 mole, which is the optimum length, derived from the unsaturated (poly)alkylene glycol ether monomer of the invention. A polycarboxylic acid copolymer (polycarboxylic acid polymer) having such a long chain PEG can remarkably heighten the dispersibility for a cement composition in the case it is used as an admixture for cement and is thus advantageous for increasing the early strength of concrete (specifically, 24 hour-strength). As one example of preferable reactions of the methallyl monomer, a reaction formula in the case of adding ethylene oxide to methallyl alcohol is shown in the following.

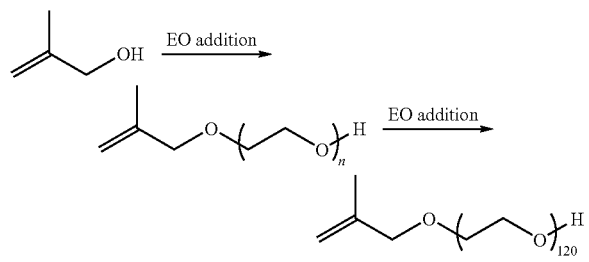

With respect to the methallyl monomer, one of the most preferable embodiments of the invention, the synthesis paths are collectively shown as follows. In step 1, methallyl chloride and ethylene glycol are reacted and consequently, as byproducts, ethylene glycol dimethallyl ether (X), methallyl alcohol (W), and water are produced and methallyl alcohol (W) becomes methallyl alcohol-n-EO by EO addition in step 2.

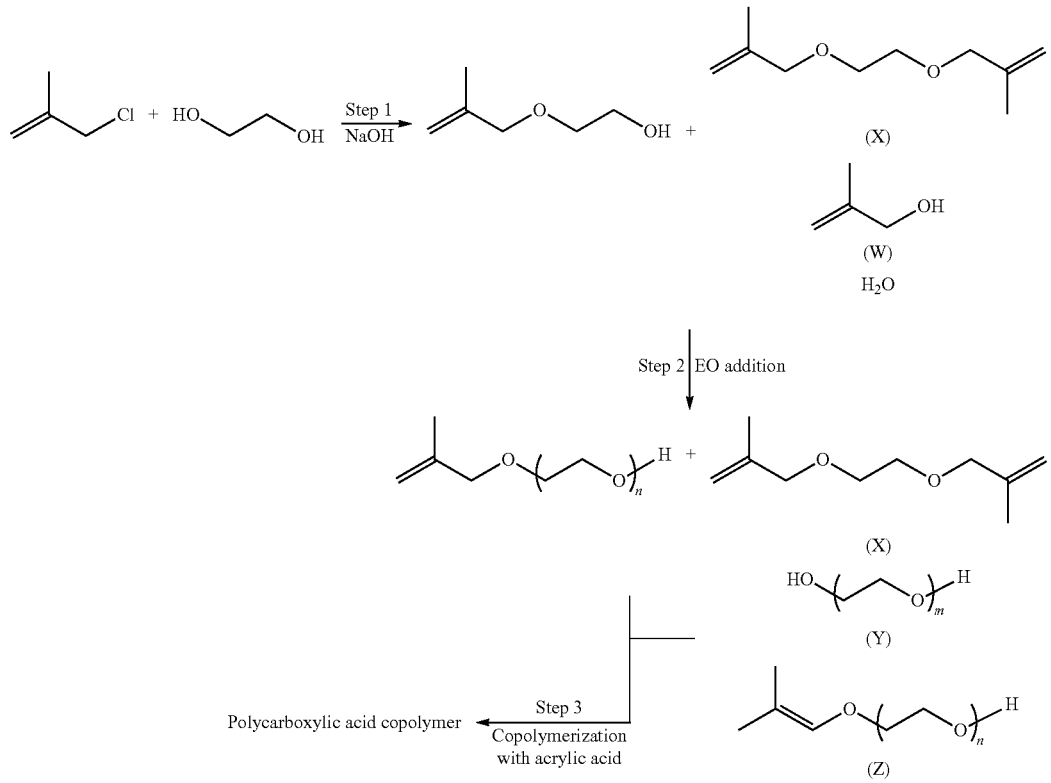

With regard to the above-mentioned step 2, one example of the addition reaction is shown below.

As mentioned below, if EO is added, polyethylene glycol (Y) may be generated as a byproduct.

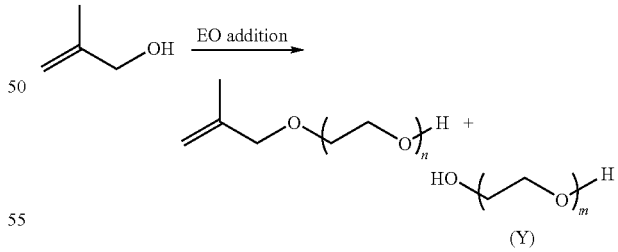

The monomer composition including an unsaturated (poly)alkylene glycol ether monomer and its isomer, and a production method of the monomer composition are mentioned below.

The present invention is an unsaturated (poly)alkylene glycol ether monomer composition to be used for a method for producing a polyalkylene glycol chain-containing polymer, wherein the unsaturated polyalkylene glycol ether monomer composition includes an unsaturated (poly)alkylene glycol ether monomer and its isomer, and the unsaturated (poly)alkylene glycol ether monomer is defined by the following general formula (5):

(wherein, $B^1$ is an organic group defined by the following general formula:

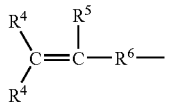

$R^4$ may be the same or different and denotes a hydrogen atom or a hydrocarbon group having 1 to 20;
$R^5$ denotes a monovalent hydrocarbon group having 1 to 20 carbon atoms;
$R^6$ denotes a divalent hydrocarbon group having 1 to 20 carbon atoms;
$R^1O$ may be the same or different and denotes an oxyalkylene group having 2 to 18 carbon atoms;
$n^1$ denotes an average addition mole number of the oxyalkylene group and is a numeral of 1 to 300; and
$R^3$ denotes a hydrogen atom or a hydrocarbon group having 1 to 20 carbon atoms, and
the isomer is defined by the following general formula (6):

(wherein, $B^2$ is defined by the following general formula:

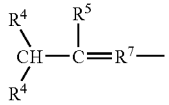

$R^4$ may be the same or different and denotes a hydrogen atom or a hydrocarbon group having 1 to 20 carbon atoms;
$R^5$ denotes a hydrogen atom or a monovalent hydrocarbon group having 1 to 20 carbon atoms;
$R^7$ denotes a trivalent hydrocarbon group having 1 to 20 carbon atoms;
$R^1O$ may be the same or different and denotes an oxyalkylene group having 2 to 18 carbon atoms;
$n^2$ denotes average addition mole number of the oxyalkylene group and is a numeral of 1 to 300; and
$R^3$ denotes a hydrogen atom or a hydrocarbon group having 1 to 20 carbon atoms, and
the unsaturated polyalkylene glycol ether monomer composition includes 0.01 to 20 parts by mass of the isomer to 100 parts by mass of the unsaturated (poly)alkylene glycol ether monomer.

With regard to the preferable structure of the above-mentioned $B^1$, $R^4$ may be the same or different and preferably denotes a hydrogen atom or a hydrocarbon group having 1 to 4 carbon atoms, and more preferably denotes a hydrogen atom or a methyl group; $R^6$ preferably denotes a hydrogen atom or a hydrocarbon group having 1 to 4 carbon atoms, and more preferably denotes a hydrogen atom or a methyl group; and $R^6$ preferably denotes a divalent hydrocarbon group having 1 to 4 carbon atoms, and more preferably a divalent hydrocarbon group having 1 or 2 carbon atoms.

With regard to the preferable structure of the above-mentioned $B^2$, $R^4$ may be the same or different and preferably denotes a hydrogen atom or a hydrocarbon group having 1 to 4 carbon atoms, and more preferably denotes a hydrogen atom or a methyl group; $R^5$ preferably denotes a hydrogen atom or a hydrocarbon group having 1 to 4 carbon atoms, and more preferably denotes a hydrogen atom or a methyl group; and $R^7$ preferably denotes a trivalent hydrocarbon group having 1 to 4 carbon atoms, and more preferably denotes a trivalent hydrocarbon group having 1 or 2 carbon atoms.

With regard to the preferable structure of the above-mentioned $R^3$, a hydrogen atom or a hydrocarbon group having 1 to 4 carbon atoms is preferably and a hydrogen atom and a methyl group is more preferable.

If such a monomer composition is used for producing a (poly)alkylene glycol chain-containing polymer, a polymer which is more preferably used in an admixture for cement and the like and which is excellent in dispersibility can be produced. As a preferable embodiment, an embodiment in which the above-mentioned polyalkylene glycol ether monomer composition is produced by any of the above-mentioned unsaturated polyalkylene glycol ether monomer production method is mentioned.

The present invention is further a (poly)alkylene glycol chain-containing polymer composition including a polyalkylene glycol chain-containing polymer and an isomer of an unsaturated polyalkylene glycol ether monomer, wherein the isomer is defined by the following formula (6):

(wherein, $B^2$ is an organic group defined by the following general formula:

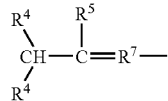

$R^4$ may be the same or different and denotes a hydrogen atom or a hydrocarbon group having 1 to 20 carbon atoms;
$R^5$ denotes a monovalent hydrocarbon group containing 1 to 20 carbon atoms;
$R^7$ denotes a trivalent hydrocarbon group having 1 to 20 carbon atoms;
$R^1O$ may be the same or different and denotes an oxyalkylene group having 2 to 18 carbon atoms;
$n^2$ denotes an average addition mole number of the oxyalkylene group and is a numeral of 1 to 300; and
$R^3$ denotes a hydrogen atom or a hydrocarbon group having 1 to 20 carbon atoms), and
the polyalkylene glycol chain-containing polymer composition includes 0.01 to 10 parts by mass of an isomer of the unsaturated polyalkylene glycol monomer to 100 parts by mass of the polyalkylene glycol chain-containing polymer. In this case, it is preferable that the above-mentioned polyalkylene glycol chain-containing polymer is obtained by the above-mentioned polyalkylene glycol chain-containing polymer production method. In addition, if this polymer composition is used in an admixture for cement and the like, the dispersibility is improved and excellent characteristics are exhibited. It is preferable that the above-mentioned (poly)alkylene glycol chain-containing polymer composition is produced by any of the above-mentioned unsaturated polyalkylene glycol ether monomer production method, or one or both of the (poly)alkylene glycol chain-containing polymer production methods.

It is preferable that the above-mentioned (poly)alkylene glycol chain-containing polymer includes a constitutional unit derived from an unsaturated (poly)alkylene glycol ether monomer component represented by the following general formula:

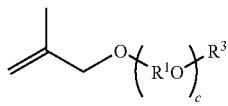

(wherein, $R^1O$ may be the same or different and denotes an oxyalkylene group containing 2 to 18 carbon atoms;

c denotes an average addition mole number of the oxyalkylene group and is a numeral of 1 to 300; and $R^3$ denotes a hydrogen atom or a hydrocarbon group having 1 to 20 carbon atoms). Further, a polymer composition containing this polymer is preferable as the above-mentioned (poly)alkylene glycol chain-containing polymer. The preferable range of the above-mentioned reference numeral c that is an average addition mole number of the oxyalkylene group in the constitutional unit derived from the unsaturated (poly) alkylene glycol ether monomer component is the same as the above-mentioned preferable range of the average additional mole number of the oxyalkylene group.

The present invention is also a production method of the unsaturated (poly)alkylene glycol ether monomer composition of by addition reaction of an alkylene oxide on an unsaturated (poly)alkylene glycol ether monomer, wherein the production method comprises a step of carrying out addition reaction of the alkylene oxide under condition that the average addition mole number of the oxyalkylene group of the unsaturated (poly)alkylene glycol ether monomer is 30 or higher and the amount of its isomers is not more than 20 parts by mass to 100 parts by mass of the unsaturated (poly)alkylene glycol ether monomer. In this case, it is preferable that the unsaturated polyalkylene glycol ether monomer composition includes the unsaturated (poly)alkylene glycol ether monomer defined by the above general formula (5) and an isomer of the unsaturated (poly)alkylene glycol ether monomer defined by the above formula general (6), and the composition includes 0.01 to 20 parts by mass of the isomer to 100 parts by mass of the unsaturated (poly)alkylene glycol ether monomer. It is preferable that the content of each monomer is within the above-mentioned range. It is preferable that the above-mentioned unsaturated (poly)alkylene glycol ether monomer composition production method includes any of the above-mentioned configurations mentioned in the unsaturated polyalkylene glycol ether monomer production method. The preferable structure of $B^2$ in the formula is the same as in the above-mentioned $B^2$. With regard to the preferable structure of the above-mentioned $R^3$, a hydrogen atom or a hydrocarbon group containing 1 to 4 is preferable and a hydrogen atom or a methyl group is more preferable. Further, the "unsaturated (poly)alkylene glycol ether monomer with an average addition mole number of the oxyalkylene group of not less than 30" may be referred to also as an "unsaturated (poly)alkylene glycol ether monomer with m30"; the "isomers of the unsaturated (poly)alkylene glycol ether monomer with m30" may be referred to also as "isomers with m30".

The above-mentioned production method involves addition reaction of an alkylene oxide under conditions that isomers of the unsaturated polyalkylene glycol ether are controlled to be not higher than 20 parts to 100 parts of the unsaturated polyalkylene glycol ether having an average addition mole number of an oxyalkylene group of not less than 30. In the production method, if the amount of the isomers with m30 exceed 20 parts, the polymerization ratio (a pure component in the polymer) of a (poly)alkylene glycol chain-containing polymer obtained in the polymerization step where the above-mentioned monomer composition is used is lowered and it may possibly become impossible to obtain sufficient cement composition dispersibility and fluidity retention capability. The content of the isomers with m30 is not higher than 20 parts to 100 parts of the unsaturated (poly)alkylene glycol ether monomer with m30, preferably not higher than 15 parts, more preferably not higher than 12 parts, further preferably not higher than 10 parts, furthermore preferably not higher than 8 parts, even more preferably not higher than 6 parts, even more preferably not higher than 5 parts, even more preferably not higher than 4 parts, even more preferably not higher than 3 parts, even more preferably not higher than 2 parts, and even more preferably not higher than 1 part. On the other hand, the content of the isomers with m30 is more preferable as the isomer with m30 content is lower in terms of the dispersibility of the obtained polymer for a cement composition, however they are contained preferably in an amount of not less than 0.001 parts to 100 parts of the unsaturated (poly)alkylene glycol ether monomer with m30 and more preferably not less than 0.01 parts, and even more preferably not less than 0.1 parts in terms of the improvement in the state of the cement composition.

The unsaturated (poly)alkylene glycol ether monomer with m30 and the isomers with m30 have an average addition mole number of 30 or higher. The average addition mole number is preferable to be high to a certain extent and more preferable to be not less than specified values in the following order (more preferable as the numerical value is higher). That is, not less than 35, not less than 50, not less than 75, not less than 100, not less than 110, not less than 120, not less than 135, and not less than 150. Further, the average addition mole number is also preferably not too high and it is more preferable to be not more than specified values in this order (more preferable as the numerical value is smaller). That is, not more than 280, not more than 250, not more than 225, and not more than 200. As the average addition mole number is smaller, the hydrophilicity is decreased more and the effect of repelling cement particles is deteriorated more, and accordingly the dispersibility of the copolymer to be obtained may possibly be decreased and on the other hand, if it exceeds 300, the copolymerization reactivity may possibly be lowered when the unsaturated (poly)alkylene glycol ether monomer is used for polymerization.

The unsaturated (poly)alkylene glycol ether monomer with m30 is preferable to have an unsaturated bond-containing group, an alkylene glycol portion, and an ether bond. As such an unsaturated (poly)alkylene glycol ether monomer, specifically, the unsaturated (poly)alkylene glycol ether monomer with m30 is preferably those defined by the following general formula (7):

(wherein X denotes an alkenyl group having 2 to 6 carbon atoms; $R^1O$ may be the same or different and denotes an oxyalkylene group having 2 to 18 carbon atoms; $n^3$ is a numeral of 30 or higher and denotes an average addition mole number of the oxyalkylene group; and $R^3$ denotes a hydrogen atom or a hydrocarbon group having 1 to 20 carbon atoms).

$R^1O$ denotes an oxyalkylene group having 2 to 18 carbon atoms. The oxyalkylene group is preferably an oxyalkylene group having 2 to 8 carbon atoms and more preferably an oxyalkylene group having 2 to 4 carbon atoms. Specifically, one or more of groups such as an oxyethylene group, an oxypropylene group, an oxybutylene group, and an oxystyrene group are preferable and particularly an oxyethylene group is preferable. In the case the ether monomer has two or more oxyalkylene groups, it is preferable that the ratio of an oxyethylene group is 80% by mole or higher. Accordingly, the balance between hydrophilicity and hydrophobicity can be maintained and the (poly)alkylene glycol chain-containing polycarboxylic acid copolymer obtained by polymerizing the unsaturated (poly)alkylene glycol ether monomer with m30 can be provided with excellent cement particle dispersibility or an effect of reducing the viscosity of concrete. If it is less than 80% by mole, for example, the hydrophobicity of the unsaturated (poly)alkylene glycol ether monomer with m30 becomes stronger, and therefore the obtained polymer also has strong hydrophobicity, which possibly causes a reduction in dispersibility of cement particles and hardening retardation.

The ratio of an oxyethylene group is more preferably not less than 85% by mole, further preferably not less than 90% by mole, especially preferably not less than 95% by mole, and most preferably 100% by mole.

In the case the ether monomer has two or more oxyalkylene groups, the combinations are (oxyethylene groups, oxypropylene groups), (oxyethylene groups, oxybutylene groups), and (oxyethylene groups, oxystyrene groups) are preferable. Particularly, (oxyethylene groups, oxypropylene groups) is more preferable.

The average addition mole number $n^3$ of the alkylene oxide is properly not less than 30. The average addition mole number is preferable to be high to a certain extent and more preferably not less than specified values in the following order (more preferable as the numerical value is higher). That is, not less than 35, not less than 50, not less than 75, not less than 100, not less than 110, not less than 120, not less than 135, and not less than 150. Further, the average addition mole number is also preferably not too high and it is more preferable to be not more than specified values in this order (more preferable as the numerical value is smaller). That is, not more than 280, not more than 250, not more than 225, and not more than 200. As the average addition mole number is smaller, the hydrophilicity is decreased more and the effect of repelling cement particles is deteriorated more and accordingly, the dispersibility of the copolymer which is obtained using the above-mentioned monomer composition may possibly be decreased and on the other hand, if it exceeds 300, the copolymerization reactivity may possibly be lowered in the case the unsaturated (poly)alkylene glycol ether monomer is used for copolymerization. The $R^3$ is preferably those described above for $R^3$. The unsaturated (poly)alkylene glycol ether monomer with m30 is also the same as described above.

As the unsaturated (poly)alkylene glycol ether monomer with m30, those described above are all preferably usable and those defined by the following general formula (8):

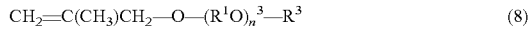

(wherein, $R^1O$ may be the same or different and denotes an oxyalkylene group having 2 to 18 carbon atoms; $n^3$ is a numeral of 30 or higher and denotes an average addition mole number of the oxyalkylene group; and $R^3$ denotes a hydrogen atom or a hydrocarbon group having 1 to 20 carbon atoms) are particularly preferable. In the above-mentioned formula, $R^1O$ denotes an oxyalkylene group having 2 to 18 carbon atoms. In the formula, $R^1O$, $n^3$, and $R^3$ are preferable to be respectively the same as described above.

The isomers with m30 may be isomers of the above-exemplified unsaturated (poly)alkylene glycol ether monomer with m30 and preferably stereoisomers and more preferably geometric isomers. That is, the isomers with m30 are preferable to respectively include a group having an unsaturated bond, an alkylene glycol portion, and an ether bond. Specifically, those defined by the following general formula (9):

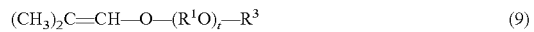

(wherein, $R^1O$ may be the same or different and denotes an oxyalkylene group having 2 to 18 carbon atoms; t is a numeral of 30 or higher and denotes an average addition mole number of the oxyalkylene group; and $R^3$ denotes a hydrogen atom or a hydrocarbon group having 1 to 20 carbon atoms) are preferable. In the above-mentioned formula, $R^1O$ and $R^3$ are preferable to be respectively the same as described above. Further, t is preferably in the same range as that of $n^3$.

In the case the unsaturated (poly)alkylene glycol ether monomer with m30 has a double bond at the terminal as defined by the formula (8), the isomers with m30 are produced by rearranging the double bond of the monomer and it is supposed that the isomerization is caused by heat. Specifically, it is supposed that the rearrangement of the double bond at the terminal of an methallyl alcohol EO (ethylene oxide) adduct or the like to an internal double bond is mainly caused by heat. That is, an unsaturated (poly)alkylene glycol ether monomer with less thermal hysteresis has less isomers (referred to also as a "double bond-rearranged product"). Generally, an internal double bond is more thermodynamically stable. As the double bond carbon has more alkyl substituent groups, the stability is higher. For example, in the case of elimination reaction of producing a double bond, the double bond is produced in a manner that alkyl substituent groups are more connected to the double bond carbon and that is known as the "Saytzeff rule". Accordingly, it is supposed that the internal double bond is formed in a manner that alkyl substituent groups are more connected to the double bond carbon by the rearrangement. Since more alkyl substituent groups exist on the double bond carbon, the isomers with m30 tend to have a lower polymerization property than that of the monomer (unsaturated (poly)alkylene glycol ether monomer) before rearrangement.

One of preferable embodiments of the invention is a production method of a (poly)alkylene glycol chain-containing polymer which is the unsaturated (poly)alkylene glycol ether monomer with m30 defined by the following general formula (8):

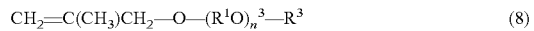

(wherein, $R^1O$ may be the same or different and denotes an oxyalkylene group having 2 to 18 carbon atoms; $n^3$ is a numeral of 30 or higher and denotes an average addition mole number of the oxyalkylene group; and $R^3$ denotes a hydrogen atom or a hydrocarbon group having 1 to 20 carbon atoms) and isomers of the unsaturated (poly)alkylene glycol ether monomer with m30 defined by the following general formula (9):

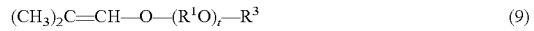

(wherein, $R^1O$ may be the same or different and denotes an oxyalkylene group having 2 to 18 carbon atoms; t is a numeral of 30 or higher and denotes an average addition mole number of the oxyalkylene group; and $R^3$ denotes a hydrogen atom or a hydrocarbon group having 1 to 20 carbon atoms).

As the unsaturated (poly)alkylene glycol ether monomer with m30, it is preferable to obtain the monomer by adding an alkylene oxide to an unsaturated alcohol or an alkylene oxide adduct of an unsaturated alcohol. Specifically, in the case the unsaturated (poly)alkylene glycol ether monomer with m30 is defined by the general formula (7), it is preferable to obtain the monomer by adding an alkylene oxide to X—OH or X—O—(R$^1$O)$_n$—H (wherein X denotes an alkenyl group having 2 to 6 carbon atoms and a is a numeral satisfying n$^3$>a). In the X—OH, X denotes an alkenyl group having 2 to 6 carbon atoms. The alkenyl group is preferably an alkenyl group having 3 to 5 carbons and more preferably an alkenyl group having 4 carbon atoms. Specific examples are preferably unsaturated alcohols having 5 carbon atoms such as 3-methyl-3-butenyl alcohol, 4-pentenyl alcohol, 3-pentenyl alcohol, 2-methyl-3-butenyl alcohol, and 1,1-dimethyl-2-propenyl alcohol; and unsaturated alcohols having 4 carbon atoms such as methallyl alcohol, 3-butenyl alcohol, 2-butenyl alcohol, and 1-methyl-2-butenyl alcohol. Preferable among them are a methallyl group, an allyl group, and a 3-methyl-3-butenyl group and more preferable is a methallyl group.

The X—O—(R$^1$O)$_a$—H is an alkylene oxide adduct of X—OH. The alkylene oxide addition mole number a is not particularly limited as long as n$^3$>a is satisfied, however it is preferable that a <50. It is more preferable that a <40, further preferable that a <30, and especially preferable that a <20. In the case of increasing the addition mole number n$^3$ to a desired level in several steps, the unsaturated polyalkylene glycol obtained in the respective stages can be used for the next step.

In the case a compound obtained by reaction of an unsaturated halide defined as X—Z (Z is a halogen atom) and a (poly)alkylene glycol is used as a starting raw material for obtaining the X—OH, it is preferable to use a (poly)alkylene glycol with a relatively small addition mole number as the (poly)alkylene glycol to be reacted. Examples of X—Z include allyl chloride, allyl bromide, allyl iodide, methallyl chloride, methallyl bromide, methallyl iodide, 3-methyl-3-butenyl chloride, 3-methyl-3-butenyl bromide, 3-methyl-3-butenyl iodide, and the like. The (poly)alkylene glycol addition mole number is preferably relatively small and it is preferably not higher than 30, more preferably not higher than 25, further preferably not higher than 10, furthermore preferably not higher than 5, even more preferably not higher than 3, even more preferably not higher than 2, and even more preferably not higher than 1. The oxyalkylene group in the (poly)alkylene glycol is preferably an oxyalkylene group having 2 to 18 carbon atoms and preferably not less than 80% by mole of the oxyalkylene group is an oxyethylene group, more preferably not less than 85% by mole, further preferably not less than 90% by mole, furthermore preferably not less than 95% by mole, and even more preferably 100% by mole is an oxyethylene group.

Specific examples include (poly)ethylene glycol, (poly)propylene glycol, (poly)butylene glycol, (poly)ethylene glycol-(poly) propylene glycol, (poly)ethylene glycol-(poly)butylene glycol, and the like. When two or more kinds of alkylene oxides are added, they may be added in any of a block form, a random form, a reciprocal form and the like.

The above-mentioned alkylene oxide addition may be carried out to a desired alkylene oxide addition mole number and an unsaturated (poly)alkylene glycol ether monomer having an alkylene oxide addition mole number of 30 or higher can be obtained by one step or several steps of alkylene oxide addition reaction by adding an alkylene oxide to a raw material alcohol or an unsaturated (poly)alkylene glycol ether monomer with an alkylene oxide addition mole number of less than 30. For example, in the case of synthesizing a monomer by adding 120 moles of ethylene oxide to methallyl alcohol, a 10 mole-ethylene oxide adduct is synthesized by adding 10 moles of ethylene oxide to methallyl alcohol in the first stage reaction (step 2-1); a 50 mole-ethylene oxide adduct of methallyl alcohol is synthesized in the second stage by adding 40 moles of ethylene oxide to the 10 mole-adduct synthesized in the first stage reaction (step 2-2); and a 120 mole-ethylene oxide adduct of desired methallyl alcohol is synthesized in the third stage by further adding 70 moles of ethylene oxide to the 50 mole-ethylene oxide adduct of methallyl alcohol synthesized in the second stage reaction (step 2-3). In the case 10 moles or more of alkylene oxide is added, these addition methods, particularly methods of synthesis by alkylene oxide addition reaction in several stages to the desired alkylene oxide mole number, are preferable in terms of short reaction time and improvement in productivity. Further, since the reaction time can be shortened, byproduct production can be suppressed during the reaction. The number of the reaction stages to the desired alkylene oxide addition mole number is not particularly limited, however if the number of stages is too large, the productivity is lowered and therefore, it is preferably not higher than 10 stages, more preferably not higher than 8 stages, further preferably not higher than 5 stages, furthermore preferably not higher than 4 stages, even more preferably not higher than 3 stages, and even more preferably not higher than 2 stages.

Further, the relation of the desired alkylene oxide addition mole number and the alkylene oxide addition stage number is preferable to be as follows. In the case the alkylene oxide addition mole number is not higher than 10, it is preferable to carry out the addition in 1 to 2 stages; in the case the alkylene oxide addition mole number is 11 to 50, it is preferable to carry out the addition in 1 to 3 stages; in the case the alkylene oxide addition mole number is 51 to 150, addition is carried out preferably in 1 to 5 stages, more preferably in 1 to 4 stages, and even more preferably in 1 to 3 stages; and in the case the alkylene oxide addition mole number is 151 to 300, addition is carried out preferably in 2 to 8 stages, more preferably in 2 to 6 stages, further preferably in 2 to 5 stages, and even more preferably in 2 to 4 stages.

The reaction temperature of the alkylene oxide addition reaction is preferable to be set in a manner that the production amount of the isomers with m30 is within the above-mentioned range. That is, it is supposed that the main cause of the rearrangement of the double bond is heat. Accordingly, the temperature of the alkylene oxide addition is preferably as low as possible, however if it is too low, the speed of the alkylene oxide addition reaction is considerably lowered and in consideration of the productivity, it is necessary to set a proper temperature range. The upper limit of the alkylene oxide addition temperature is preferably not higher than 150° C., more preferably not higher than 145° C., further preferably not higher than 140° C., furthermore preferably not higher than 135° C., even more preferably not higher than 130° C., and even more preferably not higher than 125° C. in terms of suppression of the rearrangement of the double bond. The lower limit of the alkylene oxide addition temperature is preferably not less than 100° C., more preferably not less than 105° C., further preferably not less than 110° C., furthermore preferably not less than 115° C., and even more preferably not less than 120° C. in terms of the reaction speed of the alkylene oxide addition reaction and productivity.

With regard to the reaction temperature and the reaction time in the alkylene oxide addition reaction in the above-mentioned steps 2-1 and 2-2, if the reaction temperature is changed once or more in the step 2-1 or the step 2-2, it is preferable (1) to suppress the reaction time at 150° C. or higher to 50% or lower and/or (2) to control the average value of the reaction temperature to be 150° C. or lower. Further, the temperature may be changed in either step 2-1 or 2-2, and the number of times of the temperature change is not especially limited. Specifically, if the reaction temperature is changed in both of the steps 2-1 and 2-2, the following (1) to (4) are preferable.
(1) The reaction time at 150° C. or higher is 50% or less.
(2) The average value of the reaction temperature in the respective stages is 150° C. or lower.
(3) The step with a longer reaction time is adjusted to 150° C. or lower.
(4) The unsaturated (poly)alkylene glycol ether monomer having a long oxyalkylene group tends to be easily translocated, and therefore the reaction temperature in the step 2-2 is lower than that in the step 2-1.

In the case the reaction temperature is changed in the each of the steps 2-1 and 2-2, the following (1) and (2) are preferable.
(1) The reaction time at 150° C. or higher is 50% or less.
(2) The average value of the reaction temperature in the entire alkylene oxide addition reaction stages is 150° C. or lower. Similarly, if at least one stage in the above-mentioned steps 2-1 and 2-2 is performed in two or more stages, the following (1) and/or (2) are/is preferable.
(1) The reaction time at 150° C. or higher is 50% or less in the total reaction hours.
(2) The average value of the reaction temperature is 150° C. or lower.

Among these, it is most preferable that the reaction temperature is 150° C. or lower in two or more stages of the steps 2-1 and 2-2. If the reaction temperature differs in the respective stages, it is preferable that the reaction temperature of 150° C. or lower is the main reaction temperature. For example, it is preferable to satisfy at least one of (i) to (iii).
(i) The average value of the reaction temperature in the respective stages is 150° C. or lower.
(ii) The average value of the reaction temperature in the entire alkylene oxide addition reaction stages is 150° C. or lower.
(iii) The reaction time at 150° C. or higher is 50% or less in the total reaction hours of the respective stages.

With respect to the reaction time of the alkylene oxide addition reaction, in the case of adding an alkylene oxide to a raw material alcohol to the desired alkylene oxide addition mole number in one stage and in the case of adding an alkylene oxide to a raw material alcohol to the desired alkylene oxide addition mole number in several stages, the reaction time of the respective stages is preferably within 60 hours. It is more preferably within 50 hours, further preferably within 40 hours, especially preferably within 30 hours, and most preferably within 20 hours. If the reaction time is too long, the double bond rearrangement and byproduct polyalkylene glycol tends to be increased. In the case of the addition reaction, it is preferable to carry out the reaction under the pressurized pressure. The pressure at the start of addition reaction is preferably 0.01 to 0.5 MPa, more preferably 0.05 to 0.3 MPa, and even more preferably 0.1 to 0.2 MPa. The pressure at the time of addition reaction is preferably not more than 0.9 MPa.

In the addition reaction, it is preferable to use a catalyst. Since the rearrangement reaction remarkably proceeds in heat and acidic conditions, the alkylene oxide addition catalyst is more preferably a metal hydroxide such as sodium hydroxide, potassium hydroxide, or lithium hydroxide, a metal hydride such as sodium hydride or potassium hydride, and a basic catalyst such as alkyl lithium such as butyllithium and methyllithium than an acidic catalyst such as boron trifluoride or titanium tetrafluoride. More preferable among them are metal hydroxides and metal hydrides and furthermore preferable are sodium hydroxide, potassium hydroxide and sodium hydride. With respect to the use amount of the catalyst, the use amount is preferable to be decreased as much as possible even in the case of a basic catalyst in terms of the double bond rearrangement and by-production of polyethylene glycol depending on the use amount. The use amount of the catalyst (catalyst concentration) is preferable to be within the preferable range in the addition reaction as described above.

FIG. 1 shows a schematic chart showing one of preferable embodiments of process of producing a (poly)alkylene glycol chain-containing polymer by obtaining the unsaturated (poly)alkylene glycol ether monomer m30 by addition reaction and polymerizing the unsaturated (poly)alkylene glycol ether monomer m30. In FIG. 1, an addition step (step 2-1 and step 2-2) of adding ethylene oxide to methallyl alcohol and to less than 30 moles of an ethylene oxide adduct of methallyl alcohol and a polymerization step of copolymerizing the obtained ethylene oxide adducts of methallyl alcohol obtained in the addition step with an unsaturated carboxylic acid. In FIG. 1, the addition step is carried out in two stages, however it may be carried out in one stage and in multi-stages, as described above. A polyalkylene glycol (polyethylene glycol in FIG. 1), which is a byproduct A produced in step 2-1 is generally by-produced by reaction of the alkylene oxide with water contained in the unsaturated alcohol and an unsaturated alcohol alkylene glycol adduct, which are raw materials in step 2-1, and water derived from a metal oxide used as a catalyst in the addition reaction. In step 2-2, generally, a polyalkylene glycol with a longer chain than that of the polyalkylene glycol obtained in step 2-1 is produced as a byproduct by further reaction of the by-produced alkylene glycol (polyethylene glycol in FIG. 1) in step 2-1 with an alkylene oxide. In the case of using two or more types, combinations of two or more different (poly)alkylene glycols with an average addition mole number $n^2$ of the oxyalkylene group in a range of 30 or higher may be employed. In this case, the difference in the average addition mole number $n^2$ of the oxyalkylene group is preferably 10 or higher and more preferably 20 or higher. For example, combinations of those having an average addition mole number $n^2$ of 50 to 300 and those having an average addition mole number $n^2$ of 1 to 50, and the like are preferable. In this case, the difference in $n^2$ is preferably not less than 10 and more preferably not less than 20. Further, as for the ratio of them, it is preferable that the ratio (ratio by weight) of those having an average addition mole number $n^2$ of 50 to 300 is higher than those having an average addition mole number $n^2$ of 1 to 50. In the case different three or more types of monomers (i) are used, the difference in the average addition mole number $n^2$ is preferably not less than 10 and more preferably not less than 20.

In a method of producing a (poly)alkylene glycol chain-containing polymer by polymerizing monomer components including the unsaturated (poly)alkylene glycol ether monomer, it is preferable that the unsaturated (poly)alkylene glycol ether monomer m30 and the isomers m30 are contained as monomer raw materials. The monomer components other than the two components (the unsaturated (poly)alkylene glycol ether monomer m30 and the isomers m30) may be properly selected in accordance with the (poly)alkylene glycol chain-containing polymer to be obtained and not particularly limited and preferably an unsaturated carboxylic acid, other components described hereinafter, and the like. As described above, the production method of the (poly)alkylene glycol chain-containing polymer in which the monomer components contain an unsaturated carboxylic acid is also one of preferred embodiments of the invention. In the method of producing the (poly)alkylene glycol chain-containing polymer, it is preferable to properly select the monomers and the ratio of the monomers in accordance with an intended polymer and to carry out polymerization by properly setting the reaction conditions and the like corresponding to the monomers. For example, a step (referred to also as a polymerization step) of obtaining a polycarboxylic acid copolymer by polymerizing the unsaturated (poly)alkylene glycol ether monomer m30 and an unsaturated carboxylic acid will be described in the following.

The unsaturated carboxylic acid (referred to also as a monomer (ii)) is preferably the same as those described above. In the polymerization step, other components (referred to also as a monomer (iii)) may be contained and specifically, monomers (copolymerizable monomers) copolymerizable with the unsaturated (poly)alkylene glycol ether monomer (monomer (i)) and/or the unsaturated carboxylic acid (monomer (ii)) may be contained. As the other components (referred to also as a monomer (iii)), those that are the same as described above are usable.

It is preferable that the production method includes a step of performing addition reaction under condition of existence of an unsaturated (poly)alkylene glycol diether monomer. As the embodiment in which the unsaturated (poly)alkylene glycol diether monomer exists, the above-mentioned embodiments (1) and (2), and the like are preferable. Preferable embodiments are also the same. As described above, a preferable embodiment is that the unsaturated (poly)alkylene glycol diether monomer exists as a byproduct in the raw materials. That is, a method of producing a (poly)alkylene glycol chain-containing polymer by polymerizing monomer components containing the unsaturated (poly)alkylene glycol ether monomer, wherein the production method involves a step of polymerizing monomer raw materials containing 0.001 to 20% by mass of an unsaturated (poly)alkylene glycol diether monomer and the unsaturated (poly)alkylene glycol ether monomer is also one of preferred embodiments of the invention.

The invention further provides a production method of an unsaturated (poly)alkylene glycol ether monomer composition by addition reaction of an alkylene oxide on an unsaturated (poly)alkylene glycol ether monomer, wherein the production method involves a step of obtaining an unsaturated (poly)alkylene glycol ether monomer composition including an unsaturated polyalkylene glycol ether monomer with an average addition mole number of the oxyalkylene group of 50 or higher and its isomers at a ratio of 100:(0 to 10) by mass by carrying out reaction of an alkylene oxide on monomer components containing an unsaturated polyalkylene glycol ether containing an oxyalkylene group with an average addition mole number of the oxyalkylene group of 1 or more and less than 30 and its isomers at a ratio of 100:(0 to 2) by mass. In this case, it is preferable that the unsaturated polyalkylene glycol ether monomer composition includes the unsaturated (poly)alkylene glycol ether monomer defined by the above general formula (5) and an isomer of the unsaturated (poly)alyklene glycol ether monomer defined by the above general formula (6), and the unsaturated polyalkylene glycol ether monomer composition includes 0.01 to 20 parts by mass of the isomer to 100 parts by mass of the unsaturated (poly)alkylene glycol ether monomer. In addition, the above-mentioned range is preferable as a range of the content of each monomer. It is preferable that the above-mentioned unsaturated (poly)alkylene glycol ether monomer composition production method includes any of the configurations shown in the above-mentioned unsaturated polyalkylene glycol ether monomer production method. Further, the "unsaturated (poly)alkylene glycol ether monomer with an average addition mole number of the oxyalkylene group of 1 or higher and less than 30" may be referred to also as an "unsaturated (poly)alkylene glycol ether monomer with n30"; the "isomers of the unsaturated (poly)alkylene glycol ether monomer with n30" may be referred to also as "isomers with n30"; the "unsaturated (poly)alkylene glycol ether monomer with an average addition mole number of the oxyalkylene group of not less than 50" may be referred to also as an "unsaturated (poly)alkylene glycol ether monomer with n50"; and the "isomers of the unsaturated (poly)alkylene glycol ether monomer with n50" may be referred to also as "isomers with n50".

The production method involves a step of obtaining monomer components containing an unsaturated polyalkylene glycol ether monomer containing an oxyalkylene group with an average addition mole number of the oxyalkylene group of 50 or higher and its isomers at a ratio of 100:(0 to 10) by mass by carrying out reaction of an alkylene oxide on monomer components containing an unsaturated polyalkylene glycol ether monomer containing an oxyalkylene group with an average addition mole number of the oxyalkylene group of 1 or more and less than 30 and its isomers at a ratio of 100:(0 to 2) by mass. In the above-mentioned step, the monomer components containing an unsaturated polyalkylene glycol ether monomer containing an oxyalkylene group with an average addition mole number of the oxyalkylene group of 1 or more and less than 30 and its isomers at a ratio of 100:(0 to 2) by mass (hereinafter, simply referred to also as "monomer components with n30") contain the unsaturated (poly)alkylene glycol ether monomer with n30 and the isomers with n30 at the above-mentioned ratio. The content of the isomers with n30 is 0 to 2 parts (2 parts or less) to 100 parts of the unsaturated (poly)alkylene glycol ether monomer with n30. If it exceeds 2 parts, the amount of isomers with n50 tends to be high in the monomer components obtained after alkylene oxide addition (monomer components containing an unsaturated polyalkylene glycol ether monomer containing an oxyalkylene group with an average addition mole number of the oxyalkylene group of 50 or higher and its isomers at a ratio of 100:(0 to 10) by mass). Further, the polymerization ratio (a pure component in the polymer) of the (poly)alkylene glycol chain-containing polymer obtained in the polymerization step is lowered and the cement composition dispersibility and fluidity retaining property may possibly not be sufficient. The content of the isomers with n30 is preferably 2 parts or less to 100 parts of the unsaturated (poly)alkylene glycol ether monomer with n30. It is preferably not more than 1.5 parts, more preferably not more than 1.25 parts, further preferably not more than 1 part, furthermore preferably not more than 0.75 parts, even more preferably not more than 0.5 parts, even more preferably not more than 0.25 parts, and even more preferably not more than 0.1 parts. It is preferable contain substantially none of them at all.

The unsaturated (poly)alkylene glycol ether monomer with n30 and the isomers with n30 have an average addition mole number of the oxyalkylene group of 1 or more and less than 30, preferably 1 to 25, more preferably 1 to 20, and even more preferably 1 to 10.

The monomer components containing an unsaturated polyalkylene glycol ether monomer containing an oxyalkylene group with an average addition mole number of the oxyalkylene group of 50 or higher and its isomers at a ratio of 100:(0 to 10) by mass (hereinafter, simply referred to also as "monomer components with n50") contain the unsaturated (poly)alkylene glycol ether monomer with n50 and the isomers with n50 at the above-mentioned ratio. The content of the isomers with n50 is 0 to 10 parts (10 parts or less) to 100 parts of the unsaturated (poly)alkylene glycol ether monomer with n50. If it exceeds 10 parts, the polymerization ratio (a pure component in the polymer) of the (poly)alkylene glycol chain-containing polymer obtained in the polymerization step is lowered and the cement composition dispersibility and fluidity retaining property may possibly not be sufficient. The content of the isomers with n50 is preferably 10 parts or less to 100 parts of the unsaturated (poly)alkylene glycol ether monomer with n50. It is preferably not more than 8 parts, more preferably not more than 6 parts, further preferably not more than 5 parts, furthermore preferably not more than 4 parts, even more preferably not more than 3 parts, even more preferably not more than 2 parts, and even more preferably not more than 1 part.

The unsaturated (poly)alkylene glycol ether monomer with n50 and the isomers with n50 have an average addition mole number of the oxyalkylene group of not less than 50 and the average addition mole number is preferable to be high to a certain extent and for example, it is preferably not less than 75, more preferably not less than 100, further preferably not less than 120, furthermore preferably not less than 135, and most preferably not less than 150. Further, it is also preferable that the average addition mole number is not too high and for example, it is preferably not more than 300, more preferably not more than 280, further preferably not more than 250, especially preferably not more than 225, and most preferably not more than 200.

The production method of the invention involves a step (referred to also as an "addition step") of obtaining the monomer components with n50 containing the unsaturated (poly)alkylene glycol ether monomer with n50 by causing reaction of an alkylene oxide on the monomer components with n30 containing the unsaturated (poly)alkylene glycol ether monomer with n30 and a step (referred to also as a "polymerization step") of polymerizing the monomer components with n50. The addition step is not particularly limited for the process as long as it is suitable of obtaining the monomer components (monomer components with n50) containing the unsaturated (poly)alkylene glycol ether monomer with n50 and the isomers with n50 at the above-mentioned ratio by adding an alkylene oxide to the monomer components (monomer components with n30) containing the unsaturated (poly)alkylene glycol ether monomer with n30 and the isomers with n30 at the above-mentioned ratio. Specifically, the alkylene oxide addition may be carried out at once or dividedly into multi-stages (in stages).

The number of stages of the alkylene oxide addition differs in accordance with the mole number of the alkylene oxide to be added and in the case the addition mole number is high, it is preferably multi-stages. The relation of the desired alkylene oxide addition mole number and the alkylene oxide addition stage number is preferable to be as follows: in the case the alkylene oxide addition mole number is not higher than 10, it is preferable to carry out the addition in 1 to 2 stages; in the case the alkylene oxide addition mole number is 11 to 50, it is preferable to carry out the addition in 1 to 3 stages; in the case the alkylene oxide addition mole number is 51 to 150, addition is carried out preferably in 1 to 5 stages, more preferably in 1 to 4 stages, and even more preferably in 1 to 3 stages; and in the case the alkylene oxide addition mole number is 151 to 300, addition is carried out preferably in 2 to 8 stages, more preferably in 2 to 6 stages, further preferably in 2 to 5 stages, and even more preferably in 2 to 4 stages.

The reaction temperature of the alkylene oxide addition reaction is preferable to be set in a manner that the production amount of the isomers with n50 is within the above-mentioned range and the preferable reaction temperature is the same as the above-mentioned reaction temperature of the alkylene addition reaction. Further, the reaction time of the alkylene oxide addition reaction and the pressure in the addition reaction are also preferable to be the same as those in the above-mentioned alkylene oxide addition reaction. The addition reaction is preferable to use a catalyst. The type of the catalyst to be employed and the use amount (catalyst concentration) of the catalyst are also the same as those in the above-mentioned alkylene oxide addition reaction.

A mixture of the unsaturated (poly)alkylene glycol ether monomer with an average addition mole number of the oxyalkylene group of 1 or more and less than 30 and its isomers is preferable to be produced in the step of causing reaction of an alkylene oxide on an unsaturated alcohol or an unsaturated (poly)alkylene glycol ether monomer. In other words, in the addition step, it is preferable to obtain an unsaturated (poly)alkylene glycol ether monomer with n30 as a raw material by adding an alkylene oxide to an alcohol or an unsaturated (poly)alkylene glycol ether monomer containing an oxyalkylene group shorter than that of the unsaturated (poly)alkylene glycol ether monomer with n30. In such an addition step for obtaining the unsaturated (poly)alkylene glycol ether monomer with n30, various kinds of alkylene oxide addition conditions such as the number of stages of the alkylene oxide addition, the reaction temperature of the alkylene oxide addition reaction, the reaction time of the alkylene oxide addition reaction, a catalyst to be used, the use amount of the catalyst, and the like are preferably the same as those in the alkylene oxide addition step of obtaining the unsaturated (poly)alkylene glycol ether monomer with n50. The unsaturated (poly)alkylene glycol ether monomer with n30 to be obtained by such an alkylene oxide addition step has a low content of isomers with n30 as byproducts and it is possible to suppress the content to 0 to 2 parts to 100 parts of the unsaturated (poly)alkylene glycol ether monomer with n30. Accordingly, the products obtained by the alkylene oxide addition reaction for producing the unsaturated (poly)alkylene glycol ether monomer with n30 can be used as they are for the alkylene oxide addition step for producing the unsaturated (poly)alkylene glycol ether monomer with n50. In this case, a refining step for the unsaturated (poly)alkylene glycol ether monomer with n30 is unnecessary and the productivity is improved.

The production method of the invention is not limited as a method of obtaining the monomer components with n30 as long as it involves a step of obtaining the monomer components with n50 by adding an alkylene oxide to the monomer components with n30, however it is preferable to obtain the monomer components with n30 by alkylene oxide addition, as described above. In other words, the invention is preferable to involve a step of obtaining the monomer components with n30 by alkylene oxide addition (in this case, this step becomes step 2-1) and a step of obtaining monomer components with n50 by alkylene oxide addition to the monomer components with n30 (in this case, this step becomes step 2-2). As step 2-1, it is preferably a step of obtaining the unsaturated (poly)alkylene glycol ether monomer with n30 by adding an alkylene oxide to an alcohol or to an unsaturated (poly)alkylene glycol ether monomer containing an oxyalkylene group shorter than that of the unsaturated (poly)alkylene glycol ether monomer with n30 in one stage or several stages.

As step 2-2, it is preferably a step of obtaining the unsaturated (poly)alkylene glycol ether monomer with an alkylene oxide addition mole number of not less than 50 by alkylene oxide addition reaction in one stage or several stages to the unsaturated (poly)alkylene glycol ether monomer with n30 obtained in step 2-1.

As preferable embodiments of steps 2-1 and 2-2, for example, in the case of synthesizing a monomer by adding 120 moles of ethylene oxide to methallyl alcohol, a 10 mole-ethylene oxide adduct is synthesized by adding 10 moles of ethylene oxide to methallyl alcohol in the first stage reaction (step 2-1); a 50 mole-ethylene oxide adduct of methallyl alcohol is synthesized in the second stage by further adding 40 moles of ethylene oxide to the 10 mole-adduct synthesized in the first stage reaction (step 2-2); and a 120 mole-ethylene oxide adduct of desired methallyl alcohol is synthesized in the third stage by further adding 70 moles of ethylene oxide to the 50-mole-ethylene oxide adduct of methallyl alcohol synthesized in the second stage reaction (step 2-3). The alkylene oxide addition conditions in steps 2-1 and 2-2 are the same as the above-mentioned conditions. Among these addition conditions, with respect to the number of stages of the alkylene oxide addition, in the case 10 moles or more of alkylene oxide is added, these addition methods, particularly methods of synthesis by alkylene oxide addition reaction in several stages to the desired alkylene oxide mole number, are preferable in terms of short reaction time and improvement in productivity. Further, since the reaction time can be shortened, byproduct production can be suppressed during the reaction. The number of the reaction stages to the desired alkylene oxide addition mole number is not particularly limited, however if the number of stages is too large, the productivity is lowered and therefore, it is preferably not higher than 10 stages, more preferably not higher than 8 stages, further preferably not higher than 5 stages, furthermore preferably not higher than 4 stages, even more preferably not higher than 3 stages, and even more preferably not higher than 2 stages.

In step 2-1 and step 2-2, with respect to the reaction temperature and reaction time of the alkylene oxide addition reaction, in the case the reaction temperature is changed once or more times in either one of step 2-1 and step 2-2, it is preferable (1) to suppress the reaction time at 150° C. or higher to 50% or lower in the entire reaction time and/or (2) to control the average value of the reaction temperature to be 150° C. or lower. The temperature change may be carried out in either of step 2-1 and step 2-2 and the number of times of the temperature change is also not particularly limited. Specifically, in the case the reaction temperature is changed in step 1 and step 2, it is preferable to satisfy the following:
(1) the reaction time at 150° C. or higher is suppressed to 50% or lower;
(2) the average value of the reaction temperature is adjusted to 150° C. or lower;
(3) the step with a longer reaction time is adjusted to 150° C. or lower; and
(4) the reaction temperature in step 2-2 is adjusted to be lower than that in step 2-1 since an unsaturated (poly)alkylene glycol ether monomer with a long oxyalkylene chain tends to cause the rearrangement.

In the case the reaction temperature is changed in the respective steps of step 2-1 and step 2-2, it is preferable (1) to suppress the reaction time at 150° C. or higher to 50% or lower and/or (2) to control the average value of the reaction temperature to be 150° C. or lower. Further, in the case the alkylene oxide addition is carried out in two or more stages in at least one of step 2-1 and step 2-2, it is also preferable (1) to suppress the reaction time at 150° C. or higher to 50% or lower and/or (2) to control the average value of the reaction temperature to be 150° C. or lower. Particularly, the reaction temperature in the two or more stages composing step 2-1 and step 2-2 is most preferably 150° C. or lower. In the case the reaction temperature differs in the respective stages, it is preferable that the reaction temperature of 150° C. or lower is the main reaction temperature. For example, it is preferable (1) that the average value of the reaction temperature in the respective stages is 150° C. or lower; (2) the average value of the reaction temperature in the entire alkylene oxide addition reaction stages is 150° C. or lower; and (3) the reaction time at 150° C. or higher is 50% or less in the total reaction hours of the respective stages.

The unsaturated (poly)alkylene glycol ether monomer is preferably those respectively containing a group containing an unsaturated bond, an alkylene glycol portion, and an ether bond. With respect to the unsaturated (poly)alkylene glycol ether monomer of the invention, first, the unsaturated (poly)alkylene glycol ether monomer with n30 will be described.

The unsaturated (poly)alkylene glycol ether monomer with n30 is preferable to be defined by the following general formula (10):

$$X-O-(R^1O)_{n30}-R^3 \qquad (10)$$

(wherein, X denotes an alkenyl group having 2 to 6 carbon atoms; $R^1O$ may be the same or different and denotes an oxyalkylene group having 2 to 18 carbon atoms; n30 is a numeral of 1 or higher and less than 30 and denotes an average addition mole number of the oxyalkylene group; and $R^3$ denotes a hydrogen atom or a hydrocarbon group having 1 to 20 carbon atoms).

In the general formula (10), those preferable as X are the same as those described above for X. Those preferable for $R^1O$ and their combinations are also the same. The average addition mole number n30 of the alkylene oxide is a numeral of 1 or more and less than 30. The average addition mole number n30 is preferably 1 to 25, more preferably 1 to 20, and even more preferably 1 to 10. Those preferable for $R^3$ are the same as those exemplified above for the $R^3$. Specific examples of the unsaturated (poly)alkylene glycol ether monomer with n30 are the same as those exemplified above.

As the unsaturated (poly)alkylene glycol ether monomer with n30, any one described above may be used preferably and particularly preferable are those defined by the following general formula (11):

$$CH_2=C(CH_3)CH_2-O-(R^1O)_{n30}-R^3 \qquad (11)$$

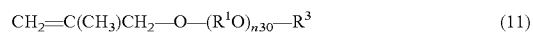

(wherein, $R^1O$ may be the same or different and denotes an oxyalkylene group having 2 to 18 carbon atoms; n30 is a numeral of 1 or more and less than 30 and denotes an average addition mole number of the oxyalkylene group; and $R^3$ denotes a hydrogen atom or a hydrocarbon group having 1 to 20 carbon atoms). In the formula, $R^1O$ denotes an oxyalkylene group having 2 to 18 carbon atoms. In the formula, $R^1O$, n30, and $R^3$ are preferable to be respectively the same as described above.

The isomers with n30 may be isomers of the above-exemplified unsaturated (poly)alkylene glycol ether monomer with n30 and preferably stereoisomers and more preferably geometric isomers. That is, the isomers with n30 are preferable to respectively have a group having an unsaturated bond, an alkylene glycol portion, and an ether bond. Specifically, those defined by the following general formula (12):

$$(CH_3)_2C=CH-O-(R^1O)_{t30}-R^3 \qquad (12)$$

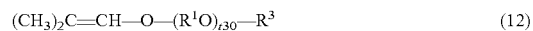

(wherein, $R^1O$ may be the same or different and denotes an oxyalkylene group having 2 to 18 carbon atoms; t30 is a numeral of 1 or more and less than 30 and denotes an average addition mole number of the oxyalkylene group; and $R^3$ denotes a hydrogen atom or a hydrocarbon group having 1 to 20 carbon atoms) are preferable. In the formula, $R^1O$ and $R^3$ are preferable to be respectively the same as described above. Further, t30 is preferably in the same range as that of n30 described above.

In the case the unsaturated (poly)alkylene glycol ether monomer with n30 has a double bond at the terminal as defined by the formula (11), the isomers with n30 are produced by rearranging the double bond of the monomer and it is supposed that the isomerization is caused by heat. Specifically, it is supposed that the rearrangement of the double bond at the terminal of a methallyl alcohol EO (ethylene oxide) adduct or the like to an internal double bond is mainly caused by heat. That is, an unsaturated (poly)alkylene glycol ether monomer with less thermal hysteresis has less isomers (referred to also as a "double bond-rearranged product"). Generally, an internal double bond is more thermodynamically stable. As the double bond carbon has more alkyl substituent groups, the stability is higher. For example, in the case of elimination reaction of producing a double bond, the double bond is produced in a manner that alkyl substituent groups are more connected to the double bond carbon and that is known as the "Saytzeff rule". Accordingly, it is supposed that the internal double bond is formed in a manner that alkyl substituent groups are more connected to the double bond carbon by the rearrangement. In this case, the isomers with n30 are double bond-rearranged products. Since more alkyl substituent groups exist on the double bond carbon, the isomers with n30 tend to have a lower polymerization property than that of the monomer (unsaturated (poly)alkylene glycol ether monomer with n30) before rearrangement.

One of preferred embodiments of the invention also includes a production method of a (poly)alkylene glycol chain-containing polymer in which the unsaturated (poly) alkylene glycol ether monomer with n30 is defined by the general formula (9) and the isomers with n30 are defined by the general formula (12). The unsaturated (poly)alkylene glycol ether monomer with n30 can be obtained by a method same as that for obtaining the unsaturated (poly)alkylene glycol ether monomer.

The X—O—(R$^1$O)$_a$—H is an alkylene oxide adduct of X—OH. The alkylene oxide addition mole number a is not particularly limited as long as 30>n30>a is satisfied. The reference numeral a is 1 or more and less than 30 and is preferably 1 to 25, more preferably 1 to 20, further preferably 1 to 10, furthermore preferably 1 to 5, even more preferably 1 to 3, especially preferably 1 to 2, and most preferably 1. In the case the X—O—(R$^1$O)$_a$—H is used after distillation and refining, a is preferably 10 or less, more preferably 1 to 3, further preferably 1 to 2, and especially preferably 1. In the case of increasing the addition mole number n30 to 1 or more and less than 30 in several steps, the unsaturated polyalkylene glycol obtained in the respective stages can be used for the next step.

In the case a compound obtained by reaction of an unsaturated halide defined as X—Z (Z is halogen) and a (poly) alkylene glycol is used as a starting raw material for obtaining the X—OH, it is preferable to use a (poly)alkylene glycol with a relatively small addition mole number as the (poly) alkylene glycol to be reacted. Examples of X—Z are the same as exemplified above.

Next, the unsaturated (poly)alkylene glycol ether monomer with n50 will be described.

The unsaturated (poly)alkylene glycol ether monomer with n50 is preferably those defined by the following general formula (13):

X—O—(R$^1$O)$_{n50}$—R$^3$  (13)

(wherein, X denotes an alkenyl group having 2 to 6 carbon atoms; R$^1$O may be the same or different and denotes an oxyalkylene group having 2 to 18 carbon atoms; n50 is a numeral of not less than 50 and denotes an average addition mole number of the oxyalkylene group; and R$^3$ denotes a hydrogen atom or a hydrocarbon group having 1 to 20 carbon atoms).

In the general formula (13), X, R$^1$O, and R$^3$ are preferably the same as those for X in the general formula (11). The average addition mole number n50 of the alkylene oxide is a numeral of not less than 50. The average addition mole number n50 is preferable to be a large numeral to a certain extent and more preferably not less than specified values in this order (higher numerical values are more preferable). It is preferable that the average addition mole number n50 is preferably 75 or more, 100 or more, 110 or more, 120 or more, 135 or more, and 150 or more.

As the unsaturated (poly)alkylene glycol ether monomer with n50, any one described above may be used preferably and particularly preferable are those defined by the following general formula (14):

CH$_2$=C(CH$_3$)CH$_2$—O—(R$^1$O)$_{n50}$—R$^3$  (14)

(wherein, R$^1$O may be the same or different and denotes an oxyalkylene group having 2 to 18 carbon atoms; n50 is a numeral of 50 or higher and denotes an average addition mole number of the oxyalkylene group; and R$^3$ denotes a hydrogen atom or a hydrocarbon group having 1 to 20 carbon atoms). In the formula, R$^1$O denotes an oxyalkylene group having 2 to 18 carbon atoms. In the formula, R$^1$O, n50, and R$^3$ are preferable to be respectively the same as described above.

The isomers with n50 may be isomers of the above-exemplified unsaturated (poly)alkylene glycol ether monomer with n50 and preferably stereoisomers and more preferably geometric isomers. That is, the isomers with n50 are preferable to respectively have a group having an unsaturated bond, an alkylene glycol portion, and an ether bond. Specifically, those defined by the following general formula (15):

(CH$_3$)$_2$C=CH—O—(R$^1$O)$_{t50}$—R$^3$  (15)

(wherein, R$^1$O may be the same or different and denotes an oxyalkylene group having 2 to 18 carbon atoms; t50 is a numeral of 50 or higher and denotes an average addition mole number of the oxyalkylene group; and R$^3$ denotes a hydrogen atom or a hydrocarbon group having 1 to 20 carbon atoms) are preferable. In the formula, R$^1$O and R$^3$ are preferable to be respectively the same as described above. Further, t50 is preferably in the same range as that of n50 described above.

In the case the unsaturated (poly)alkylene glycol ether monomer with n50 has a double bond at the terminal as defined by the formula (12), the isomers with n50 are produced by rearranging the double bond of the monomer and it is supposed that the isomerization is caused by heat. The cause of the isomerization is the same as that in the case of the isomers with n30 and the characteristics such as polymerizability are also the same. One of preferred embodiments of the invention also includes a production method of a (poly) alkylene glycol chain-containing polymer in which the unsaturated (poly)alkylene glycol ether monomer with n50 is defined by the general formula (14) and the isomers with n50 are defined by the general formula (15).

One of preferred embodiments of the invention is a production method of a (poly)alkylene glycol chain-containing polymer in which the unsaturated (poly)alkylene glycol ether monomer having an average addition mole number of the oxyalkylene group of 1 or more and less than 30 is defined by the following general formula (11):

CH$_2$=C(CH$_3$)CH$_2$—O—(R$^1$O)$_{n30}$R$^3$  (11)

(wherein, R$^1$O may be the same or different and denotes an oxyalkylene group having 2 to 18 carbon atoms; n30 is a numeral of less than 30 and denotes an average addition mole number of the oxyalkylene group; and R$^3$ denotes a hydrogen atom or a hydrocarbon group having 1 to 20 carbon atoms);

the isomers of the unsaturated (poly)alkylene glycol ether monomer having an average addition mole number of the oxyalkylene group of 1 or more and less than 30 is defined by the following general formula (12):

$$(CH_3)_2C=CH-O-(R^1O)_{t30}-R^3 \quad (12)$$

(wherein, $R^1O$ may be the same or different and denotes an oxyalkylene group having 2 to 18 carbon atoms; t30 is a numeral of less than 30 and denotes an average addition mole number of the oxyalkylene group; and $R^3$ denotes a hydrogen atom or a hydrocarbon group having 1 to 20 carbon atoms); the unsaturated (poly)alkylene glycol ether monomer having an average addition mole number of the oxyalkylene group of not less than 50 is defined by the following general formula (14):

$$CH_2=C(CH_3)CH_2-O-(R^1O)_{n50}-R^3 \quad (14)$$

(wherein, $R^1O$ may be the same or different and denotes an oxyalkylene group having 2 to 18 carbon atoms; n50 is a numeral of 50 or higher and denotes an average addition mole number of the oxyalkylene group; and $R^3$ denotes a hydrogen atom or a hydrocarbon group having 1 to 20 carbon atoms); and the isomers of unsaturated (poly)alkylene glycol ether monomer having an average addition mole number of the oxyalkylene group of not less than 50 is defined by the following general formula (15):

$$(CH_3)_2C=CH-O-(R^1O)_{t50}-R^3 \quad (15)$$

(wherein, $R^1O$ may be the same or different and denotes an oxyalkylene group having 2 to 18 carbon atoms; t50 is a numeral of 50 or higher and denotes an average addition mole number of the oxyalkylene group; and $R^3$ denotes a hydrogen atom or a hydrocarbon group having 1 to 20 carbon atoms).

The unsaturated (poly)alkylene glycol ether monomer with n50 is obtained by alkylene oxide addition to the unsaturated (poly)alkylene glycol ether monomer with n30. Specifically, in the case the unsaturated (poly)alkylene glycol ether monomer with n50 is defined by the general formula (11), it is preferably obtained by adding alkylene oxide to the unsaturated (poly)alkylene glycol ether monomer with n30 defined by the general formula (10):

$$X-O-(R^1O)_{n30}-R^3 \quad (10).$$

The production method of the invention indispensably involves a step of polymerizing monomer components containing the unsaturated (poly)alkylene glycol ether monomer with an average addition mole number of the oxyalkylene group of not less than 50. In this polymerization step, indispensable "monomer components containing the unsaturated (poly)alkylene glycol ether monomer with an average addition mole number of the oxyalkylene group of not less than 50" means the monomer components with n50. That is, they are monomer components containing the unsaturated (poly) alkylene glycol ether monomer with an average addition mole number of the oxyalkylene group of not less than 50 and their isomers at a mass ratio of 100:(0 to 10) obtained in the above-mentioned step. Hereinafter, the polymerization step will be described.

The polymerization step is a step of producing a (poly) alkylene glycol chain-containing polymer by polymerizing the monomer components with n50 containing the unsaturated (poly)alkylene glycol ether monomer with n50 and the monomer raw material contains the unsaturated (poly)alkylene glycol ether monomer with n50 and isomers with n50. The monomer components other than the two components may be properly selected in accordance with the (poly)alkylene glycol chain-containing polymer to be obtained and not particularly limited and preferably an unsaturated carboxylic acid, other components described hereinafter, and the like. In the above-mentioned method of producing the (poly)alkylene glycol chain-containing polymer, it is preferable to properly select the monomers and the ratio of the monomers in accordance with an intended polymer and to carry out polymerization by properly setting the reaction conditions and the like corresponding to the monomers. For example, a step (referred to as a polymerization step) of obtaining a polycarboxylic acid copolymer by polymerizing an unsaturated (poly)alkylene glycol ether monomer with n50 and an unsaturated carboxylic acid will be described in the following.

The polymerization step is for copolymerizing an unsaturated (poly)alkylene glycol ether monomer with n50 and an unsaturated carboxylic acid. The unsaturated (poly)alkylene glycol ether monomer with n50 (referred to also as a monomer (i)) is obtained by the above-mentioned production method involving the alkylene oxide addition step and one or more kinds may be used. In the case of using two or more kinds, combinations of two different monomers with an average addition mole number n of the oxyalkylene group within a range of 1 to 300 may be employed. In this case, the difference in the average addition mole number n of the oxyalkylene group is preferably not less than 10 and more preferably not less than 20. For example, combinations of those having an average addition mole number n in a range of 50 to 300 and those having an average addition mole number n in a range of 1 to 50, and the like are preferable. In this case, the difference in n is preferably not less than 10 and more preferably not less than 20. With respect to the mixing ratio of them, it is preferable to contain those having an average addition mole number n of 50 to 300 at a higher ratio (ratio by weight) than those having an average addition mole number n of 1 to 50. In the case three or more different types of monomers (i) are used, the difference in the average addition mole number n is preferably not lower than 10 and more preferably not lower than 20.

The unsaturated carboxylic acid (referred to also as a monomer (ii)) is the same as those described above. That is, with respect to the above-mentioned production method, one of preferred embodiments of the invention is a production method of a (poly)alkylene glycol chain-containing polymer by polymerizing monomer components containing unsaturated (poly)alkylene glycol ether monomer with n50, wherein the production method involves a step of polymerizing monomer raw materials containing 0.001 to 20% by mass of the unsaturated (poly)alkylene glycol diether monomer as the unsaturated (poly)alkylene glycol ether monomer with n50.

The embodiment of containing the unsaturated (poly)alkylene glycol diether monomer is preferably (1) an embodiment of using raw materials containing an unsaturated (poly)alkylene glycol ether monomer with n50 and an unsaturated (poly)alkylene glycol diether monomer and (2) an embodiment of adding the unsaturated (poly)alkylene glycol diether monomer in the reaction system by adding the unsaturated (poly)alkylene glycol diether monomer to raw materials or the reaction system and either one may be employed and both may be used in combination. In the case of using the unsaturated (poly)alkylene glycol ether monomer with n50 obtained in the above-mentioned production method is used as a raw material, since the unsaturated (poly)alkylene glycol diether monomer is contained as a byproduct, the embodiment (1) can simplify the production process and thus is convenient in the production process. In the embodiment (1), it is preferable to contain 0.001 to 20 parts of the unsaturated (poly)alkylene glycol diether monomer to 100 parts of the unsaturated (poly)alkylene glycol ether monomer with n50 in the raw materials. In this case, it is preferable to employ a production method or production raw materials with which the unsaturated (poly)alkylene glycol diether monomer is contained at the time of obtaining the unsaturated (poly)alkylene glycol ether monomer with n50 and for example, it can be accomplished by using the unsaturated (poly)alkylene glycol ether monomer with n50 obtained by the above-mentioned production method as the raw material and the obtained unsaturated (poly)alkylene glycol ether monomer with n50 is useful as a raw material. As described above, existence of the unsaturated (poly)alkylene glycol diether monomer as a byproduct in the raw material is a preferable embodiment. That is, one of preferable embodiments of the invention is a method for producing a (poly)alkylene glycol chain-containing polymer by polymerizing monomer components containing the unsaturated (poly)alkylene glycol ether monomer with n50, wherein the production method involves a step of polymerizing monomer raw materials containing 0.001 to 20% by mass of an unsaturated (poly)alkylene glycol diether monomer as the unsaturated (poly)alkylene glycol ether monomer with n50.

The unsaturated (poly)alkylene glycol diether monomer has a group having an unsaturated bond, an alkylene glycol portion, and a diether bond. Such unsaturated (poly)alkylene glycol diether monomer is preferable to be an embodiment that the group having an unsaturated bond and the alkylene glycol portion are bonded by the ether bond. More preferably, two groups having an unsaturated bond are bonded respectively to the alkylene glycol portion by the ether bond. Specifically, the unsaturated (poly)alkylene glycol diether monomer is preferable to be defined by the following general formula (16):

$$X—O—(R^2O)_m—Y \qquad (16)$$

(wherein, X and Y may be the same or different and denote an alkenyl group having 2 to 6 carbon atoms; $R^2O$ may be the same or different and denotes an oxyalkylene group having 2 to 18 carbon atoms; and m denotes an average addition mole number of the oxyalkylene group and is a numeral of 1 to 300). The X and Y may be the same or different and preferably the same as those described above for X.

$R^2O$ denotes an oxyalkylene group having 2 to 18 carbon atoms, preferably an oxyalkylene group having 2 to 8 carbon atoms, and more preferably an oxyalkylene group having 2 to 4 carbon atoms. Specifically, one or more of an oxyethylene group, an oxypropylene group, an oxybutylene group, and an oxystyrene group are preferable and an oxyethylene group is particularly preferable. That is, it is preferably 1 to 200, 1 to 100, 1 to 50, 1 to 25, 1 to 10, 1 to 5, 1 to 3, 1 to 2, and most preferably 1.

In this invention, one of preferred embodiments is a method of producing a (poly)alkylene glycol chain-containing polymer by polymerizing monomer components containing an unsaturated (poly)alkylene glycol ether monomer, wherein the production method involves step 1 of producing an unsaturated (poly)alkylene glycol ether monomer mixture (M1) containing 0 to 2 parts of isomers (M1-2) of an unsaturated (poly)alkylene glycol ether monomer to 100 parts of an unsaturated (poly)alkylene glycol ether monomer (M1-1) having an average addition mole number of the oxyalkylene group of 1 or higher and less than 30 obtained by causing reaction of an alkylene oxide on an unsaturated alcohol or an unsaturated (poly)alkylene glycol ether monomer; step 2 of producing an unsaturated (poly)alkylene glycol ether monomer mixture (M2) containing 0 to 10 parts of isomers (M2-2) of an unsaturated (poly)alkylene glycol ether monomer to 100 parts of an unsaturated (poly)alkylene glycol ether monomer (M2-1) having an average addition mole number of the oxyalkylene group of not less than 50 obtained by causing reaction of an alkylene oxide on the unsaturated (poly)alkylene glycol ether monomer (M1); and step 3 of carrying out polymerization under condition that the unsaturated (poly)alkylene glycol ether monomer mixture (M2) is contained.

Same as the above-mentioned step of producing the (poly)alkylene glycol chain-containing polymer, one of preferable embodiments of production methods of the (poly)alkylene glycol chain-containing polymer can be shown in the schematic chart of FIG. 1. FIG. 1 shows a step of producing a (poly)alkylene glycol chain-containing polymer by obtaining the monomer components with n50 containing the unsaturated (poly)alkylene glycol ether monomer with n50 by addition reaction and polymerizing the obtained unsaturated (poly)alkylene glycol ether monomer with n50. Specifically, the following steps are described: a step (step 1) of obtaining monomer components with n30 containing an unsaturated (poly)alkylene glycol ether monomer with n30 by adding ethylene oxide to methallyl alcohol and to an adduct of less than 30 moles of ethylene oxide of methallyl alcohol (unsaturated (poly)ethylene glycol ether monomer with shorter oxyethylene groups than that of the unsaturated (poly)ethylene glycol ether monomer with n30); a step (step 2) of obtaining monomer components with n50 (containing an unsaturated (poly)ethylene glycol ether monomer with n50 and isomers with n50) by adding ethylene oxide to the product (monomer components with n30) obtained in step 1; and a polymerization step of copolymerizing the monomer components with n50 containing the ethylene oxide adduct of methallyl alcohol and isomers obtained by the addition step (containing the unsaturated (poly)alkylene glycol ether monomer with n50 and isomers with n50) with an unsaturated carboxylic acid. In FIG. 1, the addition step is carried out in two stages, however it may be carried out in one stage and in multi-stages, as described above.

The invention also provides a method for producing a (poly)alkylene glycol chain-containing polymer by polymerizing monomer components containing an unsaturated (poly)alkylene glycol ether monomer, wherein the production method involves polymerizing monomer components containing an unsaturated polyalkylene glycol ether monomer with an average addition mole number of the oxyalkylene group of 1 or more and less than 30 and its isomers at a ratio of 100:(0 to 2) by mass. This production method is preferable to involve the production method of the unsaturated (poly)alkylene glycol ether monomer. Employment of the production method makes it possible to obtain a (poly)alkylene glycol chain-containing polymer with a short oxyalkylene group length. A polymer having an alkylene glycol chain with a short oxyalkylene group length is advantageously excellent in the retention property of fluidity of a cement composition. In the above-mentioned production method, the unsaturated (poly)alkylene glycol ether monomer with an average addition mole number of the oxyalkylene group of 1 or more and less than 30 (unsaturated (poly)alkylene glycol ether monomer with n30), its isomers (isomers with n30), monomer components containing them (monomer components with n30) and the like are preferably the same as described respectively above. In the description of the polymerization step, the step is the same as described above except that the "unsaturated (poly)alkylene glycol ether monomer with n50", the "isomers with n50" and the "monomer components with n50" correspond to the "unsaturated (poly)alkylene glycol ether monomer with n30", the "isomers with n30" and the "monomer components with n30", respectively.

The invention also provides a production method of a (poly)alkylene glycol chain-containing polymer obtained by polymerizing monomer components containing the unsaturated (poly)alkylene glycol ether monomer obtained by the above-mentioned production method.

The (poly)alkylene glycol chain-containing polymer obtained by the above-mentioned production method is a polymer into which the unsaturated (poly)alkylene glycol diether monomer is introduced. That is, the unsaturated (poly)alkylene glycol diether monomer is polymerized with monomer components during polymerization and is not found in the solution after polymerization. Such a polymer containing an unsaturated (poly)alkylene glycol diether monomer (a (poly)alkylene glycol chain-containing polymer) exhibits excellent properties such as dispersibility and fluidity retention property of a cement composition and is thus preferably usable for various applications.

In the case the (poly)alkylene glycol chain-containing polymer is produced in steps 1 to 3, since the production cost is low, it can be used preferably for various applications. Further, if an unsaturated carboxylic acid is used as the monomer to be copolymerized, it is made possible to produce a polycarboxylic acid copolymer excellent in the fluidity, water-reducing property, workability, and addition amount-reducing effect and capable of giving strength and durability of hardened products and good viscosity easy for working in a work field of handing the copolymer and simultaneously improving the workability of the cement composition and addition amount-reducing effect in the case of being used as an admixture for cement. Hereinafter, a polycarboxylic acid copolymer as a preferable example of the (poly)alkylene glycol chain-containing polymer will be described, however polymers other than the polycarboxylic acid copolymer may be employed for the various polymers by properly selecting the constituent components of the polymers. For example, an admixture for cement, including the (poly)alkylene glycol chain-containing polymer contained in the (poly)alkylene glycol chain-containing polymer is also preferable. The ratios of the respective constituent units composing the polycarboxylic acid copolymer are preferable to be the same as those of the mixing ratio of the monomers.

The weight average molecular weight of the polycarboxylic acid copolymer is preferably in a range of 3000 to 300000, more preferably in a range of 5000 to 200000, further preferably in a range of 10000 to 150000, furthermore preferably in a range of 10000 to 100000, and most preferably in a range of 20000 to 80000. It is made possible to obtain an admixture for cement showing better dispersibility by selecting the weight average molecular weight in the above-mentioned range.

The weight average molecular weight of the polymer is a weight average molecular weight measured by gel permeation chromatography (hereinafter, referred to as "GPC") corresponding to polyethylene glycol and it is preferable to be measured in GPC measurement conditions to be described later.

The polycarboxylic acid copolymer is preferable to have a milli-equivalent of carboxyl groups corresponding to the un-neutralized form of all of the carboxyl groups contained in the copolymer per 1 g of the copolymer of preferably 5.50 meq or lower, more preferably in a range of 0.10 to 5.50 meq/g, further preferably in a range of 0.15 to 4.00 meq/g, especially preferably in a range of 0.20 to 3.50 meq/g, and most preferably in a range of 0.30 to 3.00 meq/g.

The milli-equivalent of carboxyl groups corresponding to the un-neutralized form of all of the carboxyl groups contained in the polycarboxylic acid copolymer can be calculated as follows. For example, in the case acrylic acid is used as the unsaturated carboxylic acid and copolymerization is carried out at a composition ratio of the unsaturated (poly)alkylene glycol ether monomer (monomer (i))/unsaturated carboxylic acid (monomer (ii))=90/10 (% by mass), since the molecular weight of acrylic acid is 72, the milli-equivalent of carboxyl groups per 1 g of the copolymer is calculated as $(0.1/72) \times 1000 = 1.39$ (meq/g) (calculation example 1). Further, in the case sodium acrylate is uses as the monomer (ii) and copolymerization is carried out at a composition ratio of the monomer (i)/monomer (ii)=90/10 (% by mass), since the molecular weight of sodium acrylate is 94 and the molecular weight of acrylic acid is 72, the milli-equivalent of carboxyl groups per 1 g of the copolymer is calculated as $(0.1/94)/(0.9+0.1 \times 72/94) \times 1000 = 1.09$ (meq/g) (calculation example 2). Additionally, in the case acrylic acid is used at the time of polymerization and after polymerization, the carboxyl groups derived from acrylic acid are neutralized with sodium hydroxide, calculation can be carried out similarly to the calculation example 2. Further, in the case sodium methacrylate and sodium acrylate are used as the monomer (ii) and copolymerization is carried out at a composition ratio of the monomer (i)/sodium methacrylate/sodium acrylate=90/5/5 (% by mass), since the molecular weights of methacrylic acid, sodium methacrylate, acrylic acid, and sodium acrylate are respectively 86, 108, 72, and 94, the milli-equivalent of carboxyl groups per 1 g of the copolymer is calculated as $(0.05/108+0.05/94)/(0.9+0.05 \times 86/108+0.05 \times 72/94) \times 1000 = 1.02$ (meq/g) (calculation example 3).

The above-mentioned (poly)alykylene glycol ether monomer production method and the above-mentioned (poly)alkylene glycol chain-containing polymer production method may be separately used, but if they are appropriately combined to be used, the effects can be more exhibited. In addition, the (poly)alkylene glycol ether monomer composition and the (poly)alkylene glycol chain-containing polymer composition can more exhibit the effects by being produced by appropriately combining any of the above-mentioned production methods.

The polycarboxylic acid copolymer of the invention is particularly preferably usable as an admixture for cement, a concrete admixture, and the like. As described above, an admixture for cement containing the polycarboxylic acid copolymer is also one of preferred embodiments of the invention.

The admixture for cement contains the polycarboxylic acid copolymer, so that it causes excellent effects such as dispersibility, slump retaining property, and improved durability of mortal and concrete. Further, a cement composition containing the admixture for cement, cement, and water as indispensable components can exhibit both of viscosity (workability, for example, easiness of kneading mortar and shoveling work of concrete in a work field) and fluidity (flow-ability when feeding). The technical correlation of physical properties of the cement composition; "flow value" (fluidity) and the "concrete state" (viscosity); has not been made clear at the present moment, however to explain these phenomena, in comparison of starch syrup and yoghurt, since starch syrup has viscosity, rather high power is required to stir the starch syrup with a spoon (viscosity is high and workability is inferior) but if it is set on a flat plane, it flows and is spread thin. On the other hand, yoghurt can be easily stirred in the case of stirring it with a spoon (viscosity is low and workability is good), but it cannot flow to spread even if it is set on a flat plane.

The polycarboxylic acid copolymer may be used as it is for a main component of the admixture for cement, however it is preferable to adjust the pH to be 5 or higher in terms of the handling property. As described above, copolymerization reaction is preferable to be carried out at a pH of lower than 5 and pH is preferable to be adjusted to 5 or higher after copolymerization. Adjustment of pH is carried out using alkaline substances, e.g. inorganic salts such as hydroxides and carbonates of monovalent metals and divalent metals; ammonia; and organic amines or the like. Further, on completion of the reaction, if necessary, the concentration adjustment can be carried out. Further, the polycarboxylic acid copolymer may be used as it is in form of an aqueous solution for a main component of an admixture for cement or may be used after being powdered by neutralization with hydroxides of divalent metals such as calcium, magnesium, or the like to form a polyvalent metal salt and drying the obtained salt or depositing it on an inorganic powder such as a silica fine powder and drying it.

The admixture for cement indispensably contains the polycarboxylic acid copolymer. The content of the polycarboxylic acid copolymer in the admixture for cement is not particularly limited, however it is preferably 20% by mass or more and further preferably 40% by mass or more on the basis of the solid matter in the admixture for cement, that is, non-volatile components.

In the invention, a solid matter measurement method of the admixture for cement is preferably the following methods.
(Method for Measuring Solid Matter)
1. An aluminum tray is accurately weighed.
2. The object solid matter to be measured is accurately weighed on the aluminum tray accurately weighed in 1.
3. The object solid matter accurately weighed in 2. is put in a drying apparatus adjusted to 130° C. under nitrogen atmosphere for 1 hour.
4. After 1 hour, the object solid matter is taken out of the drying apparatus and cooled for 15 minutes in a desiccator at room temperature.
5. After 15 minutes, the object solid matter is taken out of the desiccator and the aluminum tray+the object solid matter is accurately weighed.
6. The mass of the aluminum tray measured in 1. is subtracted from the weight measured in 5. and successively the result is divided by the mass of the solid matter measured in 2. to measure the solid matter.

The admixture for cement may contain two or more copolymers in combination and examples are combinations of two or more copolymers with different ratios of a constituent unit (I) derived from the monomer (i) and a constituent unit (II) derived from the monomer (ii), combinations of two or more copolymers with different average addition mole numbers of the oxyalkylene group of the constituent unit (I) derived from the monomer (i), and the like.

The admixture for cement is preferable to contain 1 to 50% by mass of a polyalkylene glycol in the copolymer besides the polycarboxylic acid copolymer. It is more preferably 2 to 50% by mass, further preferably 2 to 40% by mass, and especially preferably 3 to 30% by mass. Addition of the polyalkylene glycol makes the admixture for cement a dispersant capable of improving the workability of mortar and concrete more. If the adding ratio of the polyalkylene glycol is less than 1% by mass, the effect of improving the workability of mortar and concrete becomes insufficient and on the other hand, if it exceeds 50% by mass, the dispersibility for cement is deteriorated and it is therefore undesirable.

The polyalkylene glycol is properly those in which the oxyalkylene group has 2 to 18 carbon atoms, preferably those in which the oxyalkylene group has 2 to 8 carbon atoms, and more preferably those in which the oxyalkylene group has 2 to 4 carbon atoms. Further, the polyalkylene glycol is required to be water-soluble, it is preferable to include at least an oxyalkylene group having 2 carbon atoms, which has high hydrophilicity, that is, an oxyethylene group, as an indispensable component and it is more preferable to contain not less than 90% by mole of an oxyethylene group. The repeating units of the oxyalkylene group may be the same or different and in the case the oxyalkylene group is in form of a mixture of two or more types, the addition state may be any one of block type addition, random addition, reciprocal addition and the like. The terminal group of the polyalkylene glycol is properly a hydrogen atom, an alkyl group having 1 to 30 carbon atoms or an (alkyl)phenyl group. A hydrogen atom is preferable. The average molecular weight of the polyalkylene glycol is preferably in a range of 500 to 200000, more preferably in a range of 1000 to 100000, and even more preferably in a range of 2000 to 50000.

Specific examples of the polyalkylene glycol are polyethylene glycol, polypropylene glycol, polyethylene-polypropylene glycol, polyethylene-polybutylene glycol, and the like, and since the polyalkylene glycol is required to be water soluble, polyethylene glycol containing an oxyethylene group with high hydrophilicity as an indispensable component and polypropylene glycol are preferable and polyethylene glycol is most preferable.

It is preferable to obtain the admixture for cement containing the polyalkylene glycol by using an unsaturated (poly)alkylene glycol ether monomer (monomer (i)) together with the polyalkylene glycol produced as an impurity in step 2 without removal for step 3. As described above, use of the unsaturated (poly)alkylene glycol ether monomer (monomer (i)) containing the polyalkylene glycol as an impurity makes it easy to easily obtain the admixture for cement containing the polyalkylene glycol. In the case the (poly)alkylene glycol used for reaction in step 1 and the alkylene oxide to be added in step 2 are the same alkylene group, the monomer (i) can be obtained by adding the alkylene oxide to an unsaturated bond-containing alcohol obtained by replacing halogen of a halide having an unsaturated bond with a hydroxyl group. For example, it can be obtained by adding an alkylene oxide to unsaturated bond-containing alcohols (unsaturated alcohols) such as methallyl alcohol, 3-buten-1-ol, allyl alcohol, and the like. In such addition reaction, if compounds having active hydrogen such as saturated aliphatic alcohols (methanol, ethanol, and the like), water and the like other than the unsaturated bond-containing alcohols (unsaturated alcohols) exist in the reaction system, polyalkylene glycols may possibly be produced as byproducts beside the intended unsaturated (poly)alkylene glycol ether monomer. The refining step and the like can be simplified and at the same time the admixture for cement to be obtained contains the copolymer and polyalkylene glycols by using the products obtained by the addition reaction as raw materials as they are without removing the by-produced polyalkylene glycols and thus the workability of mortar and concrete before hardening can be improved.

The content of the polyalkylene glycols to be contained as impurities is properly 0.5 to 50% by mass in the unsaturated (poly)alkylene glycol ether monomer, preferably 1 to 40% by mass, more preferably 2 to 30% by mass, and even more preferably 3 to 20% by mass. If the ratio of the polyalkylene glycol exceeds 50% by mass, since the polyalkylene glycol itself is inferior in the cement particle dispersibility, it results in increase in use amount of the admixture for cement and is not preferable.

The admixture for cement is preferable to contain, besides the polycarboxylic acid copolymer, 1 to 100% by mass of an unsaturated (poly)alkylene glycol ether having the polyalkylene oxide chain (monomer (i)) to the copolymer. It is more preferably 2 to 100% by mass, further preferably 3 to 90% by mass, and especially preferably 5 to 80% by mass. Since the admixture for cement contains the monomer (i), the dispersant can improve the workability of mortar and concrete. If the content of the monomer (i) is less than 1% by mass, the effect of improving the workability of mortar and concrete becomes insufficient and on the other hand, if it exceeds 100% by mass, the dispersibility for cement is deteriorated and it is not preferable.

The admixture for cement containing the monomer (i) can be obtained easily by stopping the polymerization reaction at the moment the ratio of the un-reacted monomer (i) reaches 1 to 100% by mass to the produced polymer in the case of copolymerization to obtain the polycarboxylic acid copolymer. Accordingly, the obtained products contain the monomer (i) besides the copolymer and can exhibit excellent dispersibility. The moment for stopping the polymerization reaction is preferably at a moment the monomer (i) remains in an amount of 2 to 80% by mass to the polymer; more preferably at a moment of remaining in an amount of 3 to 70% by mass; and even more preferably at a moment of remaining in an amount of 5 to 60% by mass. If the polymerization reaction is stopped at a moment the ratio of the un-reacted monomer (i) is less than 1% by mass to the produced polymer, the obtained admixture for cement may have an insufficient effect to improve workability of mortar and concrete and on the other hand, if the polymerization reaction is stopped at a moment where the ratio exceeds 100% by mass, the dispersibility for cement is deteriorated.

One of most preferred embodiments of the admixture for cement contains the polyalkylene glycol and the monomer (i) at the above-mentioned ratio. Since both components are contained, the dispersant is remarkably excellent in workability of mortar and concrete.

The admixture for cement can be used for hydraulic materials, that is, cement and hydraulic materials other than cement such as gypsum. Specific examples of hydraulic compositions containing a hydraulic material, water, and the admixture for cement and if necessary fine aggregate (sand and the like) and coarse aggregate (crushed rocks and the like) include cement paste, mortar, concrete, plaster, and the like.

Among the above exemplified hydraulic compositions, a cement composition using cement as a hydraulic material is most common and a cement composition containing the admixture for cement, cement, and water as indispensable components is also one of preferred embodiments of the invention.

The cement to be used in the cement composition is not particularly limited. Examples are portland cement (normal cement, high early strength cement, ultra high early strength cement, moderate heat cement, sulfate-resistant cement, their low alkalinity types), various kinds of mixed cement (blast furnace cement, silica cement, fly ash cement), white portland cement, alumina cement, ultra rapid hardening cement, (1 clinker rapid hardening cement, 2 clinker rapid hardening cement, magnesium phosphate cement), cement for grouting, oil well cement, low heat cement (low heat generation type blast furnace cement, fly ash-mixed low heat generation type blast furnace cement, belite-high content cement), ultra high strength cement, cement type solidifying material, eco-cement (cement produced using one or more kinds of municipal refuse incineration ashes and sewage sludge incineration ashes as raw materials) and the like and further fine powders such as blast furnace slag, fly ash, sintered ash, clinker ash, husk ash, silica fume, silica powder, and limestone powder and gypsum may be added. Further, as aggregate, besides gravel, crushed rock, pulverized slag, and regenerated aggregate, silicic, clay type, zircon type, high alumina type, silicon carbide type, graphite type, chromium type, chromium-magnesium type, magnesia type refractory aggregate, and the like can be used.

In the cement composition, the unit water amount per 1 $m^3$, cement use amount, and water/cement ratio are not particularly limited and the unit water amount is 100 to 185 $kg/m^3$, the cement use amount is 250 to 800 $kg/m^3$, and the water/cement ratio (weight ratio)=0.1 to 0.7; and preferably recommended are the unit water amount of 120 to 175 $kg/m^3$, the cement use amount of 270 to 800 $kg/m^3$, and the water/cement ratio (weight ratio) of 0.15 to 0.65. As described above, the cement composition of the invention can be widely usable from poor mixing to rich mixing and is efficient for both of high strength concrete with a high unit cement amount and poor blend concrete with a unit cement amount of not more than 300 $kg/m^3$. The cement composition of the invention can be favorably usable in a range of a relatively high water-reduced ratio, that is, in a range of a relatively low water/cement ratio, for example, the water/cement ratio (weight ratio)=0.15 to 0.5 (preferably 0.15 to 0.4).

The mixing ratio of the admixture for cement in the cement composition of the invention is not particularly limited, however in the case of using the admixture for cement for mortar, concrete or the like using hydraulic cement, it is preferably 0.01 to 10% by mass, more preferably 0.02 to 5% by mass, and ever more preferably 0.05 to 3% by mass in cement. Its addition causes various preferable effects such as decrease in unit water amount, increase in strength, and improvement in durability. If the adding ratio is less than 0.01% by mass, it is insufficient in terms of the functions and on the contrary, even if a large amount exceeding 10% by mass is used, the effects practically become plateau and it is disadvantageous in terms of economy.

The cement composition is effective for concrete for concrete secondary products, concrete for centrifugal formation, concrete for vibration fastening hardening, concrete for steam curing, spraying concrete and the like, and also effective for mortar and concrete required to have high fluidity such as high fluidity concrete, self-compacting concrete, and self-leveling materials.

The cement composition may contain publicly known admixtures for cement. Known usable admixtures for cement are not particularly limited and may be various kinds of sulfonic acid dispersants containing sulfonic acid groups in molecules and various kinds of polycarboxylic acid dispersants containing (poly)oxyalkylene chains and carboxyl groups in molecules. Examples of the sulfonic acid dispersants are lignin sulfonic acid salts, polyol derivatives; naphthalenesulfonic acid-formalin condensates; melamine-sulfonic acid-formalin condensates; polystyrenesulfonic acid salts; and aminosulfonic acids such as aminoarylsulfonic acid-phenol-formaldehyde condensates. Further, examples of the polycarboxylic acid dispersants are copolymers obtained by copolymerizing monomer components indispensably containing polyoxyalkylene chain-containing polyalkylene glycol mono(meth)acrylic acid ester monomers containing an average addition mole number of 2 to 300 of alkylene oxide having 2 to 18 carbon atoms and (meth)acrylic acid monomers; copolymers obtained by copolymerizing monomer components indispensably containing three kinds of monomers, that is, polyoxyalkylene chain-containing polyalkylene glycol mono(meth)acrylic acid ester monomers containing an average addition mole number of 2 to 300 of alkylene oxide having 2 to 3 carbon atoms, (meth)acrylic acid monomers, and (meth)acrylic acid alkyl esters; copolymers obtained by copolymerizing monomer components indispensably containing three kinds of monomers, that is, polyoxyalkylene chain-containing polyalkylene glycol mono(meth)acrylic acid ester monomers containing an average addition mole number of 2 to 300 of alkylene oxide having 2 to 3 carbon atoms, (meth)acrylic acid monomers, and (meth)allylsulfonic acid (salts) (or either one of vinylsulfonic acid (salts) or p-(meth)allyloxybenzenesulfonic acid (salts)); copolymers obtained by copolymerizing monomer components indispensably containing three kinds of monomers, that is, polyoxyalkylene chain-containing polyalkylene glycol mono(meth)acrylic acid ester monomers containing an average addition mole number of 2 to 50 of ethylene oxide, (meth)acrylic acid monomers, and (meth)allylsulfonic acid (salts) to obtain copolymers and further graft polymerizing the obtained copolymers with (meth)acrylic amide and/or 2-(meth)acrylamide-2-methylpropanesulfonic acid; copolymers obtained by copolymerizing monomer components indispensably containing four kinds of monomers, that is, polyoxyalkylene chain-containing polyethylene glycol mono(meth)acrylic acid ester monomers containing an average addition mole number of 5 to 50 of ethylene oxide, polyoxyalkylene chain-containing polyethylene glycol mono(meth)allyl ether monomers containing an average addition mole number of 1 to 30 of ethylene oxide, (meth)acrylic acid monomers, and (meth)allylsulfonic acid (salts) (or p-(meth)allyloxybenzenesulfonic acid (salts)); copolymers obtained by copolymerizing monomer components indispensably containing polyoxyalkylene chain-containing polyalkylene glycol mono(meth) allyl ether monomers containing an average addition mole number of 2 to 300 of alkylene oxide having 2 to 18 carbon atoms and maleic acid monomers; copolymers obtained by copolymerizing monomer components indispensably containing polyoxyalkylene chain-containing polyalkylene glycol mono(meth)allyl ether monomers containing an average addition mole number of 2 to 300 of alkylene oxide having 2 to 4 carbon atoms and maleic acid polyalkylene glycol ester monomers; copolymers obtained by copolymerizing monomer components indispensably containing polyoxyalkylene chain-containing polyalkylene glycol 3-methyl-3-butenyl ether monomers containing an average addition mole number of 2 to 300 of alkylene oxide having 2 to 4 carbon atoms and maleic acid monomers; and the like. A plurality of the publicly known admixtures for cement may be used in combination.

In the case of using the publicly known cement dispersants, the mixing ratio by weight of the admixtures for cement and the publicly known admixtures for cement cannot be definitely determined on the basis of the difference in the types, amounts, testing conditions and the like of publicly known admixtures for cement to be used, however it is preferably in a range of (5:95) to (95:5) and more preferably in a range of (10: 90) to (90:10).

Further, the cement composition may contain other known cement additives (materials) exemplified in (1) to (20) below.
(1) Water-soluble polymer substances: unsaturated carboxylic acid polymers such as sodium salts of a polyacrylic acid (sodium), polymethacrylic acid (sodium), polymaleic acid (sodium), acrylic acid-maleic acid polymer; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharide derivatives obtained by substituting hydrogen atoms of some or all of hydroxyl groups of alkylated or hydroxyalkylated derivatives of polysaccharides such as methyl cellulose, ethyl cellulose, hydroxyethyl cellulose, hydroxypropyl cellulose, and the like with hydrophobic substituent groups having hydrocarbon chains having 8 to 40 carbon atoms as partial structures and ionic hydrophilic substituent groups containing sulfonic acid groups or their salts as partial structures; polysaccharides produced by microbial fermentation, such as yeast glucan, xanthane gum, and β-1,3 glucans (having a straight or branched chain, examples thereof include curdlan, paramylum, pachyman, scleroglucan, and laminaran); polyacrylamide; polyvinyl alcohol; starch; starch phosphoric ester; sodium alginate; gelatin; acrylic acid copolymers having an amino group in the molecule and qualified compounds thereof.
(2) Polymer emulsion: copolymers of various vinyl monomers such as alkyl(meth)acrylate.
(3) Retarding agent: oxycarboxylic acids, for example, gluconic acid, glucoheptonic acid, arabonic acid, malic acid or citric acid, and inorganic or organic salts such as sodium, potassium, calcium, magnesium, and ammonium, triethanol amine of these acids; the following sugars, monosaccharides such as glucose, fructose, galactose, saccharose, xylose, apiose, ribose, and isomerized sugar, oligosaccharides such as a disaccharide and trisaccharide, oligosaccharides such as dextrin, polysaccharides such as dextran, and molasses containing these saccharides; sugar alcohols such as sorbitol; magnesium silicofluoride; phosphoric acid and salts thereof or ester borates thereof; aminocarboxylic acid and salts thereof; alkaline soluble protein; humic acid; tannic acid; phenol; polyalcohols such as glycerin; phosphonic acids and derivatives thereof, for example, aminotri(methylene phosphonic acid), 1-hydroxy ethylidene-1,1-diphosphonic acid, ethylenediamine tetra(methylene phosphonic acid), diethylenetriamine penta(methylene phosphonic acid) and alkaline metal salts or alkaline earth metal salts thereof.
(4) High-early-strength agent and promoter: soluble calcium salts such as calcium chloride, calcium nitrite, calcium nitrate, calcium bromide, and calcium iodide; chlorides such as iron chloride and magnesium chloride; sulfate; potassium hydroxide; sodium hydroxide; carbonate; thiosulfate; formic acid and formates such as calcium formate; alkanolamine; alumina cement; and calcium aluminate silicate.
(5) Mineral oil defoaming agent: kerosine, liquid paraffin, and the like.
(6) Fat and oil defoaming agent: animal or vegetable oil, sesame oil, castor oil, alkylene oxide adducts thereof, and the like.
(7) Fatty acid defoaming agent: oleic acid, stearic acid, alkylene oxide adduct thereof, and the like.
(8) Fatty acid ester defoaming agent: glycerin monolicinoleate, alkenyl succinic acid derivative, sorbitol monolaurate, sorbitol trioleate, natural wax, and the like.
(9) Oxyalkylene defoaming agent: polyoxyalkylenes such as an (poly)oxyethylene-(poly)oxypropylene adduct; (poly)oxyalkyl ethers such as diethylene glycol heptyl ether, polyoxyethylene oleyl ether, polyoxypropylene butyl ether, polyoxyethylene polyoxypropylene-2-ethylhexyl ether, or a higher alcohol with 12 to 14 carbon atoms-oxyethylene oxypropylene adduct; (poly)oxyalkylene(alkyl)aryl ethers such as polyoxypropylene phenyl ether and polyoxyethylene nonylphenyl ether; acethylene ethers prepared by additionally polymerizing an alkylene oxide with acetylene alcohol such as 2,4,7,9-tetramethyl-5-desine-4,7-diol, 2,5-dimethyl-3-hexyne-2,5-diol, and 3-methyl-1-butyne-3-ol; (poly)oxyalkylene fatty acid esters such as diethylene glycol oleate, diethylene glycol laurate, and ethylene glycol distearate; (poly)oxyalkylene sorbitan fatty acid esters such as polyoxyethylene sorbitan monolaurate, and polyoxyethylene sorbitan trioleate; (poly)oxyalkylene alkyl(aryl)ether sulfate ester salts such as polyoxypropylene methyl ether sodium sulfate, polyoxyethylene dodecyl phenol ether sodium sulfate; (poly)

oxyalkylene alkyl phosphoric acid esters such as (poly)oxyethylene stearyl phosphate; (poly)oxyalkylene alkyl amines such as polyoxyethylene lauryl amine; and polyoxyalkylene amides.

(10) Alcohol defoaming agent: octyl alcohol, hexadecyl alcohol, acetylene alcohol, glycol, and the like.

(11) Amide defoaming agent: acrylate polyamine, and the like.

(12) Phosphate defoaming agent: tributyl phosphoric acid, sodium octyl phosphate, and the like.

(13) Metallic soap defoaming agent: aluminum stearate, calcium oleate, and the like.

(14) Silicone defoaming agent: dimethyl silicone oil, silicone paste, silicone emulsion, organic modified polysiloxane (polyorganosiloxanes, such as dimethylpolysiloxane), fluorosilicone oil, and the like.

(15) AE agent: resin soap, saturated or unsaturated fatty acid, sodium hydroxy stearate, lauryl sulfate, ABS (alkylbenzene sulfonate), LAS (linear alkylbenzene sulfonate), alkane sulfonate, polyoxyethylene alkyl(phenyl)ether, polyoxyethylene alkyl(phenyl)ether sulfate ester or salts thereof, polyoxyethylene alkyl(phenyl)ether phosphate or salts thereof, protein materials, alkenyl sulfosuccinic acid, α-olefin sulfonate, and the like.

(16) Other surfactant: polyalkylene oxide derivatives prepared by adding 10 mole or more of an alkylene oxide such as ethylene oxide and propylene oxide with aliphatic monvalent alcohol containing 6 to 30 carbon atoms in the molecule such as octadecyl alcohol and stearyl alcohol, alicyclic monovalent alcohol containing 6 to 30 carbon atoms in the molecule such as abiethyl alcohol, monovalent mercaptane containing 6 to 30 carbon atoms in the molecule such as dodecyl mercaptane, alkyl phenol containing 6 to 30 carbon atoms in the molecule such as nonyl phenol, amine containing 6 to 30 carbon atoms in the molecule such as dodecyl amine, carboxylic acid containing 6 to 30 carbon atoms in the molecule such as lauric acid and stearic acid; alkyl diphenyl ether sulfonic acid salts which may include an alkyl group and an alkoxy group as a substituent and two sulfonic group-containing phenyl groups bonded to each other by an ether bond; various anionic surfactants; various cationic surfactants such as alkylamine acetate, alkyl trimethylammonium chloride; various nonionic surfactants; and various amphoteric surfactants.

(17) Waterproofing agent: fatty acid (salt), fatty acid ester, fats and oils, silicon, paraffin, asphalt, wax, and the like.

(18) Antirust: nitrite, phosphate, zinc oxide, and the like.

(19) Crack inhibitor: polyoxyalkylether

(20) Expansive additive; ettringite or carboniferous additive, and the like.

Other publicly known cement additives (materials) are, for example, a cement dampening agent, a thickener, a separation-reducing agent, a flocculant, a dry shrinkage-reducing agent, a strength-promoting agent, a self-leveling agent, an antirust agent, a coloring agent, an anti-mold agent, and the like. A plurality of the publicly known cement additives (materials) can be used in combination.

With respect to the cement composition, particularly preferable embodiments of components other than cement and water are the following 1) to 7).

1) A combination of indispensable two components of (i) the above-mentioned admixture for cement and (ii) an oxyalkylene defoaming agent. In this connection, the addition ratio by weight of (ii) the oxyalkylene defoaming agent is preferably in a range of 0.01 to 10% by mass to (i) the admixture for cement.

2) A combination of indispensable three components of (i) the above-mentioned admixture for cement, (ii) a copolymer including: a polyoxyalkylene chain-containing polyalkylene glycol mono(meth)acrylic acid ester monomer having an average addition mole number of an alkylene oxide having 2 to 18 carbon atoms of 2 to 300; a (meth)acrylic acid monomer, and a monomer copolymerizable with these monomers (refer to Japanese Kokoku Publication No. Sho-59-18338, Japanese Kokai Publication Nos. Hei-07-223852, and Hei-09-241056, and the like), and (iii) an oxyalkylene defoaming agent. The addition ratio by weight of (i) the admixture for cement and (ii) the copolymer is preferably in a range of (5:95) to (95:5) and more preferably in a range of (10:90) to (90:10). The addition ratio by weight of (iii) the oxyalkylene defoaming agent is preferably in a range of 0.01 to 10% by mass to the total amount of (i) the admixture for cement and (ii) the copolymer.

3) A combination of indispensable two components of (i) the above-mentioned admixture for cement and (ii) a sulfonic acid dispersant including a sulfonic acid group in the molecule. As the sulfonic acid dispersant, aminosulfonic acid dispersants such as lignin sulfonic acid salt, naphthalene sulfonic acid formalin condensate, melamine sulfonic acid formalin condensate, polystyrene sulfonate salt, and amino aryl sulfonic acid-phenol-formaldehyde condensate are usable. The addition ratio by weight of (i) the admixture for cement and (ii) the sulfonic acid dispersant is preferably in a range of (5:95) to (95:5) and more preferably in a range of (10:90) to (90:10)

4) A combination of indispensable two components of (i) the above-mentioned admixture for cement and (ii) a lignin sulfonic acid salt. Additionally, the addition ratio by weight of (i) the admixture for cement and (ii) the lignin sulfonic acid salt is preferably in a range of (5:95) to (95:5) and more preferably in a range of (10:90) to (90:10)

5) A combination of indispensable two components of (i) the above-mentioned admixture for cement and (ii) a material segregation-reducing agent. As the material segregation-reducing agent, various thickener such as nonionic cellulose ether, compounds including a hydrophobic substituent including a hydrocarbon atom containing 4 to 30 carbon atoms and a polyalkylene chain having an average addition mole number of an alkylene oxide having 2 to 18 carbon atoms of 2 to 300, and the like are usable. The addition ratio by weight of (i) the admixture for cement and (ii) the material segregation-reducing agent is preferably in a range of (10:90) to (99.99:0.01) and more preferably in a range of (50:50) to (99.9:0.1). The cement composition prepared in accordance with this combination is preferably used as high-fluidity concrete, self-filling concrete, and self-leveling material.

6) A combination of indispensable component of (i) the above-mentioned cement admixture and (ii) a retarding agent. As the retarding agent, oxycarboxylic acids such as gluconic acid (salt) and citric acid (salt), saccharides such as glucose, sugar alcohols such as sorbitol, phosphonic acids such as aminotri(methylene phosphonic acid), and the like are usable. The addition ratio by weight of (i) the admixture for cement and (ii) the retarding agent is preferably in a range of (50:50) to (99.99:0.01) and more preferably in a range of (70:30) to (99:1).

7) A combination of indispensable two components of (i) the admixture for cement and (ii) a promoter. As (ii) the promoter, calcium chloride, calcium nitrite, calcium nitrate, and the like can be mentioned. The addition ratio by weight of (i) the admixture for cement and (ii) the promoter is preferably in a range of (10:90) to (99.9:0.1) and more preferably in a range of (20:80) to (99:1)

Effects of the Invention

The production method of the unsaturated (poly)alkylene glycol ether monomer of the invention and the production method of the (poly)alkylene glycol chain-containing polymer are configured as described above and preferably usable for applications such as various kinds of admixtures for cement and capable of quickening the hardening time of concrete and improving the early strength of concrete.

EXPLANATION OF NUMERALS

Figure 1:
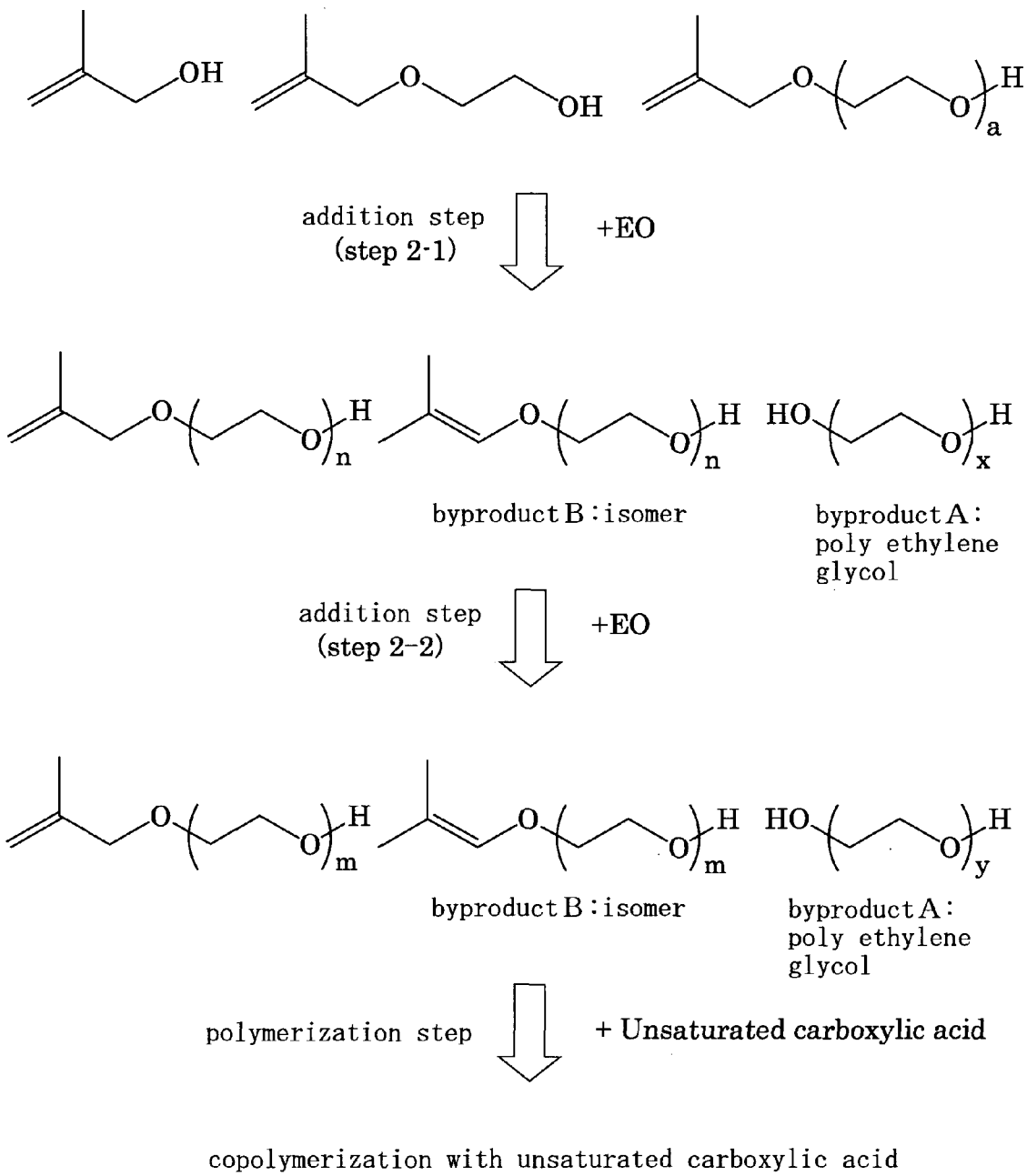
FIG. 1 is a schematic drawing showing one of preferred embodiments of a method of producing a (poly)alkylene glycol chain-containing polymer of the invention.

1: eluent peak
2: A-12
3: MLA-150
4: B-12
5: polymer peak
6: polyalkylene glycol ether monomer peak
7: isomer peak

BEST MODE FOR CARRYING OUT THE INVENTION

Hereinafter, the invention will be described in detail with reference to Examples, however the invention should not be limited to these Examples. Unless otherwise specified, "part(s)" denotes "part(s) by weight" and "%" denotes "% by mass".

Production Example 1-1

Production of Ethylene Glycol Monomethallyl Ether (A-1)

[Reaction Process]

A 3 L flask was loaded with 1500.0 g (24.17 mol) of ethylene glycol, 420.92 g of an aqueous 48 wt % sodium hydroxide solution (NaOH 5.05 mol), and 452.79 g (5.00 mol) of methallyl chloride and under stirring, reaction was carried out at 60° C. for 3 hours and successively at 70° C. for 3 hours. Salt precipitation was observed in the flask.

[Dehydration Process]

After the reaction, an oil-water separation tube was attached to the flask and under stirring, while oil-water separation of the distilled solution was carried out, reduced pressure distillation was carried out to separate 292.34 g of water. The operation pressure was at 200 mmHg in the initial stage and thereafter it was decreased to 100 mmHg and the moment the distilled solution became a uniform layer was determined as completion of the reaction.

Thereafter, the precipitated salt was separated by filtration with a paper filter (4 μm) to obtain 1709.59 g of a filtrate. Further, the salt was washed and filtrated with 100.22 g of ethylene glycol to obtain 117.64 g of a washing solution. The result of gas chromatographic analysis was 80.2 mol % yield of ethylene glycol monomethallyl ether and 11.8 mol % yield of ethylene glycol dimethallyl ether (calculated on the basis of methallyl chloride).

Further, the remaining water amount was analyzed by a Karl-Fischer method to find it was 0.84% by mass.

[Distillation Process]

The reaction solution and the washing solution collected in the dehydration process were mixed and 1798.28 g of the mixture was loaded to the bottom of a distillation tower and ethylene glycol monomethallyl ether refining was carried out. An Aldershow distillatory (30 mmΦ; filled by through-the-packing; theoretical stage: equivalent to 30 stages) was used to carry out distillation at a top pressure of 45 mmHg, a refluxing ratio of 10, and a bottom temperature between 100° C. and 127° C. and as a result, 318.17 g of ethylene glycol monomethallyl ether was obtained. As a result of the analysis, the water content was 0.06% by mass and the ethylene glycol dimethallyl ether content was 0.47% by mass.

Production Example 1-2

Production of Diether Body (X-1)

A process of adding 300 g of water to 82.9 g of a distilled fraction at a distillation ratio of 22% to 26% in the above-mentioned distillation, stirring the mixture, and removing the water layer obtained by oil-water separation was repeated three times to obtain 27.4 g of ethylene glycol dimethallyl ether.

The analysis of the above-mentioned process was carried out using the following apparatus.
Gas Chromatography
Apparatus: GC-15A manufactured by Shimadzu Corporation,
Capillary column DB-1 (0.53 mmΦ×30 m) manufactured by J & W Corporation
Condition: keeping at 40° C. for 5 min, heating at 10° C./min, and keeping at 200° C. for 5 min
Water Content Measurement
Apparatus: MK-510 manufactured by Kyoto Electronics Manufacturing Co., Ltd. (KEM)
Standard sample: Carl Fisher SS manufactured by Mitsubishi Chemical Corporation
The GPC measurement conditions were as follows.
Column employed: manufactured by Tosoh Corporation
TSK guard column SWXL which includes
TSK gel G4000 SWXL,
TSK gel G3000 SWXL, and
TSK gel G2000 SWXL connected in this order.
Eluent: Employed was one prepared by dissolving 115.6 g of sodium acetate trihydrate in a solution containing 6001 g of acetonitrile and 10999 g of water and adjusting the pH to 6.0 with acetic acid.

Sample: Prepared by dissolving each aqueous polymer solution to 0.5% by mass of the polymer concentration by the eluent.
Sample loading quantity: 100 μL
Flow rate: 1.0 mL/min
Column temperature: 40° C.
Detector: Waters 2414 RI detector
System: Waters alliance 2695
Analysis Software: Waters Empoer 2 (standard package/GPC option)
Standard substance for producing calibration curve:
Polyethylene glycol [peak top molecular weights (Mp) 272500, 219300, 107000, 50000, 24000, 11840, 6450, 4250, 1470]
Calibration curve: produced according to a cubic equation based on the Mp values of the polyethylene glycols and the elution times.

Production Example 1-3

Production of Methallyl Alcohol 10 EO

Figure 2:
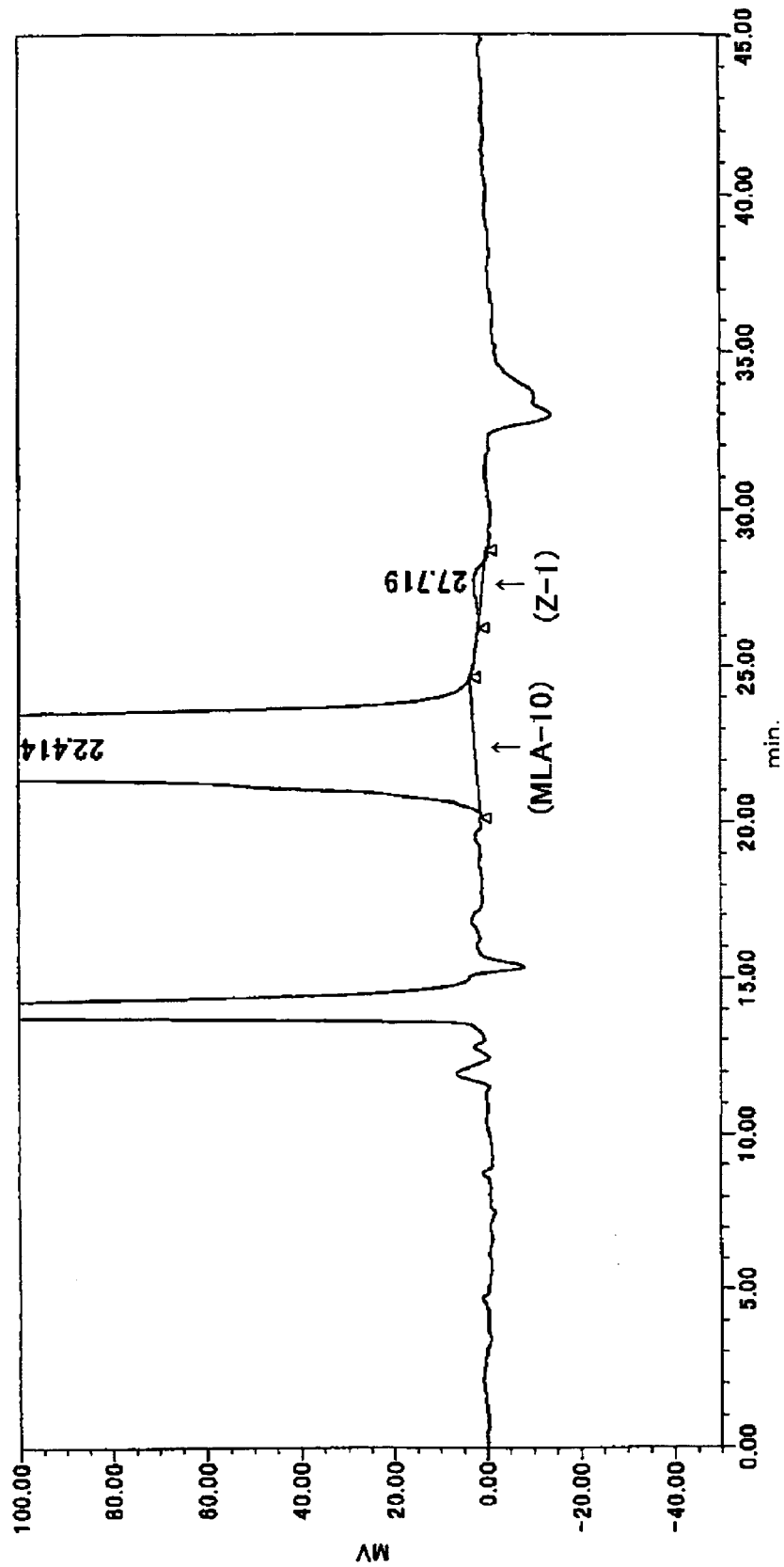
FIG. 2 is a chart showing an LC analysis result of a reaction product M-1.

An autoclave reaction container equipped with a thermometer, a stirrer, a raw material introduction tube, and a nitrogen introduction tube and made of SUS was loaded with 95.1 g of ethylene glycol monomethallyl ether, the reaction product (A-1) obtained in Production Example 1-1 and 0.21 g of sodium hydroxide as an addition reaction catalyst and under stirring, the inside of the reaction container was replaced with nitrogen and the contents were heated to 150° C. under nitrogen atmosphere. Further, 325 g of ethylene oxide was introduced into the reaction container while the temperature was kept at 150° C. under safety pressure and the temperature was kept as it was until the alkylene oxide addition reaction was completed and thus the reaction was finished. The obtained reaction product (hereinafter, referred to as M-1) contained an unsaturated (poly)alkylene glycol ether monomer (hereinafter, referred to as MLA-10) formed by adding 10 moles of ethylene oxide on average to methallyl alcohol and also a diether (X-1), a byproduct (Y-1), and a byproduct (Z-1). The byproduct (Y-1) was water-soluble polyalkylene glycol (polyethylene glycol) and the byproduct (Z-1) showed a peak observed at around 27 minutes in the liquid chromatography using a differential refractive index (R1) detector (hereinafter "LC(R1)" is referred to simply as "LC"). The analysis results of the reaction product M-1 are shown in Table 1. The LC chart of the reaction product (M-1) is shown in FIG. 2. In FIG. 2, the peak around 22 minutes shows MLA-10 and the peak around 27 minutes shows Z-1.

The LC measurement conditions of the reaction product were as follows.
Column employed: manufactured by GL Science
Inertsil guard column: 1 column
Inertsil ODS-25 μm 4.6 mm×250 mm, 3 columns
Eluent: Employed was one prepared by adding 52.5 g of acetic acid, 3.75 g of sodium acetate trihydrate to water, adjusting the total weight to be 9000 g, and further adding 6000 g of acetonitrile.
Sample: Prepared by adjusting the reaction product concentration to be 1.0% by mass by the eluent.
Sample loading quantity: 100 μL
Flow rate: 0.6 mL/min
Column temperature: 40° C.
Detector: Waters 2414 RI detector Hereinafter, the quantitative determination of the diether (X) was carried out by producing a calibration curve by LC using the diether (no impurity was detected and the purity was 100%) synthesized in the above-mentioned Production Example 1-2 and calculating the % by mass to the polyethylene glycol monomethallyl ether. LC means liquid chromatography and the measurement conditions were as described above.

With respect to the byproduct (Z), the content was calculated from the surface area ratio of LC as described above.

$$(Z-1)\% = [(Z-1 \text{ surface area})/MLA-10 \text{ surface area}] \times 100$$

$$(Z-2)\% = [(Z-2 \text{ surface area})/MLA-50 \text{ surface area}] \times 100$$

$$(Z-3)\% = [(Z-3 \text{ surface area})/MLA-120 \text{ surface area}] \times 100$$

The above-mentioned byproduct (Y) was quantitatively determined by the following GPC.
[Measurement Conditions of Polyalkylene Glycol (Y)]
Column employed: Shodex GF-1G 7B, manufactured by Showa Denko K. K.
GF-310 HQ
Eluent: water/acetonitrile=98/2 (% by mass)
Sample: Prepared by adjusting the reaction product concentration to be 0.1% by mass by the eluent.
Sample loading quantity: 250 μL
Flow rate: 1 mL/min
Column temperature: 40° C.
Detector: Waters 2414 RI detector
System: Waters alliance 2695
Analysis Software: Waters Empoer 2 (standard package/GPC option)
Standard substances for calibration curve production:
Calibration curves were produced using respective polyethylene glycols [peak top molecular weights (Mp) 11840, 6450, and 1470] following the above-mentioned measurement conditions and the % by mass in the polyethylene glycol monomethallyl ether was calculated.
(Y-3) in MLA 120 of M-3 of Production Example 1-5 was quantitatively determined based on the calibration curve of PEG with a Mp of 11840.
(Y-2) in MLA 50 of M-2 of Production Example 1-4 was quantitatively determined based on the calibration curve of PEG with a Mp of 6450.
(Y-1) in MLA 10 of M-1 of Production Example 1-3 was quantitatively determined based on the calibration curve of PEG with a Mp of 1470.

Production Example 1-4

Production of Methallyl Alcohol 50 EO

Figure 3:
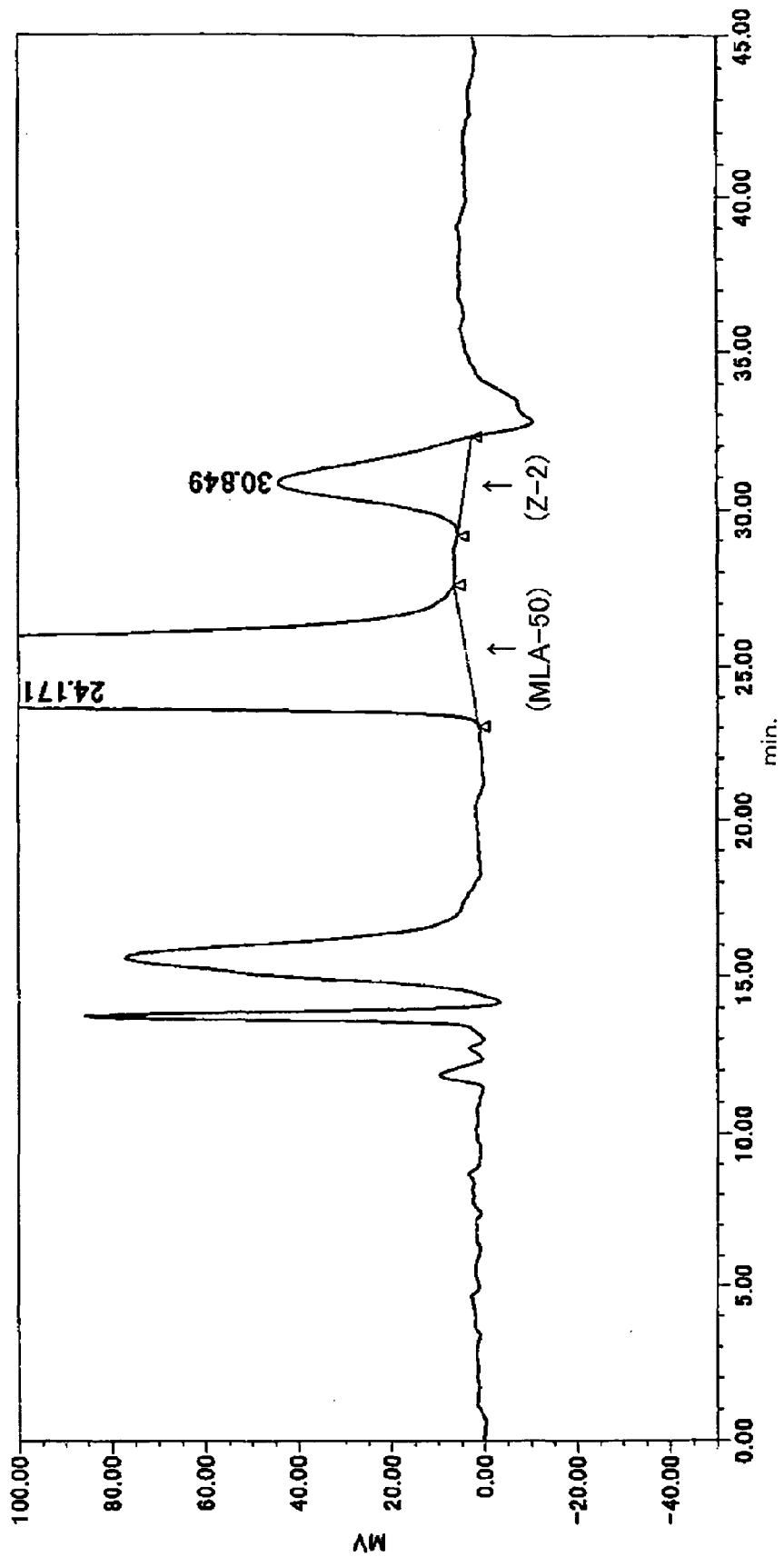
FIG. 3 is a chart showing an LC analysis result of a reaction product M-2.

An autoclave reaction container equipped with a thermometer, a stirrer, a raw material introduction tube, and a nitrogen introduction tube and made of SUS was loaded with 450.7 g of the reaction product (M-1) obtained in Production Example 1-3 and 0.36 g of an aqueous 48% sodium hydroxide solution as an addition reaction catalyst and under stirring, the inside of the reaction container was replaced with nitrogen and the contents were heated to 100° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 1550 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as M-2) contained an unsaturated (poly)alkylene glycol ether monomer (hereinafter, referred to as MLA-50) formed by adding 50 moles of ethylene oxide on average to methallyl alcohol and also a diether (X-2), a byproduct (Y-2), and a byproduct (Z-2). The byproduct (Y-2) contained water-soluble polyalkylene glycol (polyethylene glycol) and the byproduct (Z-2) showed a peak observed at around 30 minutes in the LC(R1). The analysis results of the reaction product M-2 are shown in Table 1. The LC chart of the reaction product (M-2) is shown in FIG. 3. In FIG. 3, the peak around 24 minutes shows MLA-50 and the peak around 30 minutes shows Z-2.

Production Example 1-5

Production of Methallyl Alcohol 120EO

Figure 4:
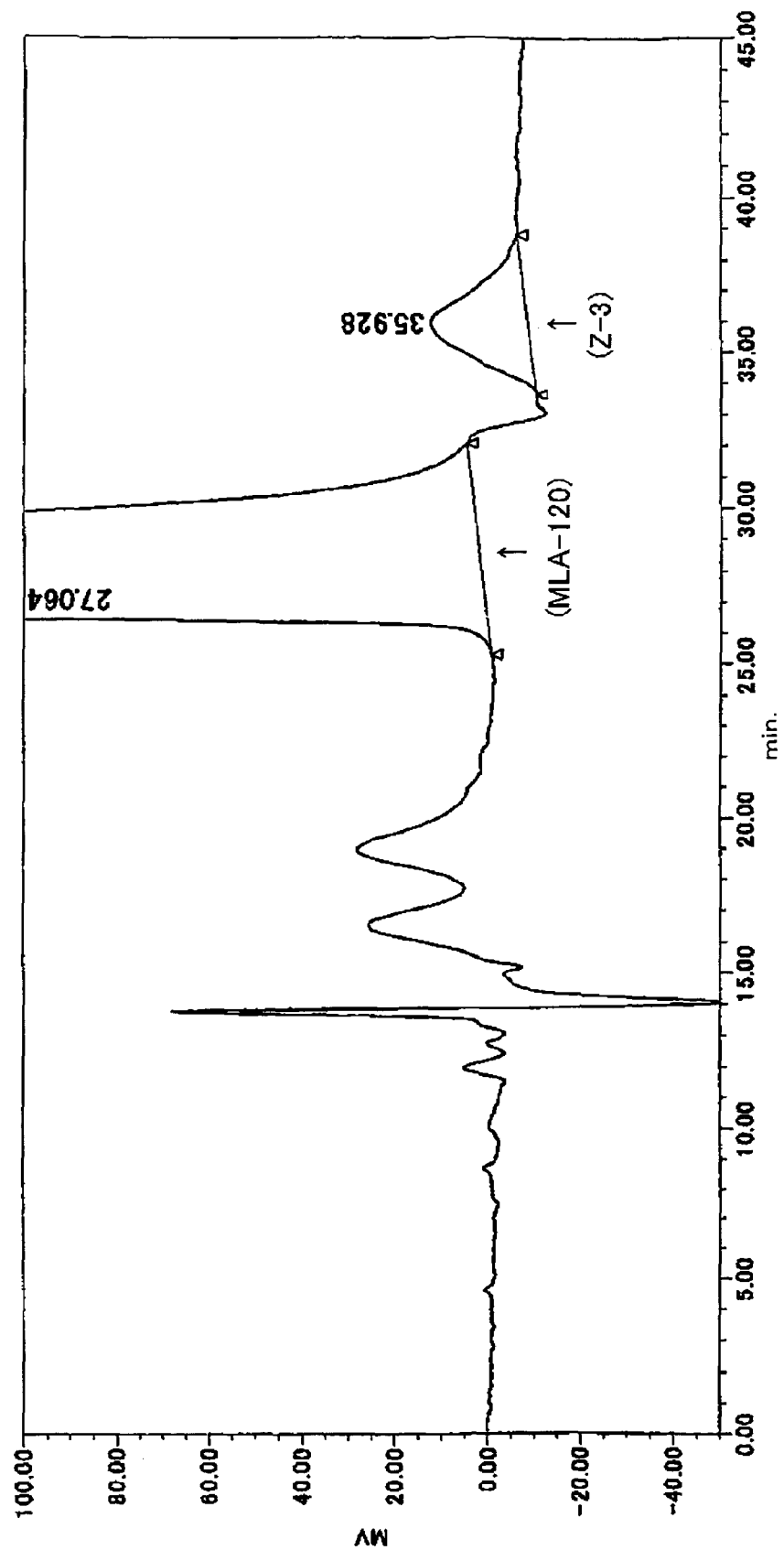
FIG. 4 is a chart showing an LC analysis result of a reaction product M-3.

An autoclave reaction container equipped with a thermometer, a stirrer, a raw material introduction tube, and a nitrogen introduction tube and made of SUS was loaded with 849 g of the reaction product (M-2) obtained in Production Example 1-4 and 0.48 g of an aqueous 48% sodium hydroxide solution as an addition reaction catalyst and under stirring and nitrogen flow, the inside of the reaction container was replaced with nitrogen and the contents were heated to 100° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 1151 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as M-3) contained an unsaturated (poly)alkylene glycol ether monomer (hereinafter, referred to as MLA-120) formed by adding 120 moles of ethylene oxide on average to methallyl alcohol and also a diether (X-3), a byproduct (Y-3), and a byproduct (Z-3). The byproduct (Y-3) contained water-soluble polyalkylene glycol (polyethylene glycol) and the byproduct (Z-3) showed a peak observed at around 35 minutes in the LC (RI). The analysis results of the reaction product M-3 are shown in Table 1. The LC chart of the reaction product (M-3) is shown in FIG. 4. In FIG. 4, the peak around 27 minutes shows MLA-120 and the peak around 35 minutes shows Z-3.

Production Example 1-6

Production of Methallyl Alcohol 135 EO

Figure 5:
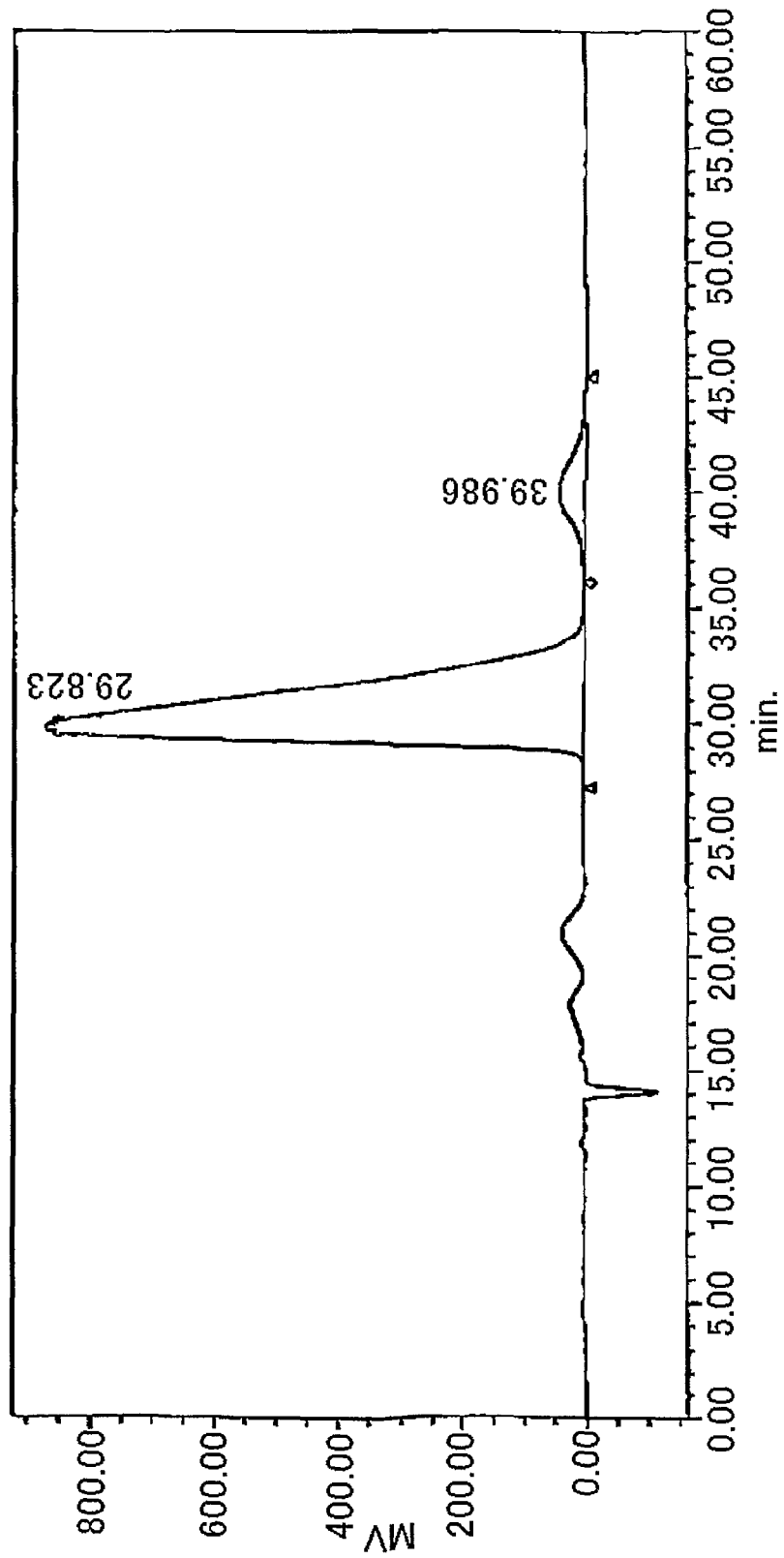
FIG. 5 is a chart showing an LC analysis result of a reaction product M-4.

An autoclave reaction container equipped with a thermometer, a stirrer, a raw material introduction tube, and a nitrogen introduction tube and made of SUS was loaded with 3023 g of the reaction product (M-2) obtained in Production Example 1-4 and 2.07 g of an aqueous 48% sodium hydroxide solution as an addition reaction catalyst and under stirring and nitrogen flow, the inside of the reaction container was replaced with nitrogen and the contents were heated to 100° C. Next, under stirring and nitrogen flow, a pipe equipped with a glass trap was connected to the reaction container from the upper side and the reaction container was evacuated to $6.65 \times 10^3$ Pa(50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 4977 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as M-4) contained an unsaturated (poly)alkylene glycol ether monomer (hereinafter, referred to as MLA-135) formed by adding 135 moles of ethylene oxide on average to methallyl alcohol and also a diether (X-4), a byproduct (Y-4), and a byproduct (Z-4). The byproduct (Y-4) contained water-soluble polyalkylene glycol (polyethylene glycol) and the byproduct (Z-4) showed a peak observed at around 35 minutes in the LC (RI). The analysis results of the reaction product M-4 are shown in Table 1. The LC chart of the reaction product (M-4) is shown in FIG. 5. In FIG. 5, the peak around 30 minutes shows MLA-135 and the peak around 38 minutes shows Z-4. Details of the peak showing the MLA-135 are given below. The holding time (minute) was 29.823 minutes; the peak area was 125952353 µV/sec (the ratio of the peak area (% area) was 94.02%); and the peak height was 869382 µV/sec. Details of the peak showing the Z-4 are given below. The holding time (minute) was 39.986 minutes; the peak area was 8017627 µV/sec (the ratio of the peak area (% area) was 5.98%); the peak height was 41343 µV/sec. In the following Table 1, the ratios of the diether (X) and the byproducts (Y) and (Z) are the ratios (part(s)) of the respective impurities to 100 parts of the unsaturated alcohol.

Production Example 1-7

Production of Methallyl Alcohol 150 EO

An autoclave reaction container equipped with a thermometer, a stirrer, a raw material introduction tube, and a nitrogen introduction tube and made of SUS was loaded with 2724 g of the reaction product (M-2) obtained in Production Example 1-4 and 0.48 g of an aqueous 48% sodium hydroxide solution as an addition reaction catalyst and under stirring and nitrogen flow, the inside of the reaction container was replaced with nitrogen and the contents were heated to 100° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 5276 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as M-5) contained an unsaturated (poly)alkylene glycol ether monomer (hereinafter, referred to as MLA-150) formed by adding 150 moles of ethylene oxide on average to methallyl alcohol and also a diether (X-5), a byproduct (Y-5), and a byproduct (Z-5). The byproduct (Y-5) contained water-soluble polyalkylene glycol (polyethylene glycol) and the byproduct (Z-5) showed a peak observed at around 40 minutes in the LC (RI). The analysis results of the reaction product M-5 are shown in Table 1.

In the following Table 1, the ratios of the diether (X) and the byproducts (Y) and (Z) are the ratios (part(s)) of the respective impurities to 100 parts of the unsaturated alcohol.

TABLE 1

| Production Example | Reaction product | Raw material | Temperature (°C.) | Diether (X) (part) | Byproduct (Y) (part) | Byproduct (Z) (part) |
|---|---|---|---|---|---|---|
| Production Example 1-3 | M-1 | MLA1 | 150 | 0.107 | 2.6 | 0.19 |
| Production Example 1-4 | M-2 | M-1 | 130 | 0.024 | 2.5 | 0.74 |
| Production Example 1-5 | M-3 | M-2 | 130 | 0.010 | 3.7 | 2.45 |
| Production Example 1-6 | M-4 | M-2 | 130 | 0.009 | 3.7 | 2.8 |
| Production Example 1-7 | M-5 | M-2 | 130 | 0.008 | 3.7 | 3 |

Production Example 1-8

Production of Cement Dispersant 1-1 of the Invention

A reaction container made of glass and equipped with a thermometer, a stirrer, a dripping apparatus, a nitrogen introduction tube, and a reflux condenser was loaded with 102 g of ion exchanged water, 198 g of the reaction product (M-3) obtained in Production Example 1-5 as an unsaturated polyalkylene glycol ether monomer, and 0.14 g of acrylic acid and under stirring, the inside of the reaction container was replaced with nitrogen and the contents were heated to 58° C. under nitrogen atmosphere. While the reaction container was kept at 58° C., 12.85 g of an aqueous 2% hydrogen peroxide solution was added. While the reaction container was kept at 58° C., an aqueous acrylic acid solution containing 8.09 g of acrylic acid and 16.32 g of ion exchanged water was dropwise added over 3 hours and at the same time, an aqueous solution obtained by dissolving 0.666 g of L-ascorbic acid and 0.369 g of 3-mercaptopropionic acid in 36.47 g of ion exchanged water was dropwise added over 3.5 hours. Thereafter, the temperature was continuously kept at 58° C. for 2 hours and the polymerization reaction was completed. Thereafter, the acidic reaction solution was neutralized to be pH 6 by an aqueous sodium hydroxide solution at a temperature not higher than the polymerization reaction temperature to obtain the cement dispersant 1-1 of the invention, which was a polymer aqueous solution with a weight average molecular weight of 43400.

In the production method of the (poly)alkylene glycol chain-containing polymer, an unsaturated (poly)alkylene glycol diether monomer (ethylene glycol dimethallyl ether) was contained as an unsaturated (poly)alkylene glycol ether monomer at a ratio of 0.01% in 100.01 of (100 parts of an unsaturated polyalkylene glycol ether obtained by adding 120 moles of ethylene oxide on average to methallyl alcohol)+ (0.01 parts of ethylene glycol dimethallyl ether) from Table 1.

Production Example 1-9

Production of Comparative Cement Dispersant 1-1 of the Invention

A reaction container made of glass and equipped with a thermometer, a stirrer, a dripping apparatus, a nitrogen introduction tube, and a reflux condenser was loaded with 102 g of ion exchanged water, 198 g of unsaturated polyalkylene glycol ether formed by adding 120 moles of ethylene oxide on average to methallyl alcohol, and 0.14 g of acrylic acid and under stirring, the inside of the reaction container was replaced with nitrogen and the contents were heated to 58° C. under nitrogen atmosphere. While the reaction container was kept at 58° C., 12.85 g of an aqueous 2% hydrogen peroxide solution was added. While the reaction container was kept at 58° C., an aqueous acrylic acid solution containing 8.09 g of acrylic acid and 16.32 g of ion exchanged water was dropwise added over 3 hours and at the same time, an aqueous solution obtained by dissolving 0.666 g of L-ascorbic acid and 0.369 g of 3-mercaptopropionic acid in 36.47 g of ion exchanged water was dropwise added over 3.5 hours. Thereafter, the temperature was continuously kept at 58° C. for 2 hours and the polymerization reaction was completed. Thereafter, the acidic reaction solution was neutralized to be pH 6 by an aqueous sodium hydroxide solution at a temperature not higher than the polymerization reaction temperature to obtain the comparative cement dispersant 1-1 of the invention, which was a polymer aqueous solution with a weight average molecular weight of 40300.

Production Example 1-10

Production of Cement Dispersant 1-2 of the Invention

A reaction container made of glass and equipped with a thermometer, a stirrer, a dripping apparatus, a nitrogen introduction tube, and a reflux condenser was loaded with 102 g of ion exchanged water, 198 g of an unsaturated polyalkylene glycol ether obtained by adding 120 moles of ethylene oxide on average to methallyl alcohol, 0.04 g of ethylene glycol dimethallyl ether as an unsaturated polyalkylene glycol diether monomer, and 0.14 g of acrylic acid and under stirring, the inside of the reaction container was replaced with nitrogen and the contents were heated to 58° C. under nitrogen atmosphere. While the reaction container was kept at 58° C., 12.85 g of an aqueous 2% hydrogen peroxide solution was added. While the reaction container was kept at 58° C., an aqueous acrylic acid solution containing 8.09 g of acrylic acid and 16.32 g of ion exchanged water was dropwise added over 3 hours and at the same time, an aqueous solution obtained by dissolving 0.666 g of L-ascorbic acid and 0.369 g of 3-mercaptopropionic acid in 36.47 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 1-2 of the invention, which was a polymer aqueous solution with a weight average molecular weight of 41300. In the production method of the (poly)alkylene glycol chain-containing polymer, an unsaturated (poly)alkylene glycol diether monomer (ethylene glycol dimethallyl ether 0.04 g) was contained as an unsaturated (poly)alkylene glycol ether monomer at a ratio of 0.02% by mass in 198.04 g of (198 g of an unsaturated polyalkylene glycol ether obtained by adding 120 moles of ethylene oxide on average to methallyl alcohol)+(0.04 g of ethylene glycol dimethallyl ether).

Examples 1-1 and 1-2, and Comparative Examples 1-1 and 1-2

Mortar Test (Solid Matter Measurement)

With respect to each polymer to be used for a property test, the non-volatile component was measured in accordance with the following procedure and the concentration of the non-volatile component was calculated as a cement dispersant.

An aluminum cup was loaded with about 0.5 g of an aqueous cement dispersant solution and about 1 g of ion exchanged water was added thereto and evenly dispersed. The mixture was dried at 130° C. for 1 hour in nitrogen atmosphere and the non-volatile component was measured from the mass difference with the mass before drying.

(Preparation of Admixture for Cement)

A prescribed amount of an aqueous polymer solution was sampled and a defoaming agent MA404 (manufactured by Pozzolith Ltd.) was added at a ratio of 10% by mass (containing water) to the polymer and further 210 g of ion exchanged water was added and the mixture was sufficiently and evenly dissolved.

(Mortar Blend)

Mortar blend was adjusted to C/S/W=600/1350/210 (g), wherein
C: normal portland cement (manufactured by Taiheiyo Cement Corporation);
S: ISO standard sand (manufactured by Japan Cement Association); and
W: admixture for cement (Mortar Experiment Environment)

The experiment environments were adjusted to a temperature of 20° C.±1° C. and a relative humidity of 60%±10%.

(Flow Value Measurement)

After 600 g of the cement and 210 of the admixture for cement were mixed by a Hobart type mortar mixer (N-50 model: manufactured by Hobart K. K.) at a low speed for 30 seconds and then 1350 g of the ISO sand was added over 30 seconds to the cement paste. Next, the mixture was kneaded at a high speed for 30 seconds, the rotation was stopped and the mortar adhering to the wall of the pot was scraped for 15 seconds. Further, after being kept still for 75 seconds, the resulting mortar was kneaded at a high speed for 60 seconds to prepare the mortar.

The prepared mortar was loaded to a flow cone (described in JIS R5201) set on a horizontal rotating table to fill a half of the capacity and stuck 15 times by a sticking rod. Further, the mortar was loaded to the flow cone to fully fill the flow cone and stuck 15 times by a sticking rod. Thereafter, the flow cone loaded with the mortar was gently lifted perpendicularly and the longer diameter (mm) and the shorter diameter (mm) of the mortar spread on the table were measured and the average value was set as a 0-hit flow value of the mortar. Further, after the rotating table was rotated 15 times at a speed of 1 rotation per 1 second, the longer diameter (mm) and the shorter diameter (mm) of the mortar spread on the table were measured and the average value was set as a 15-hit flow value of the mortar.

(Measurement of Mortar Air Amount)

After about 200 mL of the mortar was loaded to a 500 mL messcylinder made of glass and stuck with a round rod with a diameter of 8 mm, the container was vibrated to extract coarse foams. Further, after about 200 mL of the mortar was added and foams were removed in the same manner, the volume and mass were measured to calculate the air amount from the mass and the density of the respective materials.

(Mortar Test Result)

The results of the mortar test carried out using the polymers of the invention and comparative polymers are shown in Table 2.

TABLE 2

|  | Cement dispersant | Addition amount (%) | 15-hit flow value (mm) | Air amount (%) |
|---|---|---|---|---|
| Example1-1 | Cement dispersant 1-1 | 0.145 | 221 | 3.56 |
| Example1-2 | Cement dispersant 1-2 | 0.145 | 225 | 3.43 |
| Comparative Example 1-1 | Comparative cement dispersant 1-1 | 0.145 | 211 | 2.95 |
| Comparative Example 1-2 | Comparative cement dispersant 1-1 | 0.155 | 217 | 3.53 |

From Table 2, it can be understood that as compared with the comparative cement dispersant 1-1 obtained by polymerizing unsaturated alkylene glycol ether monomers containing no unsaturated alkylene glycol diether monomer, the cement dispersant 1-1 of the invention obtained using ethylene glycol monomethallyl ether as a starting substance obtained by reaction of methallyl chloride and ethylene glycol and the cement dispersant 1-2 of the invention synthesized by adding the unsaturated alkylene glycol diether monomer had high flow values and were excellent in the dispersibility (Examples 1-1 and 1-2, and Comparative Example 1-1) for the same addition amount (0.145% by mass). Further, in comparison for the same flow value (220 mm) (Examples 1-1 and 1-2, and Comparative Example 1-2), 6.5% of the addition amounts of the dispersants 1-1 and 1-2 of the invention could be saved as compared with that of the comparative cement dispersant 1-1 (Examples 1-1 and 1-2, and Comparative Example 1-1).

Examples 1-3 and 1-4, and Comparative Example 1-3

Concrete Test

Concrete compositions using the cement dispersants 1-1 and 1-2, and the comparative cement dispersants 1-1 obtained in the above-mentioned manner were prepared and the slump flow values, air amounts, and compressive strengths were measured. To adjust the test temperature of the concrete compositions at 20° C., the materials to be used for the test, a forcible kneading mixer, measurement instruments and the like were controlled for temperature adjustment in the test temperature atmosphere and the kneading and respective measurements were carried out under this test temperature atmosphere. The results are shown in Table 3.

[Concrete Test Blend]
Unit cement amount: 573.3 Kg/m³
Unit water amount: 172.0 Kg/m³ (containing admixture of a polymer, a defoaming agent and the like)
Unit fine aggregate amount: 737.2 Kg/m³
Unit coarse aggregate amount: 866.0 Kg/m³
Water/cement ratio (W/C): 30.0%
Aggregate amount ratio (s/a): 47.0%
Cement: normal portland cement (manufactured by Taiheiyo Cement Corporation);

no unsaturated alkylene glycol diether monomer, the cement dispersant 1-1 of the invention obtained using ethylene glycol monomethallyl ether as a starting raw material obtained by reaction of methallyl chloride and ethylene glycol and the cement dispersant 1-2 of the invention synthesized by adding the unsaturated alkylene glycol diether monomer had high flow values and high compressive strength and were excellent in the dispersibility and strength-exhibiting performance (Examples 1-3 and 1-4, and Comparative Example 1-3) for the same addition amount (0.18% by mass).

TABLE 3

| | Cement dispersant | Addition amount (%) | 15-hit flow value (mm) | Air amount (%) | Strength (N/m²) |
|---|---|---|---|---|---|
| Example1-3 | Cement dispersant 1-1 | 0.18 | 525 | 3.56 | 30.5 |
| Example1-4 | Cement dispersant 1-2 | 0.18 | 530 | 3.43 | 31 |
| Comparative Example 1-3 | Comparative cement dispersant 1-1 | 0.18 | 420 | 2.95 | 26.5 |

Fine aggregate: a mixture of mountain sand produced in Kimitsu and land sand produced in Kakegawa river system at 3/7
Coarse aggregate: crushed stone produced in Oume
[Preparation of Concrete Composition]
The respective materials were measured to adjust the mixing amount to be 30 L by mixing the concrete raw materials as described above and the materials were hot-kneaded by the following method using a Pan mixer. First, after the fine aggregate was kneaded for 10 seconds, cement was added and the mixture was kneaded for 10 seconds. Thereafter, a prescribed amount of tap water containing the admixture for cement was added and the resulting mixture was kneaded for 30 to 90 seconds. Thereafter, further coarse aggregate was added and the resulting mixture was kneaded for 90 seconds to obtain a concrete composition. Further, in an evaluation test, the kneading starting time after addition of the tap water containing the admixture for cement was set to be zero.
[Preparation of Admixture for Cement]
The admixture for cement was prepared using the cement dispersant and the defoaming agent. Each of the cement dispersants 1-1 and 1-2, and the comparative cement dispersant 1-1 was used as the cement dispersant. The needed amount of the cement dispersant was calculated using the amount of the non-volatile components in the cement dispersant measured by the following method. As the defoaming agent was employed a commercially available oxyalkylene defoaming agent and the air amount was adjusted to be 1.5±0.5 vol %.
[Measurement of Non-Volatile Component]
An aluminum cup was loaded with about 0.5 g of an aqueous polymer solution and about 1 g of ion exchanged water was added thereto and evenly dispersed. The mixture was dried at 130° C. for 1 hour in nitrogen atmosphere and the non-volatile component was calculated from the weight difference before and after drying.
[Evaluation Test Items and Measurement Method]
Slump flow value: JIS-A-1101
Compressive strength: JIS-A-1108 (sample body production: JIS-A-1132)
Air amount: JIS-A-1128
The following Table 3 shows the results of each evaluation test. From Table 3, it can be understood that as compared with the comparative cement dispersant 1-1 obtained by polymerizing unsaturated alkylene glycol ether monomers containing Production Example 1-11

Production of Cement Dispersant 1-3 of the Invention

A reaction container made of glass and equipped with a thermometer, a stirrer, a dripping apparatus, a nitrogen introduction tube, and a reflux condenser was loaded with 137 g of ion exchanged water, 265 g of the reaction product (M-4) obtained in Production Example 1-6 as an unsaturated polyalkylene glycol ether monomer, and 0.48 g of acrylic acid and under stirring, the inside of the reaction container was replaced with nitrogen and the contents were heated to 58° C. under nitrogen atmosphere. While the reaction container was kept at 58° C., 15.32 g of an aqueous 2% hydrogen peroxide solution was added. While the reaction container was kept at 58° C., an aqueous acrylic acid solution containing 9.3 g of acrylic acid and 22.82 g of ion exchanged water was dropwise added over 3 hours and at the same time, an aqueous solution obtained by dissolving 0.793 g of L-ascorbic acid and 0.583 g of 3-mercaptopropionic acid in 48.62 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 1-3 of the invention, which was a polymer aqueous solution with a weight average molecular weight of 53900.

In the production method of the (poly)alkylene glycol chain-containing polymer, as shown in Table 1, an unsaturated (poly)alkylene glycol diether monomer (ethylene glycol dimethallyl ether) was contained as an unsaturated (poly) alkylene glycol ether monomer at a ratio of 0.009% by mass in 100.009 parts of (100 parts of an unsaturated polyalkylene glycol ether obtained by adding 135 moles of ethylene oxide on average to methallyl alcohol)+(0.009 parts of ethylene glycol dimethallyl ether).

Production Example 1-12

Production of Cement Dispersant 1-4 of the Invention (Addition of Diether)

A reaction container made of glass and equipped with a thermometer, a stirrer, a dripping apparatus, a nitrogen introduction tube, and a reflux condenser was loaded with 137 g of ion exchanged water, 265 g of an unsaturated polyalkylene glycol ether obtained by adding 135 moles of ethylene oxide on average to methallyl alcohol, 0.048 g of ethylene glycol dimethallyl ether as an unsaturated polyalkylene glycol diether monomer, and 0.48 g of acrylic acid and under stirring, the inside of the reaction container was replaced with nitrogen and the contents were heated to 58° C. under nitrogen atmosphere. While the reaction container was kept at 58° C., 15.32 g of an aqueous 2% hydrogen peroxide solution was added. While the reaction container was kept at 58° C., an aqueous acrylic acid solution containing 9.3 g of acrylic acid and 22.82 g of ion exchanged water was dropwise added over 3 hours and at the same time, an aqueous solution obtained by dissolving 0.793 g of L-ascorbic acid and 0.583 g of 3-mercaptopropionic acid in 48.62 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 1-4 of the invention, which was a polymer aqueous solution with a weight average molecular weight of 52000.

In the production method of the (poly)alkylene glycol chain-containing polymer, an unsaturated (poly)alkylene glycol diether monomer (ethylene glycol dimethallyl ether 0.048 g) was contained as an unsaturated (poly)alkylene glycol ether monomer at a ratio of 0.018% by mass in 265.048 g of (265 g of an unsaturated polyalkylene glycol ether obtained by adding 135 moles of ethylene oxide on average to methallyl alcohol)+(0.0048 g of ethylene glycol dimethallyl ether).

Production Example 1-13

Production of Comparative Cement Dispersant 1-2 (no Addition of Diether)

A reaction container made of glass and equipped with a thermometer, a stirrer, a dripping apparatus, a nitrogen introduction tube, and a reflux condenser was loaded with 137 g of ion exchanged water, 265 g of an unsaturated polyalkylene glycol ether obtained by adding 135 moles of ethylene oxide on average to methallyl alcohol, and 0.48 g of acrylic acid and under stirring, the inside of the reaction container was replaced with nitrogen and the contents were heated to 58° C. under nitrogen atmosphere. While the reaction container was kept at 58° C., 15.32 g of an aqueous 2% hydrogen peroxide solution was added. While the reaction container was kept at 58° C., an aqueous acrylic acid solution containing 9.3 g of acrylic acid and 22.82 g of ion exchanged water was dropwise added over 3 hours and at the same time, an aqueous solution obtained by dissolving 0.793 g of L-ascorbic acid and 0.583 g of 3-mercaptopropionic acid in 48.62 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the comparative cement dispersant 1-2, which was a polymer aqueous solution with a weight average molecular weight of 50600.

Production Example 1-14

Production of Cement Dispersant 1-5 of the Invention (Addition of Diether)

A reaction container made of glass and equipped with a thermometer, a stirrer, a dripping apparatus, a nitrogen introduction tube, and a reflux condenser was loaded with 137 g of ion exchanged water, 266 g of the reaction product (M-5) obtained in Production Example 1-7 as an unsaturated polyalkylene glycol ether monomer, and 0.48 g of acrylic acid and under stirring, the inside of the reaction container was replaced with nitrogen and the contents were heated to 58° C. under nitrogen atmosphere. While the reaction container was kept at 58° C., 13.85 g of an aqueous 2% hydrogen peroxide solution was added. While the reaction container was kept at 58° C., an aqueous acrylic acid solution containing 8.4 g of acrylic acid and 23.80 g of ion exchanged water was dropwise added over 3 hours and at the same time, an aqueous solution obtained by dissolving 0.717 g of L-ascorbic acid and 0.588 g of 3-mercaptopropionic acid in 48.69 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 1-5 of the invention, which was a polymer aqueous solution with a weight average molecular weight of 51000.

In the production method of the (poly)alkylene glycol chain-containing polymer, as shown in Table 1, an unsaturated (poly)alkylene glycol diether monomer (ethylene glycol dimethallyl ether) was contained as an unsaturated (poly) alkylene glycol ether monomer at a ratio of 0.008% by mass in 100.008 parts of (100 parts of an unsaturated polyalkylene glycol ether obtained by adding 150 moles of ethylene oxide on average to methallyl alcohol)+(0.008 g of ethylene glycol dimethallyl ether).

Production Example 1-15

Production of Cement Dispersant 1-6 of the Invention (Addition of Diether)

A reaction container made of glass and equipped with a thermometer, a stirrer, a dripping apparatus, a nitrogen introduction tube, and a reflux condenser and made of glass was loaded with 137 g of ion exchanged water, 266 g of an unsaturated polyalkylene glycol ether obtained by adding 150 moles of ethylene oxide on average to methallyl alcohol, 0.043 g of ethylene glycol dimethallyl ether as an unsaturated polyalkylene glycol diether monomer, and 0.48 g of acrylic acid and under stirring, the inside of the reaction container was replaced with nitrogen and the contents were heated to 58° C. under nitrogen atmosphere. While the reaction container was kept at 58° C., 13.85 g of an aqueous 2% hydrogen peroxide solution was added. While the reaction container was kept at 58° C., an aqueous acrylic acid solution containing 8.4 g of acrylic acid and 23.80 g of ion exchanged water was dropwise added over 3 hours and at the same time, an aqueous solution obtained by dissolving 0.717 g of L-ascorbic acid and 0.588 g of 3-mercaptopropionic acid in 48.69 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 1-6 of the invention, which was a polymer aqueous solution with a weight average molecular weight of 50000. In the production method of the (poly)alkylene glycol chain-containing polymer, an unsaturated (poly)alkylene glycol diether monomer (ethylene glycol dimethallyl ether 0.043 g) was contained as an unsaturated (poly)alkylene glycol ether monomer at a ratio of 0.016% by mass in 266.043 g of (266 g of an unsaturated polyalkylene glycol ether obtained by adding 150 moles of ethylene oxide on average to methallyl alcohol)+(0.0043 g of ethylene glycol dimethallyl ether).

Production Example 1-16

Production of Comparative Cement Dispersant 1-3 (no Addition of Diether)

A reaction container made of glass and equipped with a thermometer, a stirrer, a dripping apparatus, a nitrogen introduction tube, and a reflux condenser and made of glass was loaded with 137 g of ion exchanged water, 266 g of an unsaturated polyalkylene glycol ether obtained by adding 150 moles of ethylene oxide on average to methallyl alcohol, and 0.48 g of acrylic acid and under stirring, the inside of the reaction container was replaced with nitrogen and the contents were heated to 58° C. under nitrogen atmosphere. While the reaction container was kept at 58° C., 13.85 g of an aqueous 2% hydrogen peroxide solution was added. While the reaction container was kept at 58° C., an aqueous acrylic acid solution containing 8.4 g of acrylic acid and 23.80 g of ion exchanged water was dropwise added over 3 hours and at the same time, an aqueous solution obtained by dissolving 0.717 g of L-ascorbic acid and 0.588 g of 3-mercaptopropionic acid in 48.69 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the comparative cement dispersant 1-3, which was a polymer aqueous solution with a weight average molecular weight of 481000.

Examples 1-5, 1-6, 1-7, 1-8, and Comparative Examples 1-4 and 1-5

Concrete test (MLA-135 polymer and MLA-150 polymer) Concrete compositions using the cement dispersants 1-3, 1-4, 1-5, 1-6, and comparative cement dispersants 1-3 and 1-4 obtained in the above-mentioned manner were prepared and the slump flow values, alteration of the slump flow values with the lapse of time, air amounts, and compressive strengths were measured by the following methods, respectively. To adjust the test temperature of the concrete compositions at 20° C., the materials to be used for the test, a forcible kneading mixer, measurement instruments and the like were controlled for temperature adjustment in the test temperature atmosphere and the kneading and respective measurements were carried out under this test temperature atmosphere. The results are shown in Tables 4 and 5.

[Concrete Test Blend]
Unit cement amount: 491.0 Kg/m$^3$
Unit water amount: 172.0 Kg/m$^3$ (containing admixture of a polymer, a defoaming agent and the like)
Unit fine aggregate amount: 768.0 Kg/m$^3$
Unit coarse aggregate amount: 895.0 Kg/m$^3$
Water/cement ratio (W/C): 35.0%
Aggregate amount ratio (s/a): 47.0%
Cement: normal portland cement (manufactured by Taiheiyo Cement Corporation);
Fine aggregate: a mixture of mountain sand produced in Kimitsu and land sand produced in Kakegawa river system at 3/7
Coarse aggregate: crushed stone produced in Oume

[Preparation of Concrete Composition]
The respective materials were measured to adjust the mixing amount to be 30 L by mixing the concrete raw materials as described above and the materials were hot-kneaded by the following method using a Pan mixer. First, the fine aggregate, the cement, the coarse aggregate were kneaded together for 10 seconds. Thereafter, a prescribed amount of tap water containing the admixture for cement was added and the resulting mixture was kneaded for 60 seconds to obtain a concrete composition. Further, in an evaluation test, the kneading starting time after addition of the tap water containing the admixture for cement was set to be zero.

[Preparation of Admixture for Cement]
The admixture for cement was prepared using the cement dispersant and the defoaming agent. Each of the cement dispersants 1-3, 1-4, 1-5, and 1-6, and the comparative cement dispersants 1-3 and 1-4 was used as the cement dispersant. The needed amount of the cement dispersant was calculated using the amount of the non-volatile components in the cement dispersant measured by the following method. As the defoaming agent was employed a commercially available oxyalkylene defoaming agent and the air amount was adjusted to be 1.0±0.5 vol %.

[Measurement of Non-Volatile Component]
An aluminum cup was loaded with about 0.5 g of an aqueous polymer solution and about 1 g of ion exchanged water was added thereto and evenly dispersed. The mixture was dried at 130° C. for 1 hour in nitrogen atmosphere and the non-volatile component was calculated from the weight difference before and after drying.

[Evaluation Test Items and Measurement Method]
Slump flow value: JIS-A-1101
Compressive strength: JIS-A-1108 (sample body production: JIS-A-1132)
Air amount: JIS-A-1128

TABLE 4

| | Cement dispersant | Addition amount (%) | 15-hit flow value (mm) | Air amount (%) | Strength (N/m$^2$) |
|---|---|---|---|---|---|
| Example 1-5 | Cement dispersant 1-3 | 0.15 | 475 | 1.1 | 22.3 |
| Example 1-6 | Cement dispersant 1-4 | 0.15 | 485 | 0.9 | 23.5 |
| Comparative Example 1-4 | Comparative cement dispersant 1-2 | 0.15 | 370 | 0.7 | 19.6 |

TABLE 5

| | Cement dispersant | Addition amount (%) | 15-hit flow value (mm) | Air amount (%) | Strength (N/m²) |
|---|---|---|---|---|---|
| Example 1-7 | Cement dispersant 1-5 | 0.145 | 480 | 1 | 23 |
| Example 1-8 | Cement dispersant 1-6 | 0.145 | 470 | 0.8 | 22.8 |
| Comparative Example 1-5 | Comparative cement dispersant 1-3 | 0.145 | 370 | 0.5 | 19.8 |

From Table 4, it can be understood that as compared with the comparative cement dispersant 1-3 obtained by polymerizing unsaturated alkylene glycol ether monomers containing no unsaturated alkylene glycol diether monomer, the cement dispersant 1-3 of the invention obtained using ethylene glycol monomethallyl ether as a starting raw material obtained by reaction of methallyl chloride and ethylene glycol and the cement dispersant 1-4 of the invention synthesized by adding the unsaturated alkylene glycol diether monomer had high flow values and high compressive strength and were excellent in the dispersibility and strength-exhibiting performance (Examples 1-5 and 1-6, and Comparative Example 1-5) for the same addition amount (0.15% by mass).

From Table 5, it can be understood that as compared with the comparative cement dispersant 1-4 obtained by polymerizing unsaturated alkylene glycol ether monomers containing no unsaturated alkylene glycol diether monomer, the cement dispersant 1-5 of the invention obtained using ethylene glycol monomethallyl ether as a starting raw material obtained by reaction of methallyl chloride and ethylene glycol and the cement dispersant 1-6 of the invention synthesized by adding the unsaturated alkylene glycol diether monomer had high flow values and high compressive strength and were excellent in the dispersibility and strength-exhibiting performance (Examples 1-7 and 1-8, and Comparative Example 1-6) for the same addition amount (0.15% by mass).

Next, Production Example 2-1 will be described.
The GPC measurement conditions were as follows.
Column employed: manufactured by Tosoh Corporation
TSK guard column SWXL which includes
TSK gel G4000 SWXL,
TSK gel G3000 SWXL, and
TSK gel G2000 SWXL connected in this order.
Eluent: Employed was one prepared by dissolving 115.6 g of sodium acetate trihydrate in a solution containing 6001 g of acetonitrile and 10999 g of water and adjusting the pH to 6.0 with acetic acid.
Sample: Prepared by dissolving each aqueous polymer solution to 0.5% by mass of the polymer concentration by the eluent.
Sample loading quantity: 100
Flow rate: 1.0 mL/min
Column temperature: 40° C.
Detector: Waters 2414 RI detector
System: Waters alliance 2695
Analysis Software: Waters Empoer 2 (standard package/GPC option)
Standard substance for producing calibration curve:
Polyethylene glycol [peak top molecular weights (Mp) 272500, 219300, 107000, 50000, 24000, 11840, 6450, 4250, 1470]
Calibration curve: produced according to a cubic equation based on the Mp values of the polyethylene glycols and the elution times.

Production Example 2-1

A reaction container made of glass and equipped with a thermometer, a stirrer, a dripping apparatus, a nitrogen introduction tube, and a reflux condenser was loaded with 102.2 g of ion exchanged water, 198.3 g of an unsaturated polyalkylene glycol ether obtained by adding 120 moles of ethylene oxide on average to methallyl alcohol and 0.14 g of acrylic acid and under stirring, the inside of the reaction container was replaced with nitrogen and the contents were heated to 58° C. under nitrogen atmosphere. While the reaction container was kept at 58° C., 12.6 g of an aqueous 2% hydrogen peroxide solution was added. While the reaction container was kept at 58° C., an aqueous acrylic acid solution containing 7.9 g of acrylic acid and 16.5 g of ion exchanged water was dropwise added over 3 hours and at the same time, an aqueous solution obtained by dissolving 0.65 g of L-ascorbic acid and 0.47 g of 3-mercaptopropionic acid in 36.4 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 2-1, which was a polymer aqueous solution with a weight average molecular weight of 48000.

Example 2-1

Concrete Test

Concrete compositions using the cement dispersant 2-1 obtained in the above-mentioned manner were prepared and the slump flow values, alteration of the slump flow values with the lapse of time, air amounts, and compressive strengths were measured by the following methods, respectively. To adjust the test temperature of the concrete compositions at 20° C., the materials to be used for the test, a forcible kneading mixer, measurement instruments and the like were controlled for temperature adjustment in the test temperature atmosphere and the kneading and respective measurements were carried out under this test temperature atmosphere. The results are shown in Table 6.
[Concrete Test Blend]
Unit cement amount: 573.3 Kg/m³
Unit water amount: 172.0 Kg/m³ (containing admixture of a polymer, a defoaming agent and the like)
Unit fine aggregate amount: 737.2 Kg/m³
Unit coarse aggregate amount: 866.0 Kg/m³
Water/cement ratio (W/C): 30.0%
Aggregate amount ratio (s/a): 47.0%
Cement: normal port land cement (manufactured by Taiheiyo Cement Corporation);

Fine aggregate: a mixture of mountain sand produced in Kimitsu and land sand produced in Kakegawa river system at 3/7

Coarse aggregate: crushed stone produced in Oume

[Preparation of Concrete Composition]

The respective materials were measured to adjust the mixing amount to be 30 L by mixing the concrete raw materials as described above and the materials were hot-kneaded by the following method using a Pan mixer. First, after the fine aggregate was kneaded for 10 seconds, cement was added and the mixture was kneaded for 10 seconds. Thereafter, a prescribed amount of tap water containing the admixture for cement was added and the resulting mixture was kneaded for 30 to 90 seconds. Thereafter, further coarse aggregate was added and the resulting mixture was kneaded for 90 seconds to obtain a concrete composition. Further, in an evaluation test, the kneading starting time after addition of the tap water containing the admixture for cement was set to be zero.

[Preparation of Admixture for Cement]

The admixture for cement was prepared using the cement dispersant and the defoaming agent. Each of the cement dispersant 2-1 was used as the cement dispersant. The needed amount of the cement dispersant was calculated using the amount of the non-volatile components in the cement dispersant measured by the following method. As the defoaming agent was employed a commercially available oxyalkylene defoaming agent and the air amount was adjusted to be 1.5±0.5 vol %.

[Measurement of Non-Volatile Component]

An aluminum cup was loaded with about 0.5 g of an aqueous polymer solution and about 1 g of ion exchanged water was added thereto and evenly dispersed. The mixture was dried at 130° C. for 1 hour in nitrogen atmosphere and the non-volatile component was calculated from the weight difference before and after drying.

[Evaluation Test Items and Measurement Method]

Slump flow value: JIS-A-1101

Compressive strength: JIS-A-1108 (sample body production: JIS-A-1132)

Air amount: JIS-A-1128

From Tables 6 and 7, it can be understood that the cement dispersant 2-1 can give a prescribed slump flow value with a smaller addition amount, shows less slump flow value alteration with the lapse of time, and gives a higher compressive strength for 24 hours.

Hereinafter, production examples, that is, Production Examples 3-1 to 3-10 and Comparative Production Examples 3-1 to 3-7 will be described.

[Measurement Conditions of Production Amount of Byproduct Polyalkylene Glycol (Amount of Byproduct PEG)]

Column employed: Shodex

GF-1G 7B

GF-310 HQ

Eluent: water/acetonitrile=98/2 (% by mass)

Sample: Prepared by adjusting the sample concentration to be 0.1% by the eluent.

Sample loading quantity: 200 μL

Column temperature: 40° C.

Flow rate: 1 mL/min

Detector: Waters 2414 RI detector

System: Waters alliance 2695

Analysis Software: Waters Empoer 2 (standard package/GPC option)

[LC Measurement Conditions for Isomers]

Column employed: manufactured by GL Science

Inertsil guard column: 1 column

Inertsil ODS-25 μm 4.6 mm×250 mm, 3 columns

Eluent: Employed was one prepared by adding 52.5 g of acetic acid and 3.75 g of sodium acetate trihydrate to water, adjusting the total weight to be 9000 g, and further adding 6000 g of acetonitrile.

Sample: Prepared by adjusting the sample concentration to be 1.0% by the eluent.

Sample loading quantity: 100 μL

Flow rate: 0.6 mL/min

Column temperature: 40° C.

System: Waters alliance 2695

Detector: Waters 2414 RI detector

Analysis software: Empower 2 Software, manufactured by Waters

TABLE 6

| | Abbreviation | Average addition mole number of ethylene oxide in unsaturated polyalkylene glycol ether | Use amount of cement dispersant/cement (%) | Slump flow value (mm) 5 minutes later | Slump flow value (mm) 15 minutes later | Slump flow value (mm) 30 minutes later | Compressive strength 24 hours later (N/m²) | Air amount (vol %) |
|---|---|---|---|---|---|---|---|---|
| Example 2-1 | Cement dispersant 2-1 | 120 | 0.16 | 600 | 555 | 500 | 28.2 | 1.4 |

The results are collectively shown in Table 7. In Table 7, MLA-n denotes a monomer obtained by adding n moles of ethylene oxide to methallyl alcohol and SA denotes sodium acrylate.

[LC Separation Conditions for Isomers]

Column employed: manufactured by Shiseido Fine Chemicals

MGII 5 μm 10 mm (I. D.)×250 mm, 1 column

TABLE 7

| | Abbreviation | Average addition mole number of ethylene oxide in unsaturated polyalkylene glycol ether | wt % MLA-n | wt % SA | mol ratio SA/MLA | Concrete performances Dispersibility | Slump retaining property | Early strength |
|---|---|---|---|---|---|---|---|---|
| Example 2-1 | Cement dispersant 2-1 | 120 | 95 | 5 | 3.00 | Good | Good | Good |

Eluent: acetonitrile/water=45/55 (vol %)
Sample: Prepared by adjusting a sample concentration to be 10% by the eluent.
Sample loading quantity: 100 μL
Flow rate: 1.0 mL/min
Column temperature: 40° C.
System: Waters alliance 2695
Detector: Waters 2414 RI detector
Analysis software: Empower 2 Software, manufactured by Waters
Sampling condition: Respective fractions were dividedly batched off for every 30 seconds after an isomer peak was detected. In the case N-12 synthesized in Comparative Production Example 3-5 was dividedly batched off in the conditions as described above, the isomer peak appeared at about 22 minutes and samples in a range of 90 to 300 seconds from the peak detection were dividedly taken.

[GPC Measurement Conditions]

The GPC measurement conditions were as follows.
Column employed: manufactured by Tosoh Corporation
TSK guard column SWXL which includes
TSK gel G4000 SWXL,
TSK gel G3000 SWXL, and
TSK gel G2000 SWXL connected in this order.
Eluent: Employed was one prepared by dissolving 115.6 g of sodium acetate trihydrate in a solution containing 6001 g of acetonitrile and 10999 g of water and adjusting the pH to 6.0 with acetic acid.
Sample: Prepared by dissolving each aqueous polymer solution to 0.5% by mass of the polymer concentration by the eluent.
Sample loading quantity: 100 μL
Flow rate: 1.0 mL/min
Column temperature: 40° C.
System: Waters alliance 2695
Detector: Waters 2414 RI detector
Analysis Software: Waters Empower 2 Software Standard substance for producing calibration curve:
Polyethylene glycol [peak top molecular weights (Mp) 272500, 219300, 107000, 50000, 24000, 11840, 6450, 4250, 1470]
Calibration curve: Produced according to a cubic equation based on the Mp values of the polyethylene glycols and the elution times.

Production Example 3-1

MLA-10 from Methallyl Alcohol

An autoclave reaction container made of SUS and equipped with a thermometer, a stirrer, a raw material introduction tube, and a nitrogen introduction tube was loaded with 282 g of methallyl alcohol and 0.2 g of sodium hydroxide as an addition reaction catalyst and under stirring, the inside of the reaction container was replaced with nitrogen and the contents were heated to 110° C. under nitrogen atmosphere. Further, 1719 g of ethylene oxide was introduced into the reaction container while the temperature was kept at 110° C. under safety pressure and the temperature was kept as it was until the alkylene oxide addition reaction was completed and thus the reaction was finished. The obtained reaction product (hereinafter, referred to as N-1) contained an unsaturated polyalkylene glycol ether monomer (hereinafter, referred to as MLA-10) formed by adding 10 moles of ethylene oxide on average to methallyl alcohol and also a byproduct A-1. No isomer B-1 was detected. The byproduct A-1 contained water-soluble polyalkylene glycol (polyethylene glycol). The analysis results of the reaction product N-1 are shown in Table 8.

Production Example 3-2

MLA-50 from MLA-10

An autoclave reaction container made of SUS and equipped with a thermometer, a stirrer, a raw material introduction tube, and a nitrogen introduction tube was loaded with 2017 g of the reaction product (N-1) obtained in Production Example 3-1 and 1.45 g of an aqueous 48% sodium hydroxide solution as an addition reaction catalyst and under stirring and nitrogen flow, the inside of the reaction container was replaced with nitrogen and the contents were heated to 100° C. Next, under stirring and nitrogen flow, a pipe equipped with a glass trap was connected to the reaction container from the upper side and the reaction container was evacuated to 6.65×10³ Pa (50 Torr) by a vacuum pump. Thereafter, while the glass trap was cooled in an ethanol-dry ice bath, dewatering was carried out for 1 hour at the same temperature. On completion of dewatering, the temperature was increased to 110° C. in nitrogen atmosphere. Further, 6983 g of ethylene oxide was introduced into the reaction container while the temperature was kept at 110° C. under safety pressure and the temperature was kept as it was until the alkylene oxide addition reaction was completed and thus the reaction was finished. The obtained reaction product (hereinafter, referred to as N-2) contained an unsaturated polyalkylene glycol ether monomer (hereinafter, referred to as MLA-50) formed by adding 50 moles of ethylene oxide on average to methallyl alcohol and also a byproduct A-2. No isomer B-2 was detected. The byproduct A-2 contained water-soluble polyalkylene glycol (polyethylene glycol). The analysis results of the reaction product N-2 are shown in Table 8.

Production Example 3-3

MLA-120 from MLA-50

An autoclave reaction container made of SUS and equipped with a thermometer, a stirrer, a raw material introduction tube, and a nitrogen introduction tube was loaded with 3821 g of the reaction product (N-2) obtained in Production Example 3-2 and 1.08 g of an aqueous 48% sodium hydroxide solution as an addition reaction catalyst and under stirring, the inside of the reaction container was replaced with nitrogen and the contents were heated to 100° C. Next, under stirring and nitrogen flow, a pipe equipped with a glass trap was connected to the reaction container from the upper side and the reaction container was evacuated to 6.65×10³ Pa (50 Torr) by a vacuum pump. Thereafter, while the glass trap was cooled in an ethanol-dry ice bath, dewatering was carried out for 1 hour at the same temperature. On completion of dewatering, the temperature was increased to 110° C. in nitrogen atmosphere. Further, 5179 g of ethylene oxide was introduced into the reaction container while the temperature was kept at 110° C. under safety pressure and the temperature was kept as it was until the alkylene oxide addition reaction was completed and thus the reaction was finished. The obtained reaction product (hereinafter, referred to as N-3) contained an unsaturated polyalkylene glycol ether monomer (hereinafter, referred to as MLA-120) formed by adding 120 moles of ethylene oxide on average to methallyl alcohol and also a byproduct A-3. No isomer B-3 was detected. The byproduct A-3 contained water-soluble polyalkylene glycol (polyethylene glycol). The analysis results of the reaction product N-3 are shown in Table 8.

Production Example 3-4

MLA-10 from Methallyl Alcohol

An autoclave reaction container made of SUS and equipped with a thermometer, a stirrer, a raw material introduction tube, and a nitrogen introduction tube was loaded with 282 g of methallyl alcohol and 0.4 g of sodium hydroxide as an addition reaction catalyst and under stirring, the inside of the reaction container was replaced with nitrogen and the contents were heated to 130° C. in nitrogen atmosphere. Further, 1719 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as N-4) contained an unsaturated polyalkylene glycol ether monomer (hereinafter, referred to as MLA-10) formed by adding 10 moles of ethylene oxide on average to methallyl alcohol and also byproducts A-4 and B-4. The byproduct A-4 was a water-soluble polyalkylene glycol (polyethylene glycol). The byproduct B-4 was an isomer of the unsaturated polyalkylene glycol ether monomer. The analysis results of the reaction product N-4 are shown in Table 8.

Production Example 3-5

MLA-50 from MLA-10

An autoclave reaction container made of SUS and equipped with a thermometer, a stirrer, a raw material introduction tube, and a nitrogen introduction tube was loaded with 2017 g of the reaction product (N-4) obtained in Production Example 3-4 and 2.9 g of an aqueous 48% sodium hydroxide solution as an addition reaction catalyst and under stirring and nitrogen flow, the inside of the reaction container was replaced with nitrogen and the contents were heated to 105° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 6983 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as N-5) contained an unsaturated polyalkylene glycol ether monomer (hereinafter, referred to as MLA-50) formed by adding 50 moles of ethylene oxide on average to methallyl alcohol and also byproducts A-5 and B-5. The byproduct A-5 contained water-soluble polyalkylene glycol (polyethylene glycol). The byproduct B-5 was an isomer of the unsaturated polyalkylene glycol ether monomer. The analysis results of the reaction product N-5 are shown in Table 8.

Production Example 3-6

MLA-120 from MLA-50

An autoclave reaction container made of SUS and equipped with a thermometer, a stirrer, a raw material introduction tube, and a nitrogen introduction tube was loaded with 3821 g of the reaction product (N-5) obtained in Production Example 3-5 and 2.16 g of an aqueous 48% sodium hydroxide solution as an addition reaction catalyst and under stirring, the inside of the reaction container was replaced with nitrogen and the contents were heated to 105° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 5179 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as N-6) contained an unsaturated polyalkylene glycol ether monomer (hereinafter, referred to as MLA-120) formed by adding 120 moles of ethylene oxide on average to methallyl alcohol and also byproduct A-6 and B-6. The byproduct A-3 contained water-soluble polyalkylene glycol (polyethylene glycol). The byproduct B-6 was an isomer of the unsaturated polyalkylene glycol ether monomer. The analysis results of the reaction product N-6 are shown in Table 8

Production Example 3-7

MLA-150 from MLA-120

An autoclave reaction container made of SUS and equipped with a thermometer, a stirrer, a raw material introduction tube, and a nitrogen introduction tube was loaded with 3065 g of the reaction product (N-5) obtained in Production Example 3-5 and 2.47 g of an aqueous 48% sodium hydroxide solution as an addition reaction catalyst and under stirring, the inside of the reaction container was replaced with nitrogen and the contents were heated to 105° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 130° C. in nitrogen atmosphere. Further, 5935 g of ethylene oxide was introduced into the reaction container while the temperature was kept at 130° C. under safety pressure and the temperature was kept as it was until the alkylene oxide addition reaction was completed and thus the reaction was finished. The obtained reaction product (hereinafter, referred to as N-7) contained an unsaturated polyalkylene glycol ether monomer (hereinafter, referred to as MLA-150) formed by adding 150 moles of ethylene oxide on average to methallyl alcohol and also byproduct A-7 and B-7. The byproduct A-7 contained water-soluble polyalkylene glycol (polyethylene glycol). The byproduct B-7 was an isomer of the unsaturated polyalkylene glycol ether monomer. The analysis results of the reaction product N-7 are shown in Table 8.

Figure 6:
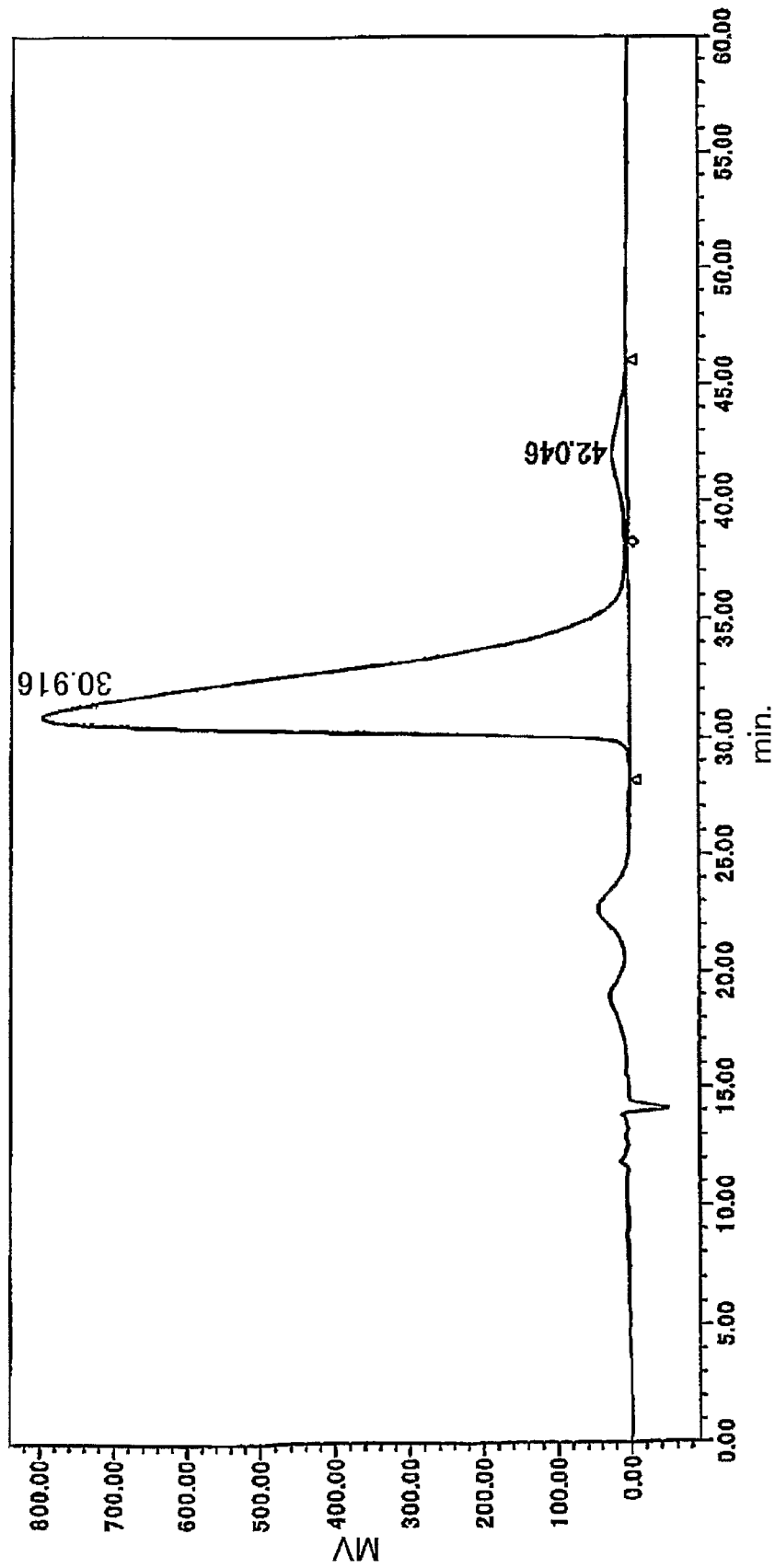
FIG. 6 is an LC chart of N-7 obtained in Production Example 3-7.

The LC chart of the isomers of the reaction product N-7 obtained in Production Example 3-7 measured in the LC conditions is shown in FIG. 6.

Comparative Production Example 3-1

MLA-20 from MLA-1

An autoclave reaction container made of SUS and equipped with a thermometer, a stirrer, a raw material introduction tube, and a nitrogen introduction tube was loaded with 1097 g of ethylene glycol monomethallyl ether and 4.5 g of sodium hydroxide as an addition reaction catalyst and under stirring, the inside of the reaction container was replaced with nitrogen and the contents were heated to 150° C. under nitrogen atmosphere. Further, 7903 g of ethylene oxide was introduced into the reaction container while the temperature was kept at 150° C. under safety pressure and the temperature was kept as it was until the alkylene oxide addition reaction was completed and thus the reaction was finished. The obtained reaction product (hereinafter, referred to as N-8) contained an unsaturated polyalkylene glycol ether monomer (hereinafter, referred to as MLA-20) formed by adding 20 moles of ethylene oxide on average to methallyl alcohol and also a byproduct A-8 and a byproduct B-8. The byproduct A-8 contained water-soluble polyalkylene glycol (polyethylene glycol) and the byproduct B-8 was an isomer of an unsaturated polyalkylene glycol ether monomer. The analysis results of the reaction product N-8 are shown in Table 8.

Comparative Production Example 3-2

MLA-120 from MLA-20

An autoclave reaction container made of SUS and equipped with a thermometer, a stirrer, a raw material introduction tube, and a nitrogen introduction tube was loaded with 337.9 g of the reaction product (N-8) obtained in Comparative Production Example 3-1 and 1.63 g of an aqueous 48% sodium hydroxide solution as an addition reaction catalyst and under stirring, the inside of the reaction container was replaced with nitrogen and the contents were heated to 105° C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 150° C. in nitrogen atmosphere. Further, 1562 g of ethylene oxide was introduced into the reaction container while the temperature was kept at 150° C. under safety pressure and the temperature was kept as it was until the alkylene oxide addition reaction was completed and thus the reaction was finished. The obtained reaction product (hereinafter, referred to as N-9) contained an unsaturated polyalkylene glycol ether monomer (hereinafter, referred to as MLA-120) formed by adding 120 moles of ethylene oxide on average to methallyl alcohol and also a byproduct A-9 and a byproduct B-9. The byproduct A-9 contained water-soluble polyalkylene glycol (polyethylene glycol) and the byproduct B-9 was an isomer of an unsaturated polyalkylene glycol ether monomer. The analysis results of the reaction product N-9 are shown in Table 8

Comparative Production Example 3-3

MLA-10 from Methallyl Alcohol

An autoclave reaction container made of SUS and equipped with a thermometer, a stirrer, a raw material introduction tube, and a nitrogen introduction tube was loaded with 1400 g of methallyl alcohol and 2.5 g of sodium hydroxide as an addition reaction catalyst and under stirring, the inside of the reaction container was replaced with nitrogen and the contents were heated to 150° C. under nitrogen atmosphere. Further, 4297 g of ethylene oxide was introduced into the reaction container while the temperature was kept at 150° C. under safety pressure and the temperature was kept as it was until the alkylene oxide addition reaction was completed and thus the reaction was finished. The obtained reaction product (hereinafter, referred to as N-10) contained an unsaturated polyalkylene glycol ether monomer (hereinafter, referred to as MLA-10) formed by adding 10 moles of ethylene oxide on average to methallyl alcohol and also a byproduct A-10 and a byproduct B-10. The byproduct A-10 contained water-soluble polyalkylene glycol (polyethylene glycol) and the byproduct B-10 was an isomer of an unsaturated polyalkylene glycol ether monomer. The analysis results of the reaction product N-10 are shown in Table 8.

Comparative Production Example 3-4

MLA-50 from MLA-10

An autoclave reaction container made of SUS and equipped with a thermometer, a stirrer, a raw material introduction tube, and a nitrogen introduction tube was loaded with 2017 g of the reaction product (N-10) obtained in Comparative Production Example 3-3 and 7.27 g of an aqueous 48% sodium hydroxide solution as an addition reaction catalyst and under stirring, the inside of the reaction container was replaced with nitrogen and the contents were heated to 105° C. under nitrogen atmosphere. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 150° C. in nitrogen atmosphere. Further, 6983 g of ethylene oxide was introduced into the reaction container while the temperature was kept at 150° C. under safety pressure and the temperature was kept as it was until the alkylene oxide addition reaction was completed and thus the reaction was finished. The obtained reaction product (hereinafter, referred to as N-11) contained an unsaturated polyalkylene glycol ether monomer (hereinafter, referred to as MLA-50) formed by adding 50 moles of ethylene oxide on average to methallyl alcohol and also a byproduct A-11 and a byproduct B-11. The byproduct A-11 contained water-soluble polyalkylene glycol (polyethylene glycol) and the byproduct B-11 was an isomer of an unsaturated polyalkylene glycol ether monomer. The analysis results of the reaction product N-11 are shown in Table 8.

Comparative Production Example 3-5

MLA-150 from MLA-50

An autoclave reaction container made of SUS and equipped with a thermometer, a stirrer, a raw material introduction tube, and a nitrogen introduction tube was loaded with 3065 g of the reaction product (N-11) obtained in Comparative Production Example 3-4 and 6.18 g of an aqueous 48% sodium hydroxide solution as an addition reaction catalyst and under stirring, the inside of the reaction container was replaced with nitrogen and the contents were heated to 105°

C. Next, under stirring and nitrogen flow, a pipe equipped with a glass trap was connected to the reaction container from the upper side and the reaction container was evacuated to $6.65 \times 10^3$ Pa (50 Torr) by a vacuum pump. Thereafter, while the glass trap was cooled in an ethanol-dry ice bath, dewatering was carried out for 1 hour at the same temperature. On completion of dewatering, the temperature was increased to 150° C. in nitrogen atmosphere. Further, 5935 g of ethylene oxide was introduced into the reaction container while the temperature was kept at 150° C. under safety pressure and the temperature was kept as it was until the alkylene oxide addition reaction was completed and thus the reaction was finished. The obtained reaction product (hereinafter, referred to as N-12) contained an unsaturated polyalkylene glycol ether monomer (hereinafter, referred to as MLA-150) formed by adding 150 moles of ethylene oxide on average to methallyl alcohol and also a byproduct A-12 and a byproduct B-12. The byproduct A-12 contained water-soluble polyalkylene glycol (polyethylene glycol) and the byproduct B-12 was an isomer of an unsaturated polyalkylene glycol ether monomer. The analysis results of the reaction product N-12 are shown in Table 8.

Figure 7:
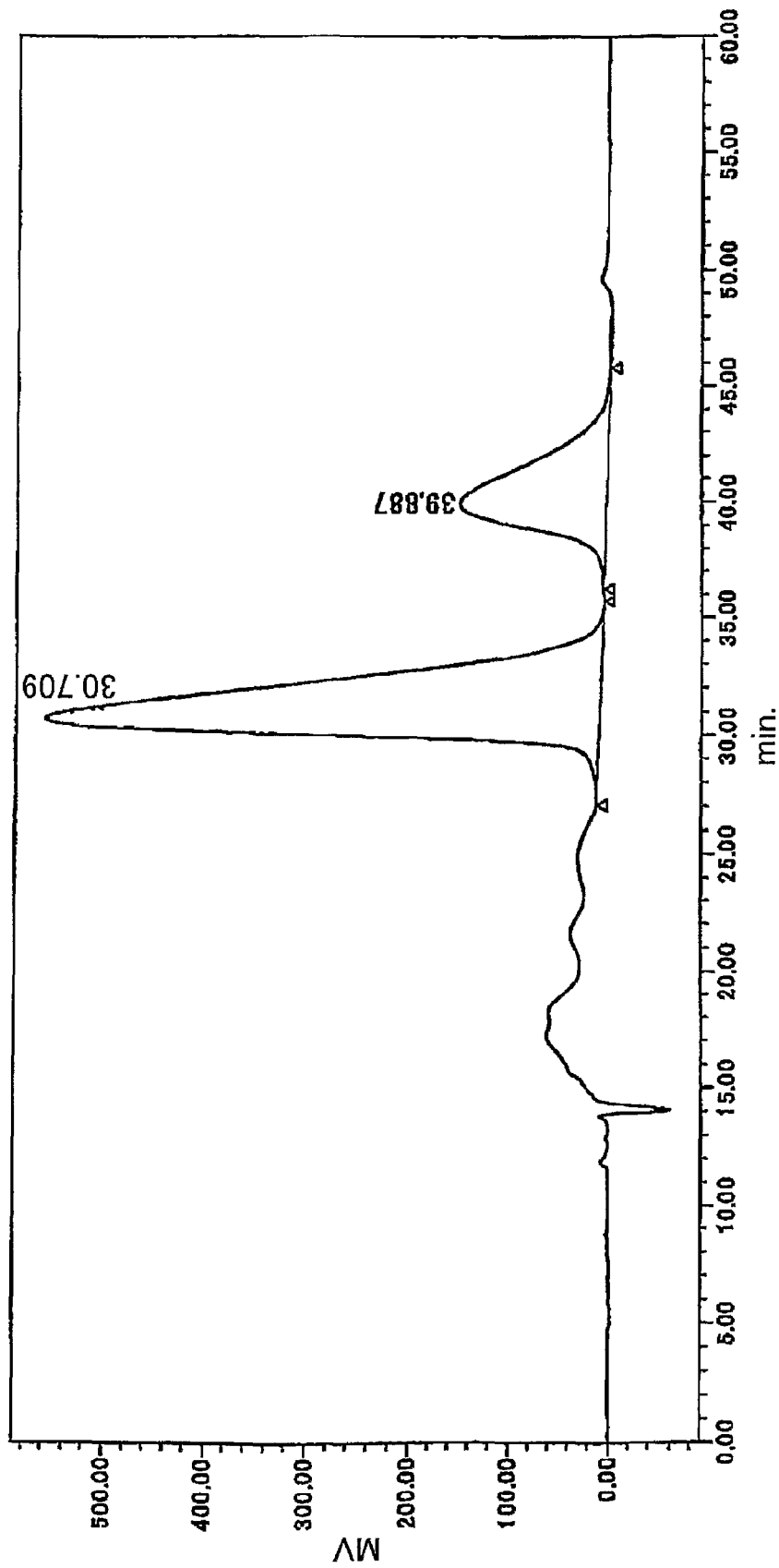
FIG. 7 is an LC chart of N-12 obtained in Comparative Production Example 3-5.
Figure 10:
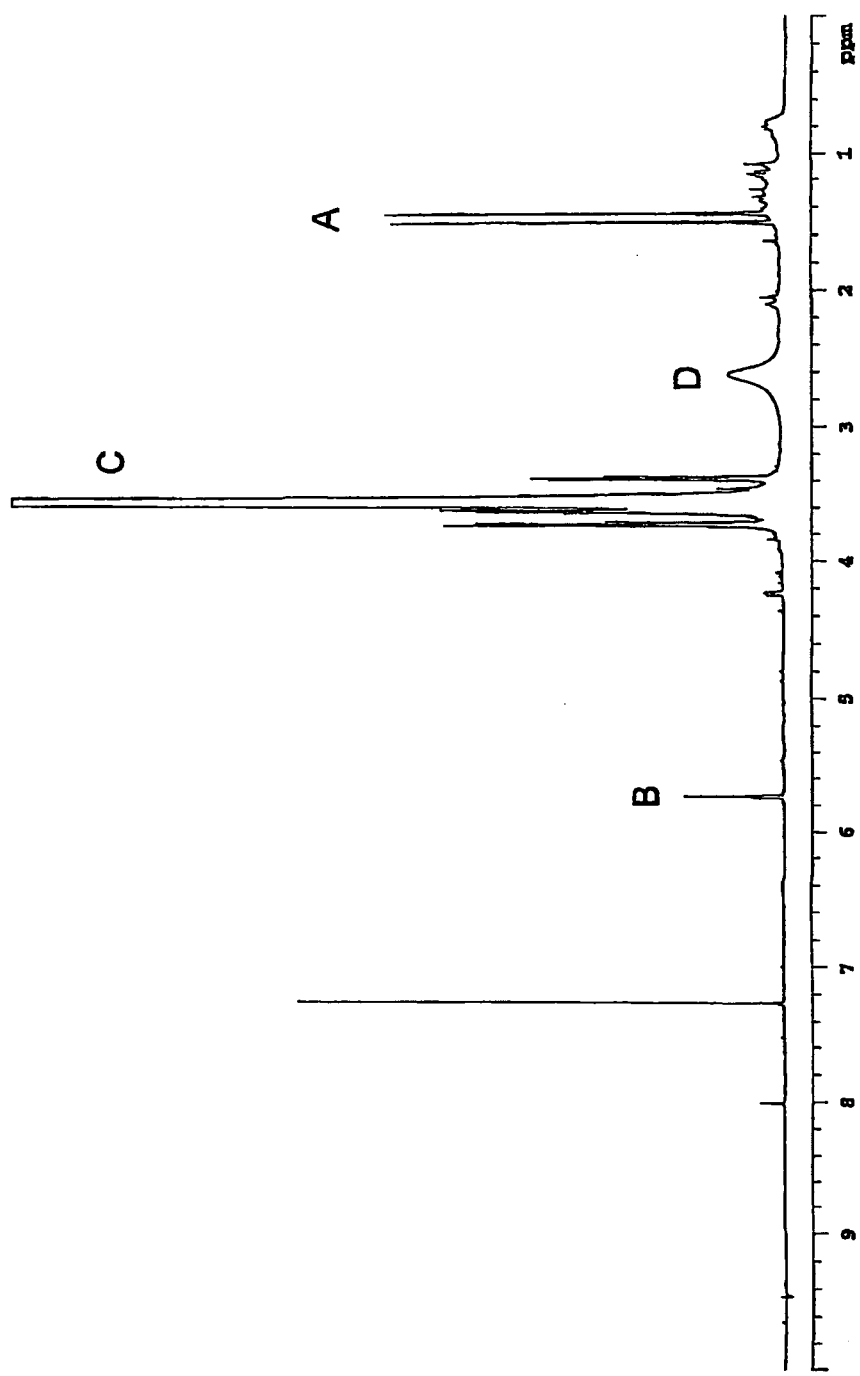
FIG. 10 is an NMR analysis result of a byproduct B-12 obtained by separation of an isomer (byproduct) B-12 in N-12 obtained in Comparative Production Example 3-5.

The LC chart of the isomers of the reaction product N-12 obtained in Comparative Production Example 3-5 measured in the LC conditions is shown in FIG. 7.

isomers. Further, NMR measurement was carried out for B-12 isolated by batching off to identify the structure. The NMR analysis results of N-12 are shown in FIG. 10. From the NMR analysis results, the structure of B-12 is found to have the following chemical formula:

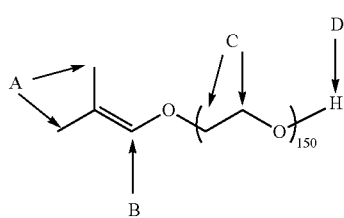

In the above formula, A to D correspond to signals A to D in the NMR chart.

TABLE 8

| | Step | Reaction product | Raw material | EO addition temperature (° C.) | EO chain length of product | Byproduct PEG amount A (wt %) | Isomer amount B (wt %) |
|---|---|---|---|---|---|---|---|
| Production Example 3-1 | 1 | N-1 | Metallyl alcohol | 110 | 10 | 1.8 | 0.0 |
| Production Example 3-2 | 2 | N-2 | N-1 | 110 | 50 | 2 | 0.0 |
| Production Example 3-3 | 2 | N-3 | N-2 | 110 | 120 | 2 | 0.0 |
| Production Example 3-4 | 1 | N-4 | Methallyl alcohol | 130 | 10 | 2.4 | 0.1 |
| Production Example 3-5 | 2 | N-5 | N-4 | 130 | 50 | 1.9 | 0.5 |
| Production Example 3-6 | 2 | N-6 | N-5 | 130 | 120 | 2.7 | 1.6 |
| Production Example 3-7 | 2 | N-7 | N-5 | 130 | 150 | 3.1 | 3.0 |
| Comparative Production Example 3-1 | 1 | N-8 | Methallyl alcohol 1EO | 150 | 20 | 3.4 | 3.3 |
| Comparative Production Example 3-2 | 2 | N-9 | N-8 | 150 | 120 | 11.3 | 22.6 |
| Comparative Production Example 3-3 | 1 | N-10 | Methallyl alcohol | 150 | 10 | 2 | 3.0 |
| Comparative Production Example 3-4 | 2 | N-11 | N-10 | 150 | 50 | 2.7 | 12.0 |
| Comparative Production Example 3-5 | 2 | N-12 | N-11 | 150 | 150 | 6.5 | 25.6 |

Figure 8:
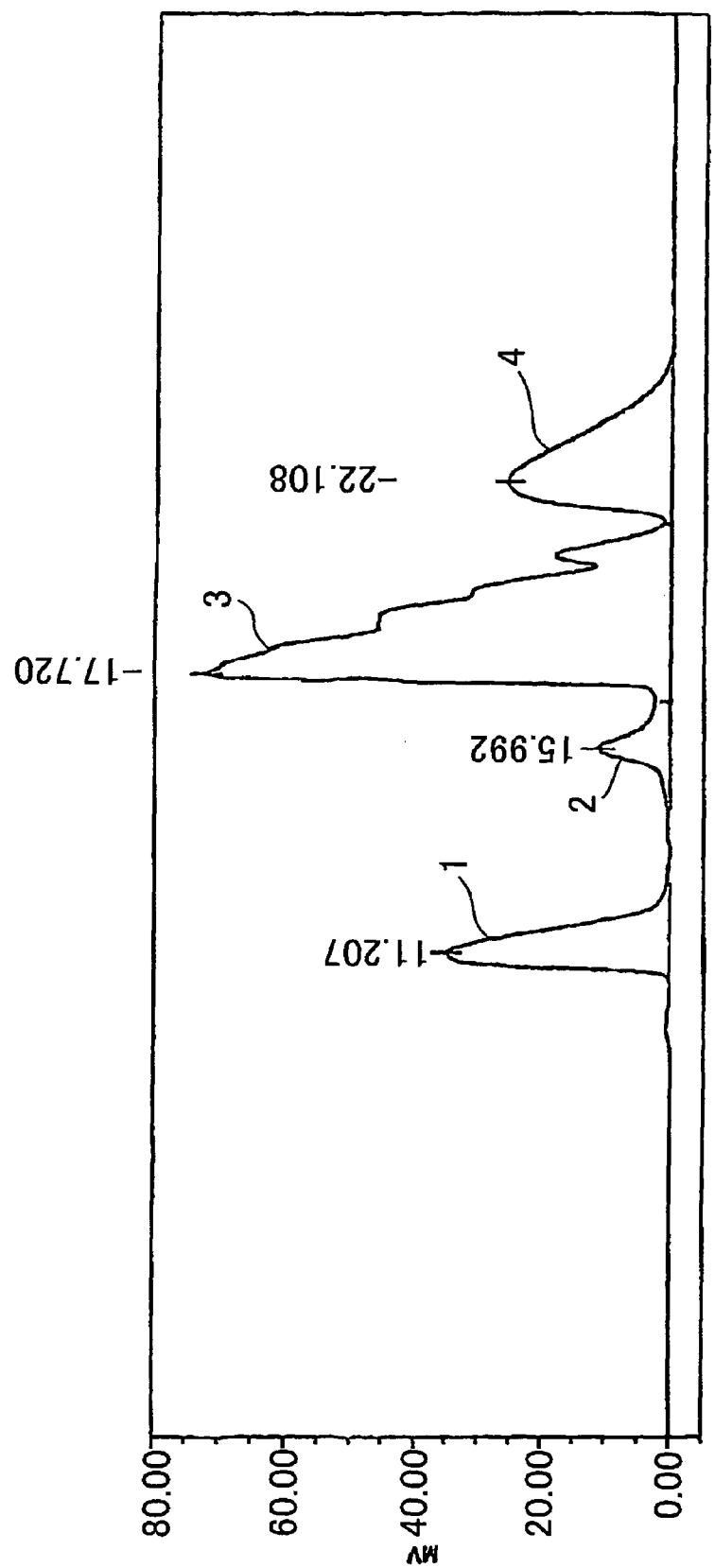
FIG. 8 is an LC chart of N-12 (measured under condition of LC for isomer separation) obtained in Comparative Production Example 3-5.
Figure 9:
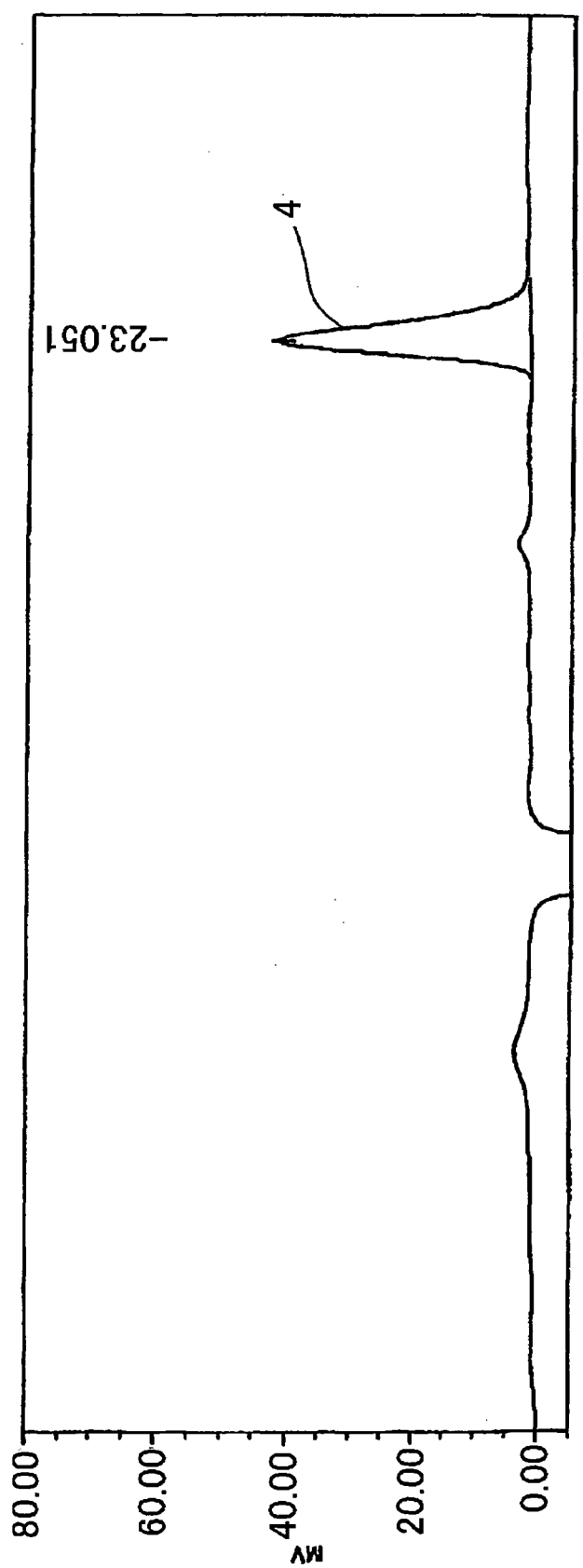
FIG. 9 is an LC chart of a byproduct B-12 (measured under condition of LC for isomer separation) obtained by separation of an isomer (byproduct) B-12 in N-12 obtained in Comparative Production Example 3-5.

The LC chart of N-12 is shown in FIG. 8 and the results such as retention time, peak surface area, peak height, and the like of the LC analysis results are shown in Table 9. Further, the byproduct B-12 contained in the reaction product N-12 was dividedly batched off by liquid chromatography and the LC chart of the isolated byproduct B-12 is shown in FIG. 9 and the results such as retention time, peak surface area, peak height, and the like of the LC analysis results are shown in Table 10. With respect to charts of FIG. 8 and FIG. 9, measurement was carried out in the LC separation conditions of

TABLE 9

| | Holding time (minute) | % area | Area (μV second) | Height (μV) |
|---|---|---|---|---|
| 1 | 11.207 | 14.31 | 1922147 | 34694 |
| 2 | 15.992 | 4.48 | 602089 | 10958 |
| 3 | 17.726 | 60.55 | 8133528 | 71871 |
| 4 | 22.108 | 20.66 | 2775012 | 25374 |

TABLE 10

| Holding time (minute) | % area | Area (µV second) | Height (µV) |
|---|---|---|---|
| 1 | 20.000 | — | — |
| 4 | 23.051 | 100.00 | 1879020 | 39849 |

Comparative Production Example 3-3 was carried out according to the synthesis method of methallyl alcohol 10EO disclosed in JP-A No. 2003-221266 and Japanese Patent Application National Publication No. 2006-522744.

Polymerization Process

Production Example 3-8

Polymerization of N-3 (MLA-120)

A reaction container made of glass and equipped with a thermometer, a stirrer, a dripping apparatus, a nitrogen introduction tube, and a reflux condenser was loaded with 101 g of ion exchanged water, 196 g of the reaction product (N-3) obtained in Production Example 3-3 as an unsaturated polyalkylene glycol ether monomer and 0.07 g of acrylic acid and under stirring, the inside of the reaction container was replaced with nitrogen and the contents were heated to 58° C. under nitrogen atmosphere. While the reaction container was kept at 58° C., 14.95 g of an aqueous 2% hydrogen peroxide solution was added. While the reaction container was kept at 58° C., an aqueous acrylic acid solution containing 9.96 g of acrylic acid and 15.18 g of ion exchanged water was dropwise added over 3 hours and at the same time, an aqueous solution obtained by dissolving 0.774 g of L-ascorbic acid and 0.541 g of 3-mercaptopropionic acid in 36.19 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 3-1 of the invention, which was a polymer aqueous solution with a weight average molecular weight of 52800.

Production Example 3-9

Polymerization of N-6 (MLA-120)

A reaction container made of glass and equipped with a thermometer, a stirrer, a dripping apparatus, a nitrogen introduction tube, and a reflux condenser was loaded with 101 g of ion exchanged water, 196 g of the reaction product (N-6) obtained in Reference Production Example 3-6 as an unsaturated polyalkylene glycol ether monomer and 0.14 g of acrylic acid and under stirring, the inside of the reaction container was replaced with nitrogen and the contents were heated to 58° C. under nitrogen atmosphere. While the reaction container was kept at 58° C., 14.95 g of an aqueous 2% hydrogen peroxide solution was added. While the reaction container was kept at 58° C., an aqueous acrylic acid solution containing 9.89 g of acrylic acid and 15.14 g of ion exchanged water was dropwise added over 3 hours and at the same time, an aqueous solution obtained by dissolving 0.774 g of L-ascorbic acid and 0.541 g of 3-mercaptopropionic acid in 36.19 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at the temperature not higher than the polymerization reaction temperature to obtain the cement dispersant 3-2 of the invention, which was a polymer aqueous solution with a weight average molecular weight of 52100. The content of the isomer in the polymer was found to be 1.13% by the LC analysis.

Comparative Production Example 3-6

Polymerization of N-9 (MLA-120)

A Reaction Container Made of Glass and Equipped with a thermometer, a stirrer, a dripping apparatus, a nitrogen introduction tube, and a reflux condenser was loaded with 101 g of ion exchanged water, 196 g of the reaction product (N-9) obtained in Comparative Production Example 3-2 as an unsaturated polyalkylene glycol ether monomer and 0.35 g of acrylic acid and under stirring, the inside of the reaction container was replaced with nitrogen and the contents were heated to 58° C. under nitrogen atmosphere. While the reaction container was kept at 58° C., 14.95 g of an aqueous 2% hydrogen peroxide solution was added. While the reaction container was kept at 58° C., an aqueous acrylic acid solution containing 9.67 g of acrylic acid and 15.04 g of ion exchanged water was dropwise added over 3 hours and at the same time, an aqueous solution obtained by dissolving 0.774 g of L-ascorbic acid and 0.541 g of 3-mercaptopropionic acid in 36.19 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at the temperature not higher than the polymerization reaction temperature to obtain the comparative cement dispersant 3-1, which was a polymer aqueous solution with a weight average molecular weight of 48200.

Production Example 3-10

Polymerization of N-7 (MLA-150)

Figure 11:
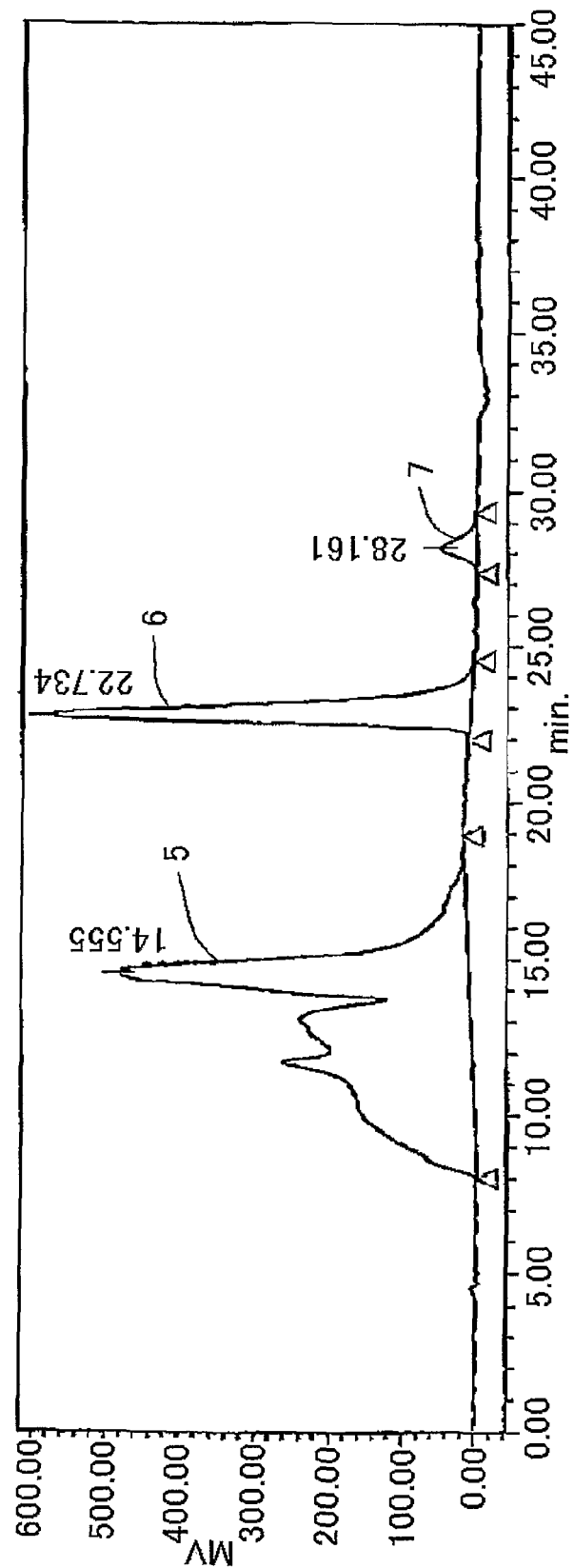
FIG. 11 is an LC chart of the polymerization reaction product obtained in Production Example 3-10.

A reaction container made of glass and equipped with a thermometer, a stirrer, a dripping apparatus, a nitrogen introduction tube, and a reflux condenser was loaded with 97 g of ion exchanged water, 188 g of the reaction product (N-7) obtained in Production Example 3-7 as an unsaturated polyalkylene glycol ether monomer and 0.14 g of acrylic acid and under stirring, the inside of the reaction container was replaced with nitrogen and the contents were heated to 58° C. under nitrogen atmosphere. While the reaction container was kept at 58° C., 23.93 g of an aqueous 2% hydrogen peroxide solution was added. While the reaction container was kept at 58° C., an aqueous acrylic acid solution containing 18.12 g of acrylic acid and 10.40 g of ion exchanged water was dropwise added over 3 hours and at the same time, an aqueous solution obtained by dissolving 1.24 g of L-ascorbic acid and 0.866 g of 3-mercaptopropionic acid in 35.39 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the cement dispersant 3-3 of the invention, which was a polymer aqueous solution with a weight average molecular weight of 42400. The content of the isomer in the polymer was found to be 1.05% by the LC analysis. The LC chart of the polymerization reaction product is shown in FIG. 11. In FIG. 11, the broad peak at 8 to 18 minutes was a peak of the polymer, the peak at 22.7 minutes was a peak of the residual polyalkylene glycol ether monomer, and the peak at 28.2 minutes was a peak of the isomer. The holding time, the peak area, the peak height, and the like, obtained by the LC analysis were shown in the following Table 11.

TABLE 11

| | Holding time (minute) | % area | Area (µV second) | Height (µV) |
|---|---|---|---|---|
| 5 | 14.555 | 78.73 | 91563853 | 473551 |
| 6 | 22.734 | 19.57 | 22762088 | 577703 |
| 7 | 28.161 | 1.70 | 1980638 | 48481 |

Comparative Production Example 3-7

Polymerization of N-12 (MLA-150)

A reaction container made of glass and equipped with a thermometer, a stirrer, a dripping apparatus, a nitrogen introduction tube, and a reflux condenser was loaded with 97 g of ion exchanged water, 188 g of the reaction product (N-12) obtained in Comparative Production Example 3-5 as an unsaturated polyalkylene glycol ether monomer and 0.34 g of acrylic acid and under stirring, the inside of the reaction container was replaced with nitrogen and the contents were heated to 58° C. under nitrogen atmosphere. While the reaction container was kept at 58° C., 23.93 g of an aqueous 2% hydrogen peroxide solution was added. While the reaction container was kept at 58° C., an aqueous acrylic acid solution containing 17.91 g of acrylic acid and 10.30 g of ion exchanged water was dropwise added over 3 hours and at the same time, an aqueous solution obtained by dissolving 1.24 g of L-ascorbic acid and 0.866 g of 3-mercaptopropionic acid in 35.39 g of ion exchanged water was dropwise added over 3.5 hours. Thereafter, the temperature was continuously kept at 58° C. for 2 hours and successively the polymerization reaction was completed. Thereafter, the acidic reaction solution was neutralized to be pH 6 by an aqueous sodium hydroxide solution at a temperature not higher than the polymerization reaction temperature to obtain the comparative cement dispersant 3-2, which was a polymer aqueous solution with a weight average molecular weight of 38100.

Examples 3-1 to 3-9 and Comparative Examples 3-1 to 3-6

The isomer content in the polymers obtained in the above-mentioned Production Examples 3-8 to 3-10 and Comparative Production Examples 3-6 to 3-7 were measured by the following method.
[LC Measurement Conditions for Isomers]
Column employed: manufactured by GL Science
Inertsil guard column: 1 column
Inertsil ODS-25 µm 4.6 mm×250 mm, 3 columns
Eluent: Employed was one prepared by adding 52.5 g of acetic acid and 3.75 g of sodium acetate trihydrate to water, adjusting the total weight to be 9000 g, and further adding 6000 g of acetonitrile.
Sample: Prepared by adjusting the sample concentration to be 1.0% by the eluent.
Sample loading quantity: 100 µL
Flow rate: 0.6 mL/min
Column temperature: 40° C.
Detector: Waters 2414 RI detector
Standard substance for calibration curve preparation:
Polyethylene glycol [peak top molecular weight (Mp) 26840]
Calibration curve: quadric calibration curve prepared based on the concentration of the injected polyethylene glycol and the detection area by RI A mortar test was carried out for the cement dispersants obtained in Production Examples 3-1 to 3-10 and Comparative Examples 3-1 to 3-7. The measurement methods of solid matter measurement and mortar air amount were same as the methods described above.

In preparation of an aqueous solution of an admixture for cement, a prescribed amount of each aqueous polymer solution was weighed and a solution obtained by diluting an undiluted defoaming agent MA404 (manufactured by Pozzolith Ltd.) 100-fold was added at a ratio of 10% by mass to the polymer component and further ion exchanged water was added to adjust the weight to be 270 g and the mixture was sufficiently and evenly dissolved. The mortar blend was adjusted to be C/S/W=900/1350/270 (g). C, S, and W are same as described above.

In the measurement of the flow value, the measurement methods same as the measurement method of the flow value as described above were carried out, except that the cement amount to be kneaded at a low speed for 30 seconds by a Hobart type mortar mixer was changed to be 900 g and the amount of the aqueous solution of the admixture for cement was changed to be 270 g.

The experiment environments were adjusted to a temperature of 20° C.±1° C. and a relative humidity of 60%±10%.
(Mortar Test Results)
The results of the mortar test carried out using the polymers of the present invention and the comparative polymers are shown in Tables 12 to 15.

TABLE 12

| | Production Example | | Addition amount (wt %) | Flow value (mm) | Air amount (vol %) |
|---|---|---|---|---|---|
| Example 3-1 | Production Example 3-8 | Cement dispersant 3-1 | 0.155 | 250 | 2.66 |
| Example 3-2 | Production Example 3-9 | Cement dispersant 3-2 | 0.155 | 235 | 2.72 |
| Comparative Example 3-1 | Comparative Production Example 3-6 | Comparative cement dispersant 3-1 | 0.155 | 169 | 2.8 |

TABLE 13

| | Production Example | | Addition amount (wt %) | Flow value (mm) | Air amount (vol %) |
|---|---|---|---|---|---|
| Example 3-3 | Production Example 3-8 | Cement dispersant 3-1 | 0.145 | 211 | 2.97 |
| Example 3-4 | Production Example 3-9 | Cement dispersant 3-2 | 0.15 | 214 | 3.07 |
| Comparative Example 3-2 | Comparative Production Example 3-6 | Comparative cement dispersant 3-1 | 0.165 | 211 | 3.1 |

TABLE 14

| | Production Example | | Addition amount (wt %) | Flow value (mm) | Air amount (vol %) |
|---|---|---|---|---|---|
| Example 3-5 | Production Example 3-10 | Cement dispersant 3-3 | 0.14 | 250 | 2.5 |
| Comparative Example 3-3 | Comparative Production Example 3-7 | Comparative cement dispersant 3-2 | 0.14 | 190 | 2.61 |

TABLE 15

| | Production Example | | Addition amount (wt %) | Flow value (mm) | Air amount (vol %) |
|---|---|---|---|---|---|
| Example 3-6 | Production Example 3-10 | Cement dispersant 3-3 | 0.14 | 250 | 2.5 |
| Comparative Example 3-4 | Comparative Production Example 3-7 | Comparative cement dispersant 3-2 | 0.17 | 190 | 2.61 |

From Table 12, it can be understood that as compared with the comparative cement dispersant 3-1 using the reaction product (N-9) obtained in Comparative Production Example 3-2 as unsaturated polyalkylene glycol ether monomers, the cement dispersant 3-1 using the reaction product (N-3) obtained in Production Example 3-3 as unsaturated polyalkylene glycol ether monomers and the cement dispersant 3-2 using the reaction product (N-6) obtained in Production Example 3-6 as unsaturated polyalkylene glycol ether monomers had high flow values for the same addition amount.

From Table 13, it can be understood that as compared with the comparative cement dispersant 3-1 using the reaction product (N-9) obtained in Comparative Production Example 3-2 as unsaturated polyalkylene glycol ether monomers, the cement dispersant 3-1 using the reaction product (N-3) obtained in Production Example 3-3 as unsaturated polyalkylene glycol ether monomers could save the addition amount by about 14% for obtaining the same flow value and that as compared with the comparative cement dispersant 3-1 using the reaction product (N-9) obtained in Comparative Production Example 3-2 as unsaturated polyalkylene glycol ether monomers, the cement dispersant 3-2 using the reaction product (N-6) obtained in Production Example 3-6 as unsaturated polyalkylene glycol ether monomers could save the addition amount by about 10% for obtaining the same flow value.

From Table 14, it can be understood that as compared with the comparative cement dispersant 3-2 using the reaction product (N-12) obtained in Comparative Production Example 3-5 as unsaturated polyalkylene glycol ether monomers, the cement dispersant 3-3 using the reaction product (N-7) obtained in Production Example 3-7 as unsaturated polyalkylene glycol ether monomers had a high flow value for the same addition amount.

From Table 15, it can be understood that as compared with the comparative cement dispersant 3-2 using the reaction product (N-12) obtained in Comparative Production Example 3-5 as unsaturated polyalkylene glycol ether monomers, the cement dispersant 3-3 using the reaction product (N-7) obtained Production Example 3-7 as unsaturated polyalkylene glycol ether monomers could save the addition amount by about 21% for obtaining the same flow value.

The results of the concrete test using the above-mentioned cement dispersants are shown below.
[Concrete Test Blend]
Unit cement amount: 573.3 Kg/m$^3$
Unit water amount: 172.0 Kg/m$^3$ (containing admixture of a polymer, a defoaming agent and the like)
Unit fine aggregate amount: 737.2 Kg/m$^3$
Unit coarse aggregate amount: 866.0 Kg/m$^3$
Water/cement ratio (W/C): 30.0%
Aggregate amount ratio (s/a): 47.0%
Cement: normal portland cement (manufactured by Taiheiyo Cement Corporation);
Fine aggregate: a mixture of mountain sand produced in Kimitsu and land sand produced in Kakegawa river system at 3/7
Coarse aggregate: crushed stone produced in Oume
[Preparation of Concrete Composition]
The respective materials were measured to adjust the mixing amount to be 30 L by mixing the concrete raw materials as described above and the materials were hot-kneaded by the following method using a Pan mixer. First, after the fine aggregate was kneaded for 10 seconds, cement was added and the mixture was kneaded for 10 seconds. Thereafter, a prescribed amount of tap water containing the admixture for cement was added and the resulting mixture was kneaded for 30 to 90 seconds. Thereafter, further coarse aggregate was added and the resulting mixture was kneaded for 90 seconds to obtain a concrete composition. Further, in an evaluation test, the kneading starting time after addition of the tap water containing the admixture for cement was set to be zero.

[Preparation of Admixture for Cement]

The admixture for cement was prepared using the cement dispersant and the defoaming agent. Each of the cement dispersants 3-1, 3-2, 3-3, and the comparative cement dispersants 3-1 and 3-2 were used as the cement dispersant. The needed amount of the cement dispersant was calculated using the amount of the non-volatile components in the cement dispersant measured by the following method. As the defoaming agent was employed a commercially available oxyalkylene defoaming agent and the air amount was adjusted to be 1.0±0.5 vol %.

[Measurement of Non-Volatile Component]

An aluminum cup was loaded with about 0.5 g of an aqueous polymer solution and about 1 g of ion exchanged water was added thereto and evenly dispersed. The mixture was dried at 130° C. for 1 hour in nitrogen atmosphere and the non-volatile component was calculated from the weight difference before and after drying.

[Evaluation Test Items and Measurement Method]

Slump flow value: JIS-A-1101
Compressive strength: JIS-A-1108 (sample body production: JIS-A-1132)
Air amount: JIS-A-1128

The results of the evaluation test are shown in the following Table 16. From Table 16, it can be understood that as compared with the comparative cement dispersant 3-1, the cement dispersants 3-1 and 3-2 of the present invention had high flow values and early strength for the same addition amount. Further, it can be understood that as compared with the comparative cement dispersant 3-3, the cement dispersant 3-3 of the present invention had high flow values and early strength for the same addition amount.

In the respective cement dispersants, the following reaction products were used as an unsaturated polyalkylene glycol ether monomer: in the cement dispersant 3-1, the reaction product (N-3) obtained in Production Example 3-3 was used; in the cement dispersant 3-2, the reaction product (N-6) obtained in Production Example 3-6 was used; in the comparative cement dispersant 3-1, the reaction product (N-9) obtained in Comparative Production Example 3-2 was used; in the cement dispersant 3-3, the reaction product (N-7) obtained in Production Example 3-7 was used; and in the comparative cement dispersant 3-3, the reaction product (N-12) obtained in Comparative Production Example 3-5 was used.

TABLE 16

| | Production Example | | Addition amount (wt %) | Flow value (mm) | Air amount (vol %) | Strength (N/m$^2$) |
|---|---|---|---|---|---|---|
| Example 3-7 | Production Example 3-8 | Cement dispersant 3-1 | 0.16 | 520 | 1.3 | 26.8 |
| Example 3-8 | Production Example 3-9 | Cement dispersant 3-2 | 0.16 | 500 | 1.4 | 25.5 |
| Comparative Example 3-5 | Comparative Production Example 3-6 | Comparative cement dispersant 3-1 | 0.16 | 400 | 1.2 | 23.5 |
| Example 3-9 | Production Example 3-10 | Cement dispersant 3-3 | 0.18 | 535 | 1.2 | 26.8 |
| Comparative Example 3-6 | Comparative Production Example 3-7 | Comparative cement dispersant 3-2 | 0.18 | 450 | 1.4 | 25.5 |

Production Examples 4-1 to 4-4 and Reference Production Example 4-1 are mentioned below.

Analysis of the compounds produced in Production Examples 4-1 to 4-4 and Reference Production Example 4-1 was carried out using the following apparatuses.

Gas Chromatography
Apparatus: GC-15A manufactured by Shimadzu Corporation,
Capillary column DB-1 (0.53 mmΦ×30 m) manufactured by J & W Corporation
Condition: keeping at 40° C. for 5 min, heating at 10° C./min, and keeping at 200° C. for 5 min Water Content Measurement
Apparatus: MK-510 manufactured by Kyoto Electronics Manufacturing Co., Ltd. (KEM)
Standard sample: Carl Fisher SS manufactured by Mitsubishi Chemical Corporation Production Example 4-1

Production of Ethylene Glycol Methallyl Ether using Bland New Ethylene Glycol (Reaction Process)

A 3 L flask was loaded with 1500.0 g (24.17 mol) of ethylene glycol, 420.92 g of an aqueous 48% by mass sodium hydroxide solution (NaOH 5.05 mol), and 452.79 g (5.00 mol) of methallyl chloride and under stirring, reaction was carried out at 60° C. for 3 hours and successively at 70° C. for 3 hours. Precipitation of solid matter was observed in the flask. The yield of ethylene glycol monomethallyl ether was 85.6 mol % on the basis of the raw material methallyl chloride at the time of reaction completion. Further, the yield of ethylene glycol monomethallyl ether was 17.7 mol % on the basis of ethylene glycol used in the reaction.

(Water Reduction Process and Solid-Liquid Separation Process)

After the reaction, an oil-water separation tube was attached to the flask and under stirring, while oil-water separation of the distilled solution was carried out, reduced pressure distillation was carried out to separate 292.34 g of water. The operation pressure was at 200 mmHg in the initial stage and thereafter it was decreased to 100 mmHg and the moment at which the distilled solution became a uniform layer was determined as completion of the reaction. Thereafter, the precipitated solid matter was separated from the slurry remaining in the pot after the dewatering process as described above by filtration with a paper filter (No. 5B, 4 μm) to obtain 1709.59 g of a filtrate. Further, the solid matter on the paper filter was washed with 100.22 g (1.61 mol) of ethylene glycol and 117.64 g of the obtained washing solution and the filtrate were mixed to obtain a filtrate solution. The salt separated at that time was 278.34 g. The result of gas chromatographic analysis of the filtrate solution was 80.2 mol % yield of ethylene glycol monomethallyl ether and 11.8 mol % yield of ethylene glycol dimethallyl ether (calculated on the basis of raw material methallyl chloride). Further, the remaining water amount was analyzed by a Karl-Fischer method to find it was 0.84% by mass.

(Separation Process)

Refining of ethylene glycol monomethallyl ether was carried out by loading 1798.28 g of the filtrate solution obtained in the process described above to the bottom of a distillation tower. As the distillation facility was employed an apparatus having a tower diameter of 30 mmΦ and using a regularly packed material and theoretical stages equivalent to 30 stages to carry out distillation at a top pressure of 45 mmHg and a bottom temperature between 100° C. and 127° C. In an initial period of the distillation, since the condensed solution in the tower summit part was separated into two-layers due to concentration of remaining water, 17.25 g of the water layer was separated by oil-water separation. Thereafter, since the condensed solution became uniform, distillation was carried out at a refluxing ratio of 10 to obtain 318.17 g of a distilled solution containing as a main component, ethylene glycol monomethallyl ether. As a result of the analysis of the distilled solution, the water content was 0.06% by mass and the ethylene glycol dimethallyl ether content was 0.47% by mass. Further, ethylene glycol (1289.9 g as the pure component) containing a salt as a distillation residue was collected.

Production Example 4-2

Production of Ethylene Glycol Methallyl Ether using Ethylene Glycol Collected in Production Example 4-1

(Reaction Process)

A mixture obtained by adding 399.44 g (6.44 mol) of new ethylene glycol to 1102.5 g (17.76 mol) of the ethylene glycol as a pure component collected in the distillation process of Production Example 4-1 was used in place of 1500.0 g of ethylene glycol in the reaction process 1 and 420.91 g of an aqueous 48% by mass sodium hydroxide solution (NaOH 5.05 mol) was loaded and while being stirred, the mixture was heated to 60° C. Under stirring at 60° C., 452.90 g (5.00 mol) of methallyl chloride was dropwise added over 2 hours and successively reaction was carried out at 70° C. for 4 hours. The yield of ethylene glycol monomethallyl ether was 82.0 mol % at the time of reaction completion. Further, the total yield of ethylene glycol monomethallyl ether was 25.9 mol % on the basis of the total loaded amount of ethylene glycol from Production Example 4-1.

(Water Reduction Process and Solid-Liquid Separation Process)

Dewatering and filtration were carried out in the same manner as in Production Example 4-1, except the operation pressure in the dewatering process was changed to 100 mmHg from the initial stage to obtain 1732.34 g of a filtrate and 163.14 g of a washing solution. At that time, the salt separated and collected was 395.11 g. As a result, it was found that the yield of ethylene glycol monomethallyl ether was 76.8 mol % and the yield of ethylene glycol dimethallyl ether was 13.4 mol % (calculated on the basis of raw material methallyl chloride). Further, the remaining water amount was 1.16% by mass.

(Separation Process)

Using the same distillation facility as that of Production Example 4-1, refining of ethylene glycol monomethallyl ether was carried out by loading 1839.60 g of a mixture of the reaction solution and the washing solution collected in the prior process to the bottom of a distillation tower. In an initial period of the distillation; 24.30 g of the water layer was separated by oil-water separation of a refluxed solution separated into two-layers. Thereafter, the initial fraction was extracted at a refluxing ratio of 20 to a distillation ratio of 3.2% and successively the refluxing ratio was changed to 10 and the main fraction was extracted. At a moment when the distillation ratio reached 15.7% by mass, a process involving (i) full refluxing for 15 minutes and (ii) extraction of 3.3 g of the solution in the refluxing tank within short time was repeated 38 times. Thereafter, the fractions at a distillation ratio of 23.6% to 32.8% were distilled as high boiling point fractions at a refluxing ratio of 20 and ethylene glycol (1083.69 g as a pure component) containing a salt as a distillation residue was collected. By the distillation process as described above, 375.40 g of a fraction containing ethylene glycol monomethallyl ether as a main component was obtained. As a result of analysis, the water content was 0.06% by mass and the ethylene glycol dimethallyl ether content was 0.29% by mass.

Reference Production Example 4-1

Production Example of Alkylene Glycol and Unsaturated Halogen Compound at Mole Ratio of 1

Reaction was carried out in the same manner as in Production Example 4-1 by loading a 2 L flask with 310.35 g (5.00 mol) of ethylene glycol, 420.83 g of an aqueous 48% by mass sodium hydroxide solution (NaOH 5.05 mol), and 459.64 g (5.00 mol) of methallyl chloride. As a result of analysis, it was found that the yield of ethylene glycol monomethallyl ether was 24.6 mol % and the yield of ethylene glycol dimethallyl ether was 26.8 mol % (calculated on the basis of raw material methallyl chloride) at the time of reaction completion.

Production Example 4-3

First Reaction Process and Water Reduction Process

A 2 L flask was loaded with 1501.96 g (24.20 mol) of ethylene glycol and 205.08 g (5.05 mol) of flaky sodium hydroxide and under stirring, the temperature was changed from room temperature to 125° C. at a pressure of 20 mmHg to carry out reaction. Further, at the same time, water was removed by simple distillation and 131.31 g of a fraction was collected.

(Second Reaction Process)

Under stirring at normal pressure and at 65 to 70° C., 452.80 g (5.00 mol) of methallyl chloride was dropwise added over 3 hours to the water reduced composition solution obtained in the process as described above and thereafter, reaction was carried out at 70° C. for 6 hours to obtain 2014.11 g of a reaction mixture containing a precipitated salt.

(Solid-Liquid Separation Process)

The slurry obtained in the prior process was filtered by a paper filter (No. 5B, 4 μm) to obtain 1729.39 g of a filtrate. Further, the solid matter on the paper filter was washed with 100.62 g (1.62 mol) of ethylene glycol and 121.29 g of the obtained washing solution and the filtrate were mixed to obtain a filtrate solution. The salt separated at that time was 259.53 g. The result of gas chromatographic analysis of the filtrate solution was 83.3 mol % yield of ethylene glycol monomethallyl ether and 12.2 mol % yield of ethylene glycol dimethallyl ether (calculated on the basis of raw material methallyl chloride). Further, the remaining water amount was analyzed by a Karl-Fischer method to find it was 0.10% by mass.

(Separation Process)

Using the same distillation facility as that of Production Example 4-1, refining of ethylene glycol monomethallyl ether was carried out by loading 1728.00 g of a mixture of the reaction solution and the washing solution collected in the prior process to the bottom of a distillation tower. In an initial period of the distillation, 5.68 g of the water-concentrated solution was separated from the refluxing tank. Thereafter, the initial fraction was extracted at a refluxing ratio of 20 to a distillation ratio of 1.3% and successively the refluxing ratio was changed to 10 and the main fraction was extracted. Thereafter, the fractions at distillation ratio of 23.2% to 29.1% were distilled as high boiling point fractions at a refluxing ratio of 20 and ethylene glycol (1153.31 g as a pure component) containing a salt as distillation residue was collected. By the distillation process as described above, 378.63 g of a fraction containing ethylene glycol monomethallyl ether as a main component was obtained. As a result of analysis, the water content was 0.09% by mass and the ethylene glycol dimethallyl ether content was 0.36% by mass.

Production Example 4-4

An experiment was carried out in the same manner as in Production Example 4-3, except that the amount of the ethylene glycol to be used in the first reaction process was changed to 1489.71 g (24.00 mol) and the amount of the flaky sodium hydroxide was changed to 123.20 g (3.03 mol) and the amount of the methallyl chloride to be used in the second reaction process was changed to 271.77 g (3.00 mol). The filtrate, washing solution, and salt obtained in the solid-liquid separation process were respectively 1648.76 g, 123.84 g, and 101.10 g. The filtrate solution was analyzed to find that the yield of ethylene glycol monomethallyl ether was 89.0 mol % and the yield of ethylene glycol dimethallyl ether was 7.2 mol % (calculated on the basis of raw material methallyl chloride). Further, the remaining water amount was 0.10% by mass.

As described above, it was proved that an unsaturated ether composition can be obtained at a high yield by causing a reaction of the polyhydric alcohol (1) and the unsaturated halogen compound at a preferable ratio and further it was found that an unsaturated ether composition can be efficiently produced by carrying out reaction of the collected composition containing the polyhydric alcohol (1). Further, it was made clear that an unsaturated ether composition can be efficiently produced by the processes of the method A and the method B as described above.

The invention claimed is:

1. A (poly)alkylene glycol chain-containing polymer composition, comprising a polyalkylene glycol chain-containing polymer and an isomer of an unsaturated polyalkylene glycol ether monomer, wherein said isomer is defined by the following formula (6):

$$B^2\text{—O—}(R^1O)_{n^2}\text{—}R^3 \quad (6)$$

wherein, $B^2$ is an organic group defined by the following general formula:

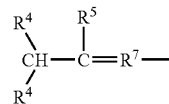

$R^4$ may be the same or different and denotes a hydrogen atom or a hydrocarbon group having 1 to 20 carbon atoms;

$R^5$ denotes a monovalent hydrocarbon group containing 1 to 20 carbon atoms;

$R^7$ denotes a trivalent hydrocarbon group having 1 to 20 carbon atoms;

$R^1O$ may be the same or different and denotes an oxyalkylene group having 2 to 18 carbon atoms;

$n^2$ denotes an average addition mole number of the oxyalkylene group and is a numeral of 50 to 300; and $R^3$ denotes a hydrogen atom or a hydrocarbon group having 1 to 20 carbon atoms, and the polyalkylene glycol chain-containing polymer composition includes 0.01 to 10 parts by mass of the isomer to 100 parts by mass of the polyalkylene glycol chain-containing polymer, and wherein said (poly)alkylene glycol chain-containing polymer comprises a constituent unit derived from an unsaturated (poly)alkylene glycol ether monomer component is defined by the following general formula:

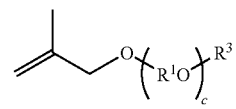

wherein, $R^1O$ may be the same or different and denotes an oxyalkylene group having 2 to 18 carbon atoms; c denotes an average addition mole number of the oxyalkylene group and is a numeral of 50 to 300, and $R^3$ denotes a hydrogen atom or a hydrocarbon group having 1 to 20 carbon atoms, and wherein the unsaturated (poly)alkylene glycol ether monomer contains a polyalkylene glycol in an amount of 0.5 to 50% by mass in the unsaturated (poly)alkylene glycol ether monomer;

wherein the polyalkylene glycol chain-containing polymer is obtained by polymerizing monomer components containing the unsaturated (poly)alkylene glycol ether monomer (monomer (i)) and an unsaturated carboxylic acid (monomer (ii)), wherein the unsaturated carboxylic acid contains acrylic acid or a salt thereof, and wherein the mixing ratios of the monomer (i), monomer (ii), and a monomer (iii) copolymerizable with the monomer (i) or the monomer (ii) or both are in a range in % by mass of monomer (i) /monomer (ii) /monomer (iii) of 45 to 97/3 to 25/0 to 30 and the total of monomer (i), monomer (ii) and monomer (iii) is 100% by mass.

2. A method for producing the polymer composition of claim 1, which comprises polymerizing an unsaturated (poly)alkylene glycol ether monomer produced by a production method by addition reaction of an alkylene oxide on an unsaturated alcohol, wherein the production method comprises carrying out the addition reaction under condition of existence of 0.001 to 25 parts by mass of an unsaturated (poly)alkylene glycol diether monomer to 100 parts by mass of the unsaturated alcohol.

3. An admixture for cement, comprising the (poly)alkylene glycol chain-containing polymer contained in the (poly)alkylene glycol chain-containing polymer composition of claim 1.

4. The (poly)alkylene glycol chain-containing polymer composition according to claim 1, wherein $n^2$ is a numeral of 75 to 300 and c is a numeral of 75 to 300.

5. The (poly)alkylene glycol chain-containing polymer composition according to claim 1, wherein $n^2$ is a numeral of 100 to 300 and c is a numeral of 100 to 300.

6. The (poly)alkylene glycol chain-containing polymer composition according to claim 1, wherein the unsaturated polyalkylene glycol ether monomer and isomer thereof are represented by the following formulas (14) and (15), respectively, $$CH_2=C(CH_3)CH_2-O-(R^1O)_{n50}-R^3 \qquad (1)$$

$$(CH_3)_2C=CH-O-(R^1O)_{t50}-R^3 \qquad (15);$$

wherein $R^1O$ may be the same or different and denotes an oxyalkylene group having 2 to 18 carbon; $R^3$ denotes a hydrogen atom or a hydrocarbon group having 1 to 20 carbon atoms; and each of n50 and t50 denotes an average addition mole number of the oxyalkylene group and is a numeral of 50 to 300.

7. The (poly)alkylene glycol chain-containing polymer composition according to claim 1, wherein the content of the polyalkylene glycol is 1 to 40% by mass in the unsaturated (poly)alkylene glycol ether monomer.

8. The (poly)alkylene glycol chain-containing polymer composition according to claim 1, wherein the content of the polyalkylene glycol is 2 to 30% by mass in the unsaturated (poly)alkylene glycol ether monomer.

\* \* \* \* \*

UNITED STATES PATENT AND TRADEMARK OFFICE
CERTIFICATE OF CORRECTION

PATENT NO. : 8,754,264 B2
APPLICATION NO. : 12/594397
DATED : June 17, 2014
INVENTOR(S) : Tsutomu Yuasa et al.

It is certified that error appears in the above-identified patent and that said Letters Patent is hereby corrected as shown below:

In the Claims

Column 110, claim 6, line 1, "(1)" should read --(14)--

Signed and Sealed this
Twenty-third Day of September, 2014

Michelle K. Lee
*Deputy Director of the United States Patent and Trademark Office*